United States Patent
Oh et al.

(10) Patent No.: US 12,143,648 B2
(45) Date of Patent: Nov. 12, 2024

(54) DEVICE AND METHOD FOR PROCESSING POINT CLOUD DATA

(71) Applicant: LG Electronics Inc., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 17/624,071

(22) PCT Filed: Jul. 1, 2020

(86) PCT No.: PCT/KR2020/008571
§ 371 (c)(1),
(2) Date: Dec. 30, 2021

(87) PCT Pub. No.: WO2021/002665
PCT Pub. Date: Jan. 7, 2021

(65) Prior Publication Data
US 2022/0360823 A1      Nov. 10, 2022

(30) Foreign Application Priority Data

Jul. 1, 2019 (KR) .................. 10-2019-0078664

(51) Int. Cl.
*H04N 19/96* (2014.01)
*H04N 19/46* (2014.01)
*H04N 19/70* (2014.01)

(52) U.S. Cl.
CPC .................. *H04N 19/96* (2014.11)

(58) Field of Classification Search
CPC ......... H04N 19/96; H04N 19/70; H04N 19/04
USPC ...................................... 375/240.08
See application file for complete search history.

(56) References Cited

U.S. PATENT DOCUMENTS

| 2018/0075622 A1* | 3/2018 | Tuffreau | ............ G06T 9/40 |
| 2019/0080483 A1* | 3/2019 | Mammou | ............ G06T 7/50 |

FOREIGN PATENT DOCUMENTS

| CN | 109214573 A | 1/2019 |
| KR | 20180087348 | 8/2018 |
| WO | WO2019011634 | 1/2019 |
| WO | WO2019070830 | 4/2019 |
| WO | WO2019081087 | 5/2019 |

OTHER PUBLICATIONS

Office Action in Japanese Appln. No. 2021-577128, mailed on Feb. 28, 2023, 4 pages (with English translation).
International Search Report and Written Opinion in International Appln. No. PCT/KR2020/008571, dated Oct. 21, 2020, 18 pages.
Mammou et al., "G-PCC codec description v2," International Organisation for Standardisation, ISO/IEC JTC1/SC29/WG11 N18189, Marrakech, MA, Jan. 2019, 39 pages.

(Continued)

*Primary Examiner* — Jeffery A Williams
(74) *Attorney, Agent, or Firm* — Fish & Richardson P.C.

(57) ABSTRACT

A device for processing point cloud data according to embodiments may comprise the steps of: encoding point cloud data including geometry information and attribute information; and transmitting a bitstream including the encoded point cloud data.

8 Claims, 40 Drawing Sheets

(56) References Cited

OTHER PUBLICATIONS

3DG, "G-PCC CE 13.15 on LoD generation for spatial scalability," 1S0/IEC JTC 1/SC 29/WG 11, Coding of moving pictures and audio, Convenorship: UNI (Italy), Apr. 15, 2019, 7 pages.

3DG, "G-PCC codec description v2," international organisation for standardisation, coding of moving pictures and audio, ISO/IEC JTC1/SC29/WG11, N18189, Jan. 2019, Marrakech, MA, 39 pages.

Apple Inc., "[G-PCC][New Proposal] Efficient Low-Complexity LOD Generation," international organisation for standardisation, coding of moving pictures and audio, ISO/IEC JTC1/SC29/WG11, MPEG2018/m46188, Jan. 2019, Marrakech, MA, 12 pages.

Cura et al., "Implicit LOD for processing visualisation and classification in point cloud servers," CoRR, submitted on Mar. 4, 2016, arXiv:1602.06920v2, 17 pages.

Extended European Search Report in European Appln. No. 20834989.4, mailed on May 17, 2023, 11 pages.

LG Electronics Inc., "[G-PCC][New Proposal] On sampling based LOD generation," international organisation for standardisation, coding of moving pictures and audio, ISO/IEC JTC1/SC29/WG 11, MPEG2018/M49424, Jul. 2019, Gothenburg, SE, 7 pages.

Sony corporation, "[G-PCC] Spatial scalability support for G-PCC," international organisation for standardisation, coding of moving pictures and audio, ISO/IEC JTC1/SC29/WG11, MPEG2019/m47352, Mar. 2019, Geneva, CH, 15 pages.

Office Action in Chinese Appln. No. 202080048759.0, mailed on Aug. 8, 2024, 17 pages (with English translation).

* cited by examiner

FIG. 6
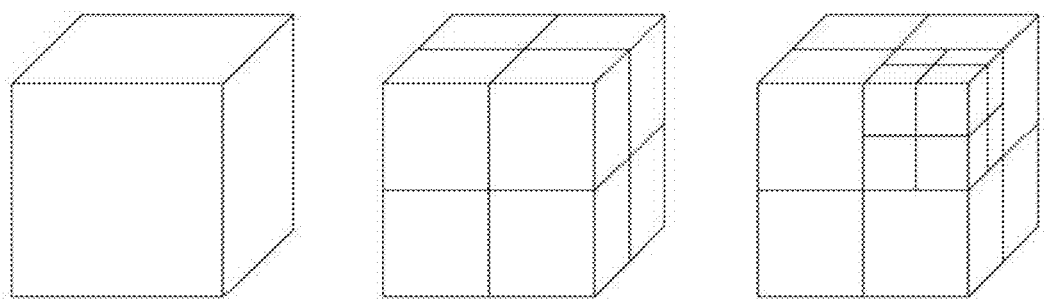
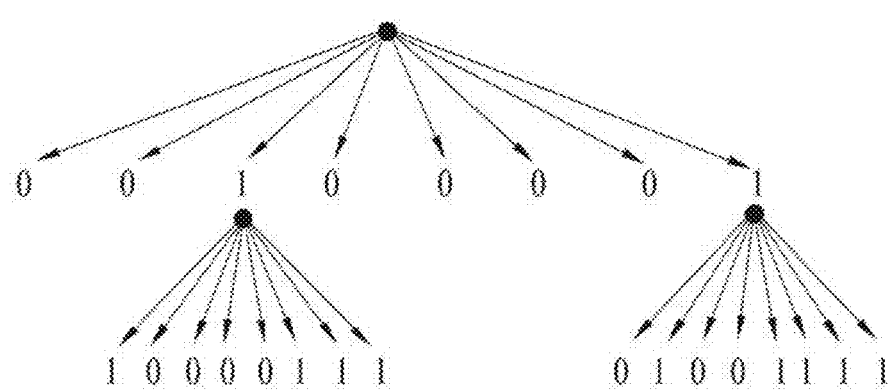

FIG. 7
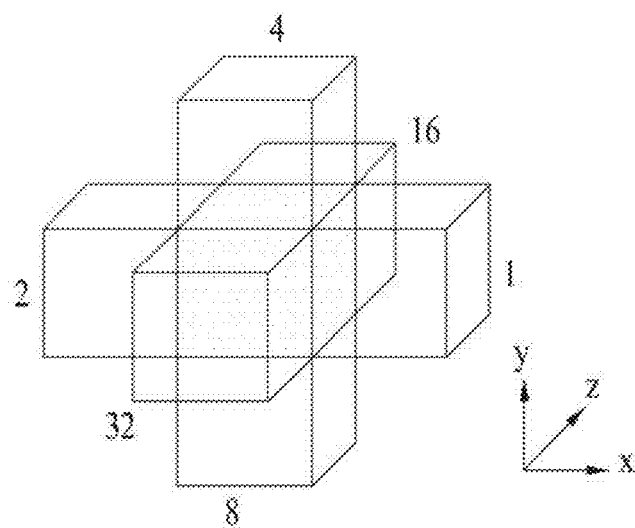
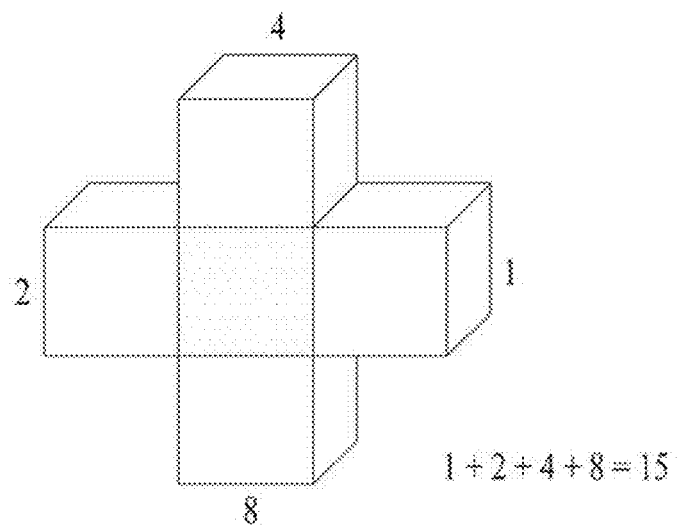
1+2+4+8=15

FIG. 19
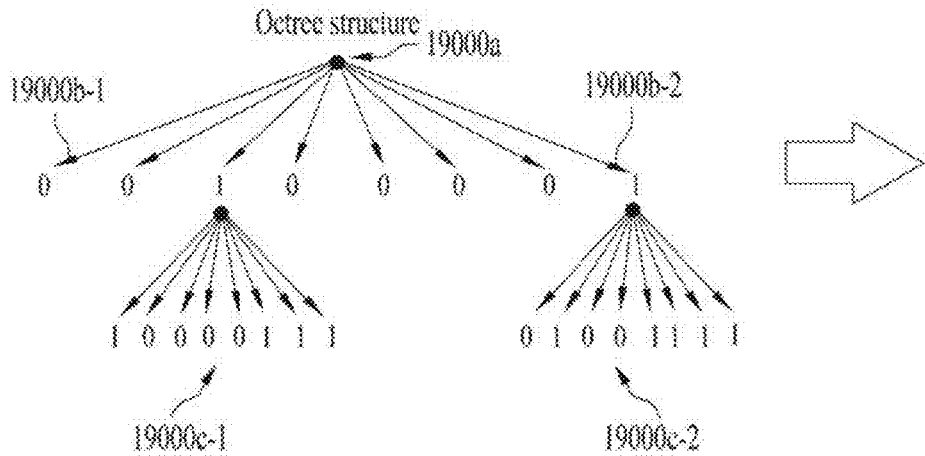
(a)
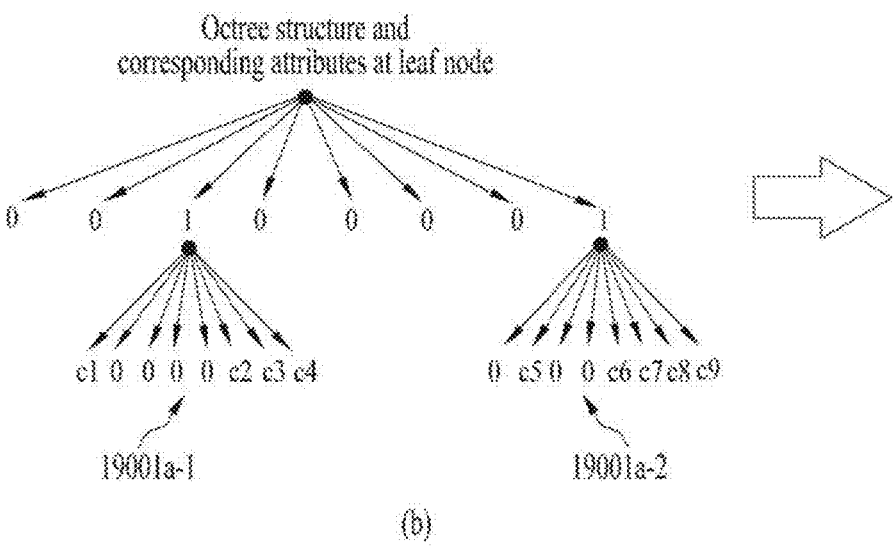
(b)
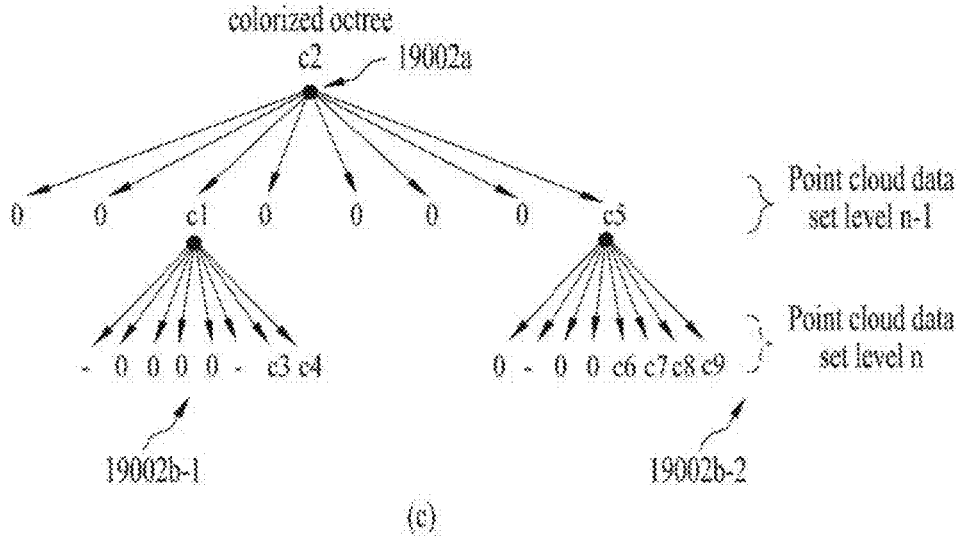
(c)

FIG. 24

$$P_{color}(x, y, z) = f(\text{Attr}(x_n, y_n, z_n) \mid (x_n, y_n, z_n) \in \text{NEIGHBOR})$$

$$= \arg\min_{[\hat{x},\hat{y},\hat{z}]^T} \left\{ \frac{1}{M} \sum_{(x_n, y_n, z_n) \in \text{NEIGHBOR}} s(x_n, y_n, z_n) \times \left\| [\hat{x}, \hat{y}, \hat{z}]^T - [x_n, y_n, z_n]^T \right\|^2 \right\} \quad \text{---2400a}$$

$$[\hat{x}, \hat{y}, \hat{z}]^T = \frac{1}{M} \sum_{(x_n, y_n, z_n) \in \text{NEIGHBOR}} \text{weight}(x_n, y_n, z_n) \cdot [x_n, y_n, z_n]^T \quad \text{---2400b}$$

$$s(x_n, y_n, z_n) = \begin{cases} 1 & \text{if not selected} \\ 0 & \text{else} \end{cases}$$

(a)

$$[x_p, y_p, z_p]^T = \text{MEDIAN}_{(x_n, y_n, z_n) \in \text{NEIGHBOR}} \{\text{weight}(x_n, y_n, z_n) \cdot [x_n, y_n, z_n]^T\}$$

(b)

$$[x_p, y_p, z_p]^T = [x_k, y_k, z_k]^T \quad \text{where } [x_k, y_k, z_k]^T \text{ represent the k-th point in NEIGHBOR in ascending order}$$

(c)

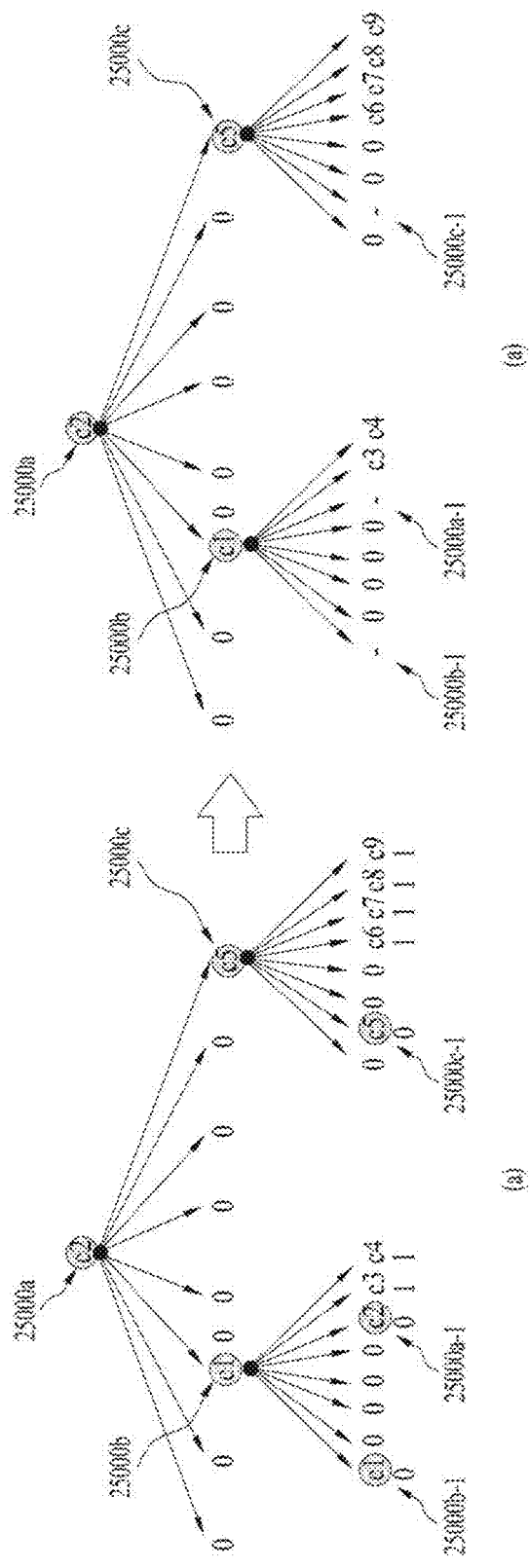

FIG. 28

| attribute_parameter_set( ) { | Descriptor |
|---|---|
| aps_attr_parameter_set_id | ue(v) |
| aps_seq_parameter_set_id | ue(v) |
| octree_full_level_present_flag | u(1) |
| scalable_representation_available_flag | u(1) |
| if( scalable_representation_available_flag == 1 ) { | |
|   octree_colorization_type | u(2) |
|   if( octree_colorization_type == 0 ) { | |
|     matched_attribute_type | u(3) |
|     attribute_selection_type | |
|   } | |
|   else if( octree_colorization_type == 1 ) { | |
|     point_data_selection_type | u(3) |
|     if( point_data_selection_type == 0 \|\| point_data_selection_type == 3 ) | |
|       point_cloud_geometry_info_present_flag | u(1) |
|     } | |
|   } | |
|   ...... | |
| } | |

| general_attribute_bitstream( ) { | Descriptor |
|---|---|
|   attribute_slice_header( ) | |
|   attribute_slice_data( ) | |
| } | |

29001

| attribute_slice_header( ) { | Descriptor |
|---|---|
|   ash_attr_parameter_set_id | ue(v) |
|   ash_attr_sps_attr_idx | ue(v) |
|   byte_alignment( ) | |
| } | |

29002

| attribute_slice_data( ) { | Descriptor |
|---|---|
|   dimension = attribute_dimension[ ash_attr_sps_attr_idx ] | |
|   if( attr_coding_type == 0 ) | |
|     PredictingWeight_Lifting_bitstream( dimension ) | |
|   else if( attr_coding_type == 1 ) | |
|     RAHT_bitstream( dimension ) | |
|   else if( attr_coding_type == 2 ) | |
|     FixedWeight_Lifting_bitstream( dimension ) | |
|   byte_alignment( ) | |
| } | |

FIG. 35

$$P_{Good}(x, y, z) = f\{Att(x_n, y_n, z_n)\} | (x_n, y_n, z_n)$$

$$\in \text{NEIGHBOR} = \arg\min_{Att(x, y, z)} \left\{ \frac{1}{M} \sum_{(x_n, y_n, z_n) \in \text{NEIGHBOR}} s(x_n, y_n, z_n) \times \left| [\hat{x}, \hat{y}, \hat{z}]^T - [x_n, y_n, z_n]^T \right|^2 \right\}$$

$$[\hat{x}, \hat{y}, \hat{z}] = \frac{1}{M} \sum_{(x_n, y_n, z_n) \in \text{NEIGHBOR}} \text{weight}(x_n, y_n, z_n) \cdot [x_n, y_n, z_n]^T$$

$$s(x_n, y_n, z_n) = \begin{cases} 1 & \text{if not selected} \\ 0 & \text{else} \end{cases}$$

$$Att(x, y, z) = Att(x_1, y_1, z_1)$$

where $(x, y, z) = MAP(x_1, y_1, z_1)$ maps the node position to point cloud data position, and $[x_1, y_1, z_1]^T$ and $[x_n, y_n, z_n]^T$ represent position of point cloud data and node, respectively.

FIG. 37
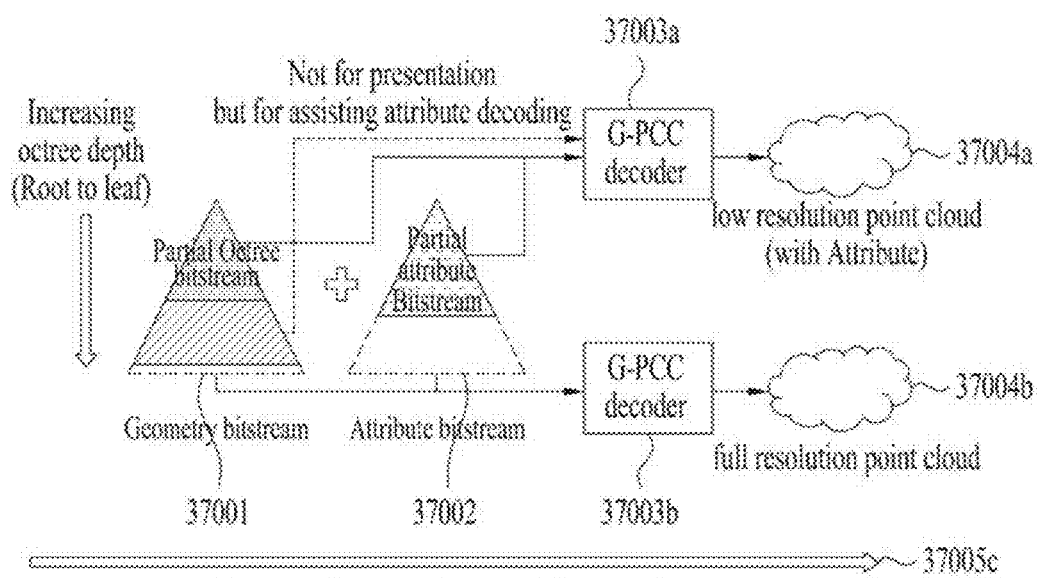
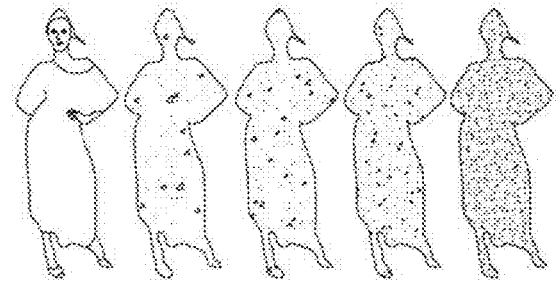
(a)
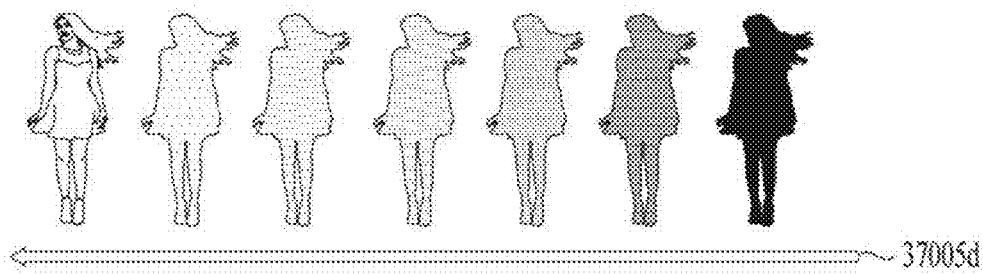
(b)

ized octree is
used to encode the attribute information for scalable representation of partial or entire attribute information.

DEVICE AND METHOD FOR PROCESSING POINT CLOUD DATA

CROSS-REFERENCE TO RELATED APPLICATIONS

This application is a National Stage application under 35 U.S.C. § 371 of International Application No. PCT/KR2020/008571, filed on Jul. 1, 2020, which claims the benefit of Korean Application No. 10-2019-0078664, filed on Jul. 1, 2019. The disclosures of the prior applications are incorporated by reference in their entirety.

TECHNICAL FIELD

The present disclosure provides a method for providing point cloud contents to provide a user with various services such as virtual reality (VR), augmented reality (AR), mixed reality (MR), and self-driving services.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, in some embodiments, a method for processing point cloud data may include: encoding the point cloud data including geometry information and attribute information and transmitting a bitstream including the encoded point cloud data.

In some embodiments, the geometry information may represent positions of points of the point cloud data and the attribute information may represent attributes of the points of the point cloud data.

In some embodiments, encoding the point cloud data includes encoding the geometry information; and encoding the attribute information. The encoding the attribute information includes: receiving an octree structure of the geometry information; and generating a colorized octree by matching each level of the octree structure to one or more attributes In some embodiments, the octree structure may be represented by one or more levels and the colorized octree is used to encode the attribute information for scalable representation of partial or entire attribute information.

In some embodiments, the colorized octree may be generated by: matching one or more attributes to leaf nodes of the octree structure and matching the one or more attributes matched to the leaf nodes to nodes other than the leaf nodes. In some embodiments, the colorized octree may be generated by: matching the one or more attributes to the nodes other than the leaf nodes by stepping from a root node to a leaf node of the octree structure.

In some embodiments, the signaling information may include information representing whether the bitstream includes data corresponding to full level of the octree structure or a partial level of the octree structure.

In some embodiments, encoding the attribute information includes removing duplicate data of the data matched to the colorized octree.

To process the point cloud data efficiently and in accordance with the purpose of the disclosure, in some embodiments, a method for processing point cloud data may include: receiving a bitstream including the point cloud data and decoding the point cloud data.

In some embodiments, the geometry information may represent positions of points of the point cloud data and the attribute information may represent attributes of the points of the point cloud data.

In some embodiments, the decoding the point cloud data includes: decoding the geometry information; and decoding the attribute information.

In some embodiments, the signaling information may include information representing whether the bitstream includes data corresponding to full level of the octree structure or a partial level of the octree structure. In some embodiments, the decoding the attribute information includes: generating a colorized octree to encode the attribute information for scalable representation of the point cloud data based on the information.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

A point cloud data transmission device according to embodiments may apply a different encoding operation according to importance according to importance and use a good-quality encoding method for an important region. In addition, it may support efficient encoding/decoding and transmission according to the characteristics of the point cloud, and provide attribute values according to user requirements.

A point cloud data transmission device and reception device according to embodiments may perform encoding and decoding independently or non-independently on a tile-by-tile basis and/or a slice-by-slice basis, thereby preventing errors from being accumulated in the encoding and decoding processes.

A point cloud data transmission device according to embodiments may generate a colorized octree to encode and transmit attribute information, and may thus perform attribute encoding even when the octree structure is not fully encoded. Therefore, the issue of unnecessary delay in a system requiring high-speed processing may be addressed.

A point cloud data reception device according to embodiments may receive and decode a colorized octree, and may thus perform attribute decoding even when the attribute information is not fully decoded. Thereby, scalable decoding may be implemented.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

For a better understanding of various embodiments described below, reference should be made to the description of the following embodiments in connection with the accompanying drawings. In the drawings:

FIG. 6 shows an example of an octree and occupancy code according to embodiments;

FIG. 7 shows an example of a neighbor node pattern according to embodiments;

FIG. 19 illustrates an octree and a colorized octree according to embodiments;

FIG. 24 shows equations used for an encoder according to the embodiments to match attribute information to a parent node based on neighbors according to embodiments;

FIG. 25 illustrates an operation of removing, by an encoder, a duplicate attribute in an octree to which attribute information is matched according to embodiments;

FIG. 28 shows an attribute parameter set (APS) according to embodiments;

FIG. 29 illustrates an attribute bitstream according to embodiments;

FIG. 35 illustrates a process in which a reception device according to the embodiments performs position estimation according to embodiments;

FIG. 37 illustrates a process of decoding for scalable representation by a point cloud data decoder according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
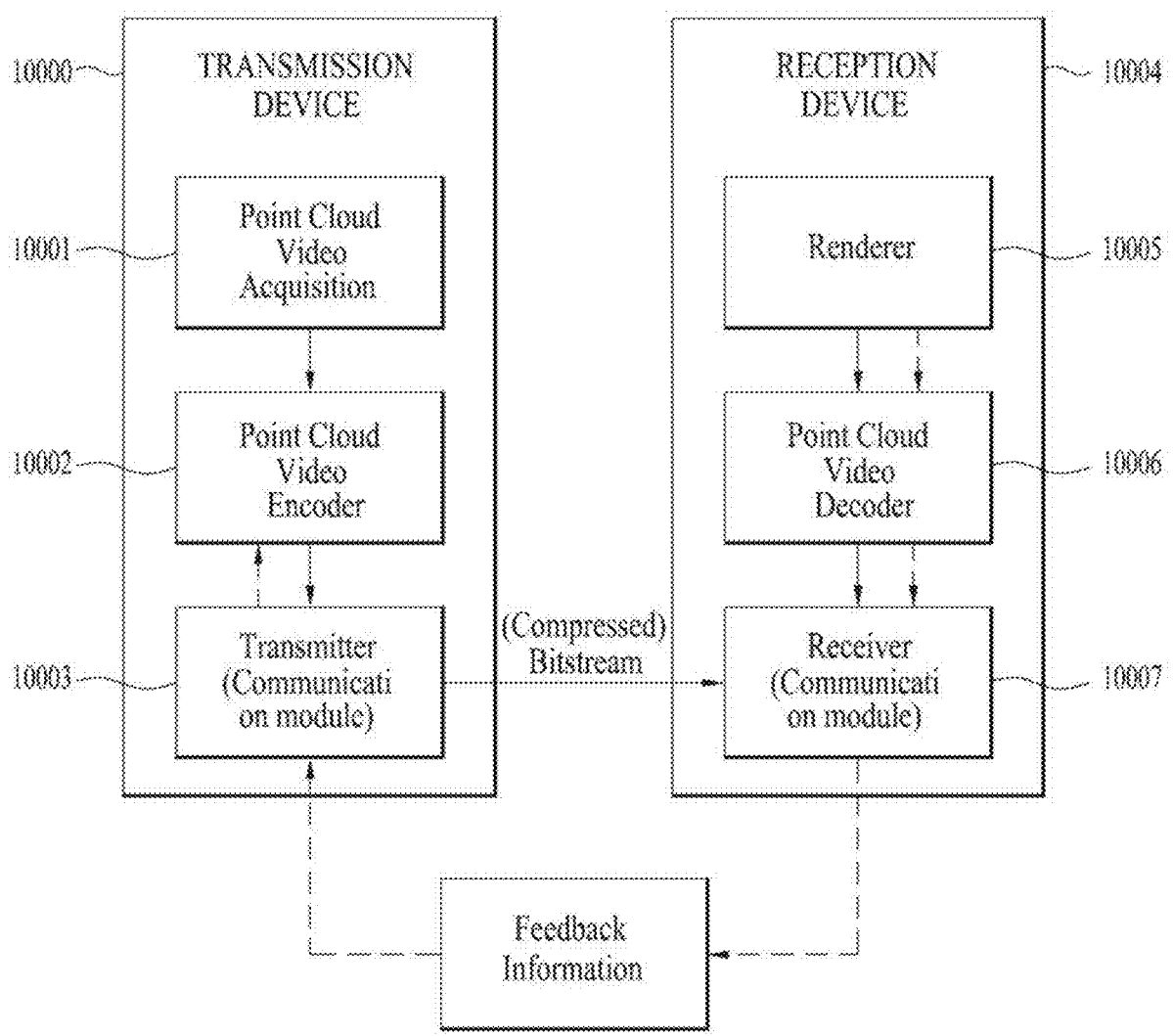
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in the opposite process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
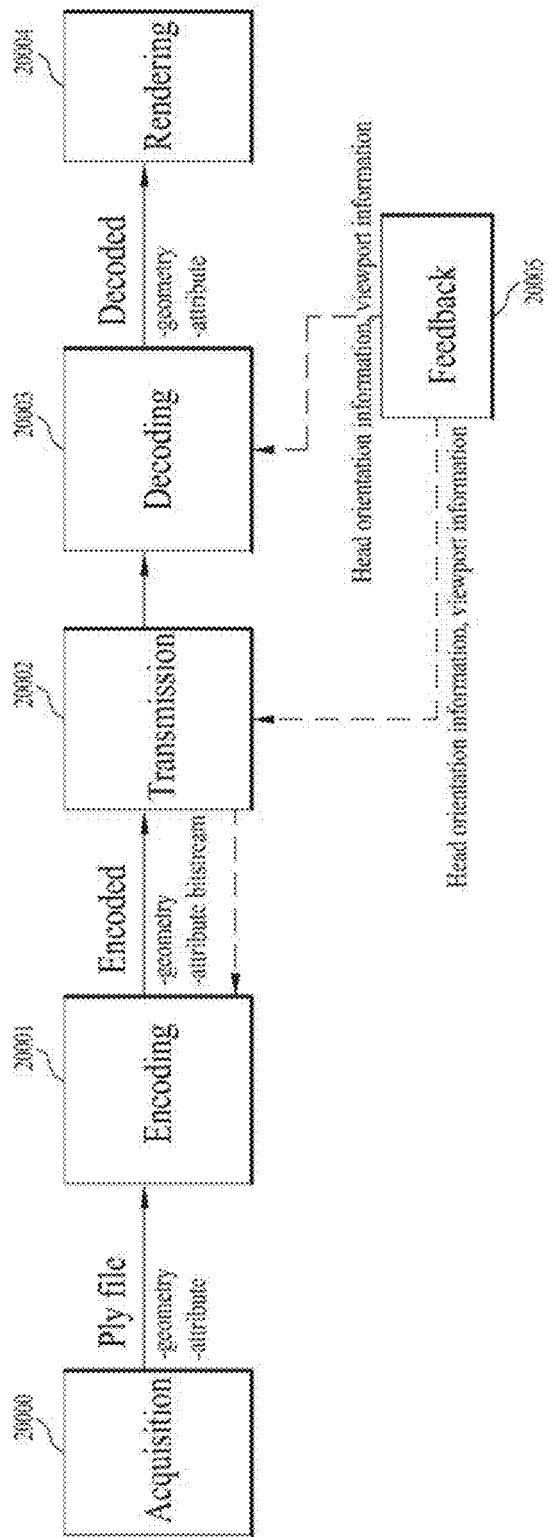
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
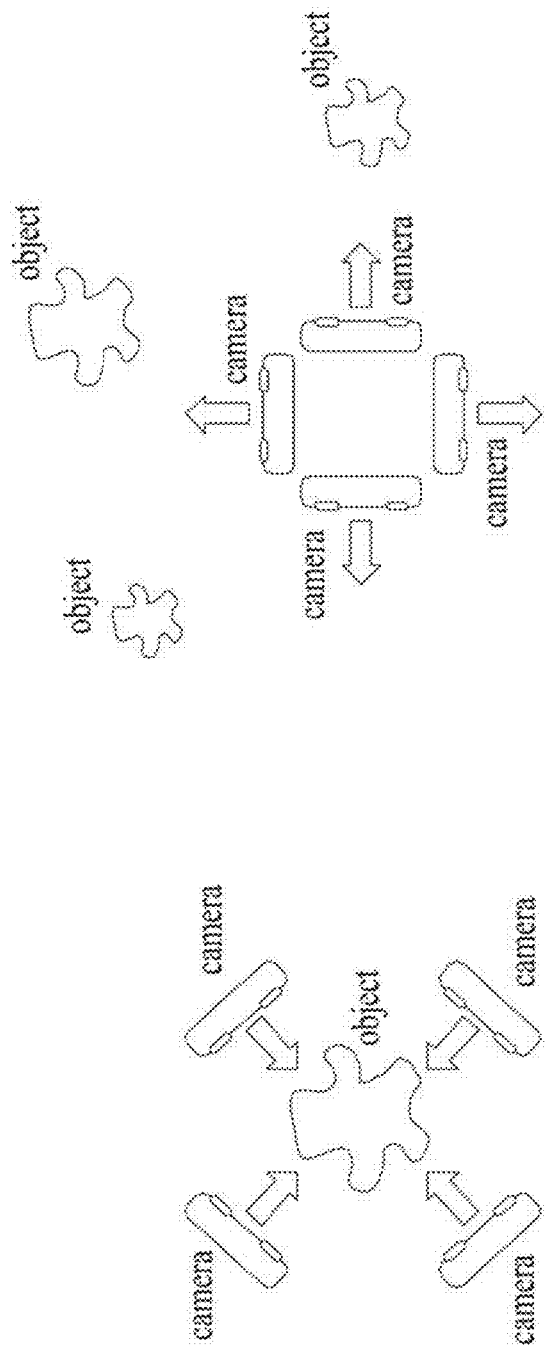
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
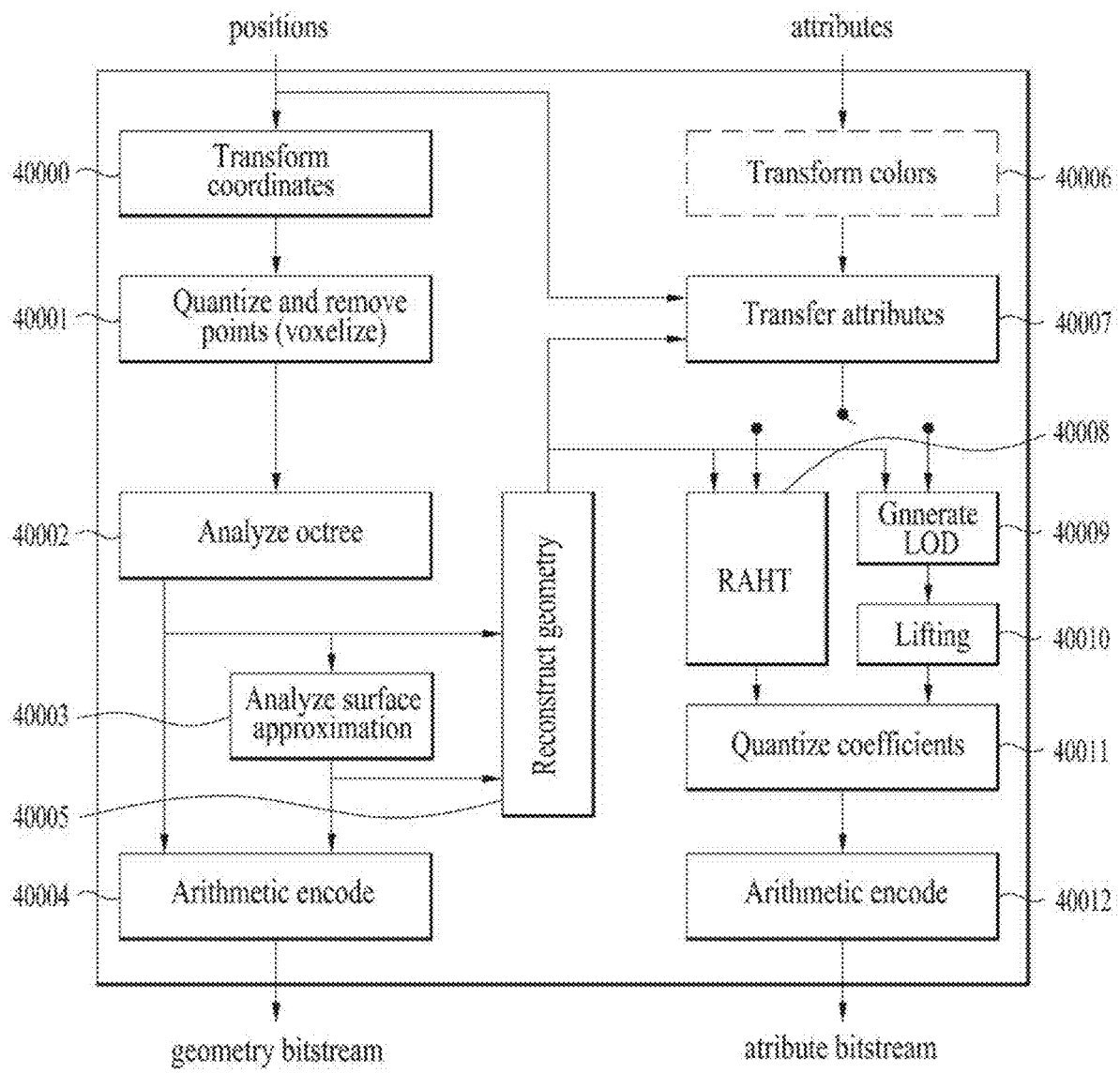
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighbor points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighbor points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a nonvolatile memory (e.g., one or more magnetic disk storage devices, flash memory devices, or other nonvolatile solid-state memory devices).

Figure 5:
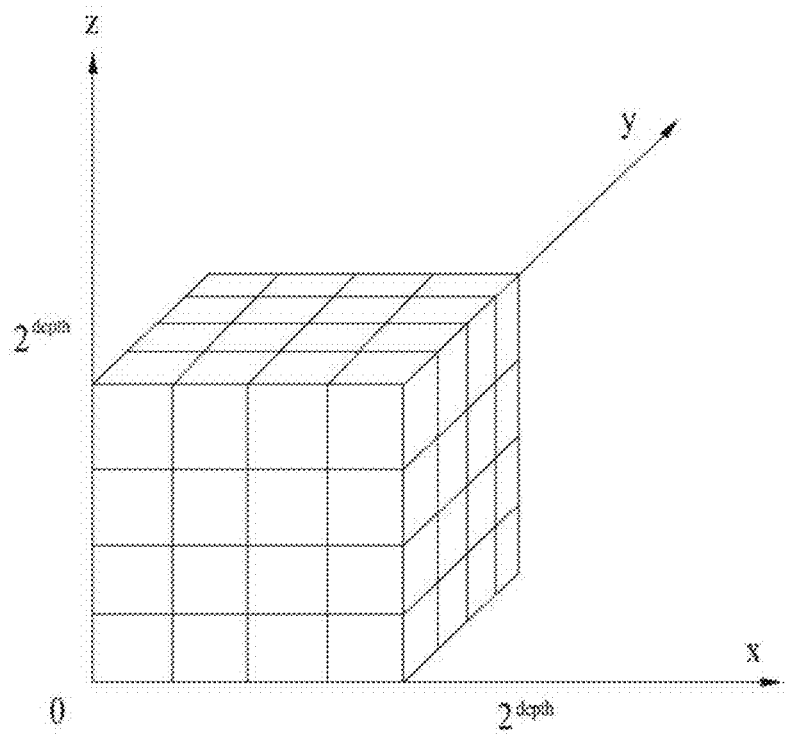
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and $(2^d, 2^d 2^d)$. Here, 2d may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d = \text{Ceil}(\text{Log } 2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: 1) calculating the centroid value of each vertex, 2) subtracting the center value from each vertex value, and 3) estimating the sum of the squares of the values obtained by the subtraction.

$$\begin{bmatrix} \mu_x \\ \mu_y \\ \mu_z \end{bmatrix} = \frac{1}{n} \sum_{k=1}^{n} \begin{bmatrix} x_i \\ y_i \\ z_i \end{bmatrix} \quad\quad 1)$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad\quad 2)$$

$$\begin{bmatrix} \sigma_x^2 \\ \sigma_y^2 \\ \sigma_z^2 \end{bmatrix} = \sum_{k=1}^{n} \begin{bmatrix} \overline{x}_i^2 \\ \overline{y}_i^2 \\ \overline{z}_i^2 \end{bmatrix} \quad\quad 3)$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan2(bi, ai), and the vertices are ordered based on the value of 0. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE Triangles formed from vertices ordered 1

TABLE 1

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using $2^3=8$ methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
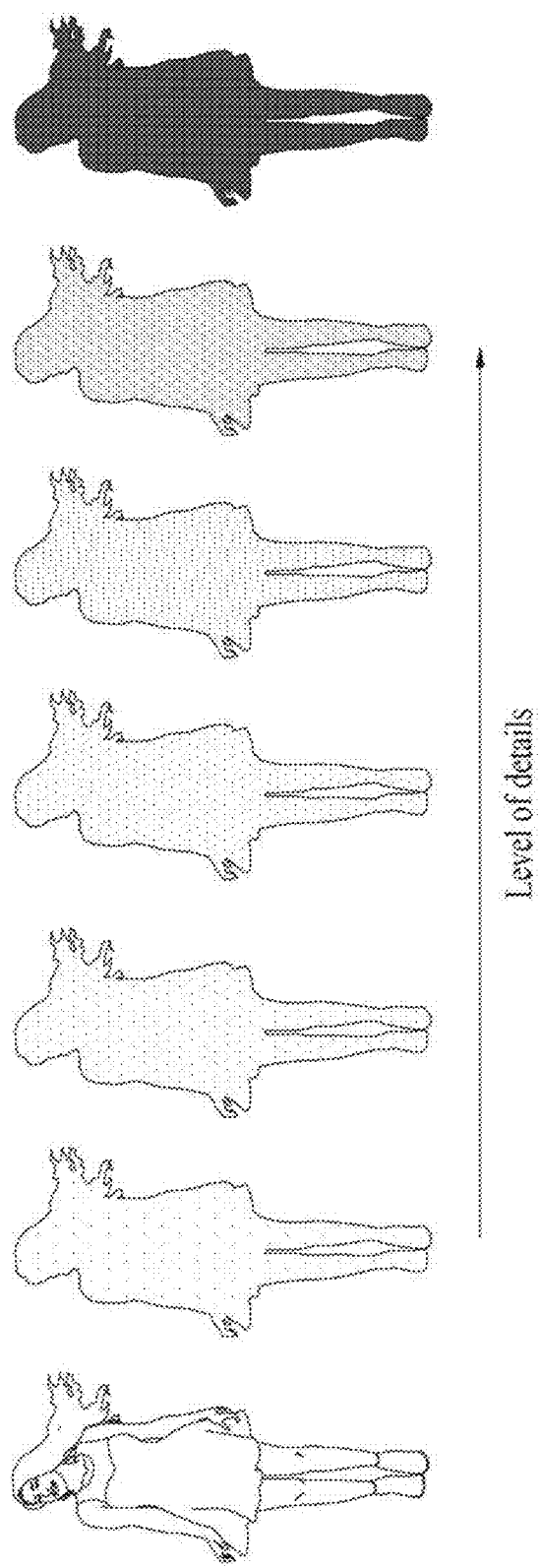
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
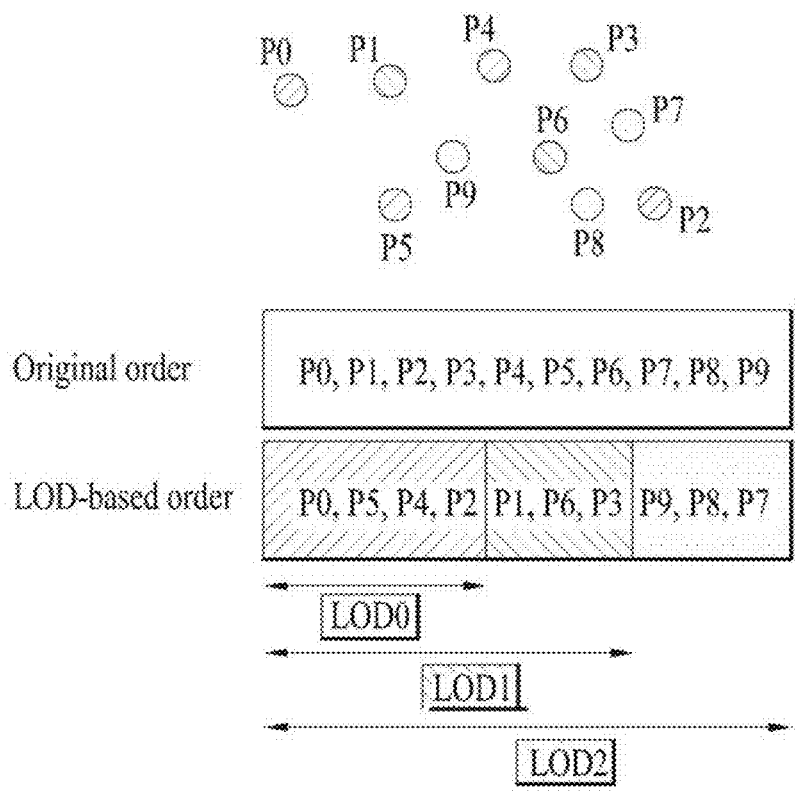
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighbor points present within a set distance for each LOD, and a distance to the neighbor points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE Attribute prediction residuals quantization pseudo code

TABLE 2

```
int PCCQuantization(int value, int quantStep) {
    if( value >=0) {
        return floor(value / quantStep + 1.0 / 3.0);
    } else {
        return -floor(-value / quantStep + 1.0 / 3.0);
    }
}
```

TABLE Attribute prediction residuals inverse quantization pseudo code

TABLE 3

```
int PCCInverseQuantization(int value, int quantStep) {
    if( quantStep ==0) {
        return value;
    } else {
        return value * quantStep;
    }
}
```

When the predictor of each point has neighbor points, the point cloud encoder (e.g., the arithmetic encoder 40012) according to the embodiments may perform entropy coding on the quantized and inverse quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=q_{l_{2x,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix} \quad T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
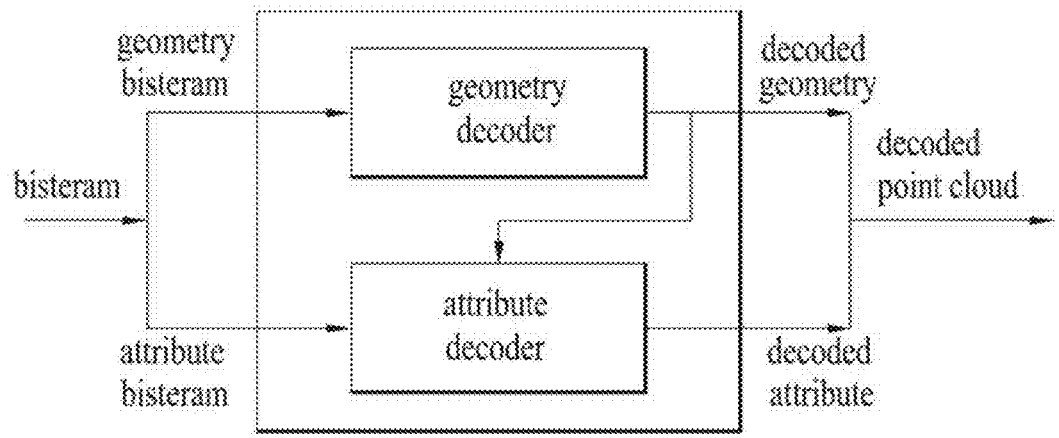
FIG. 10 illustrates an exemplary point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
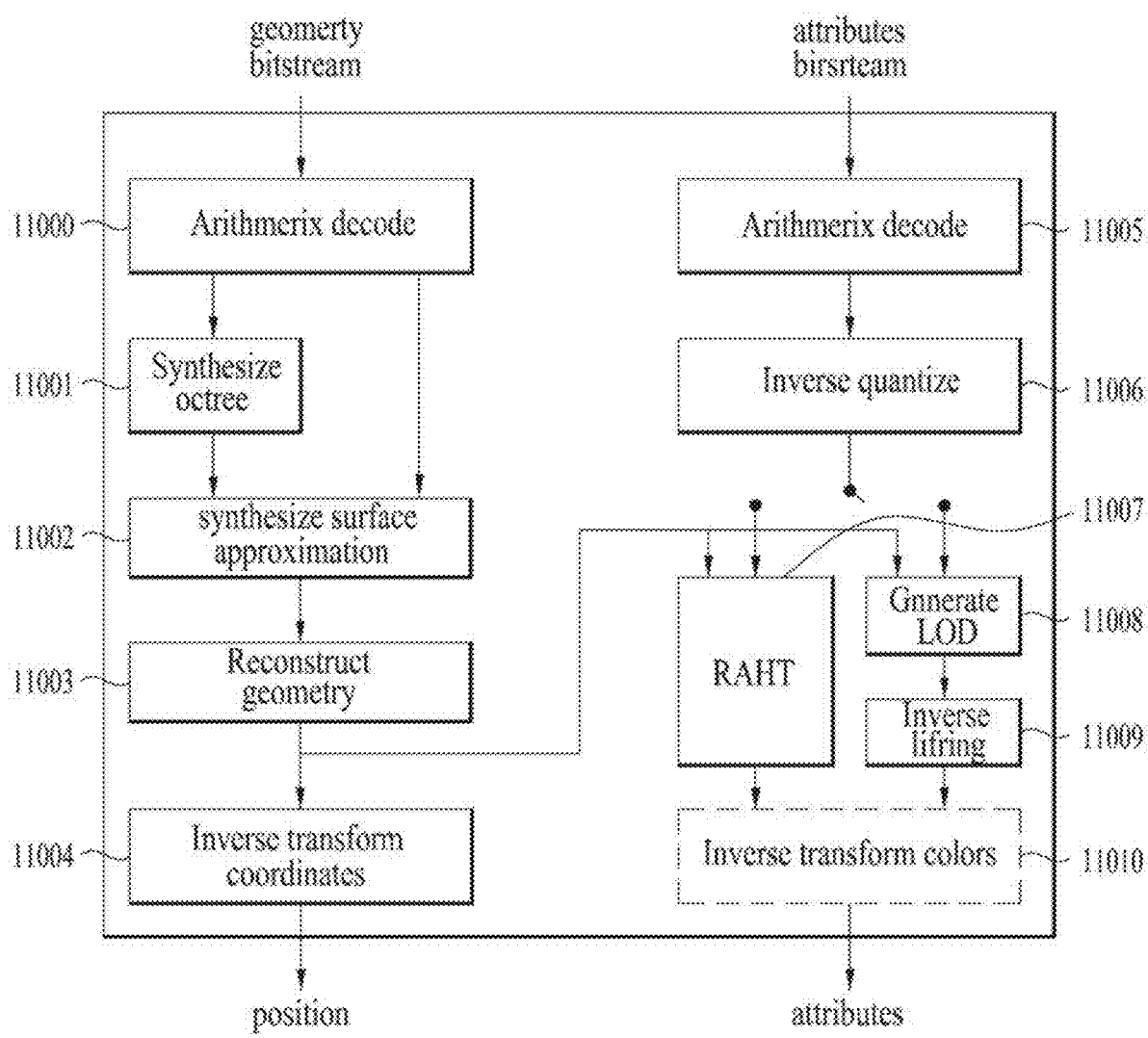
FIG. 11 illustrates an exemplary point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inverse quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inverse quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
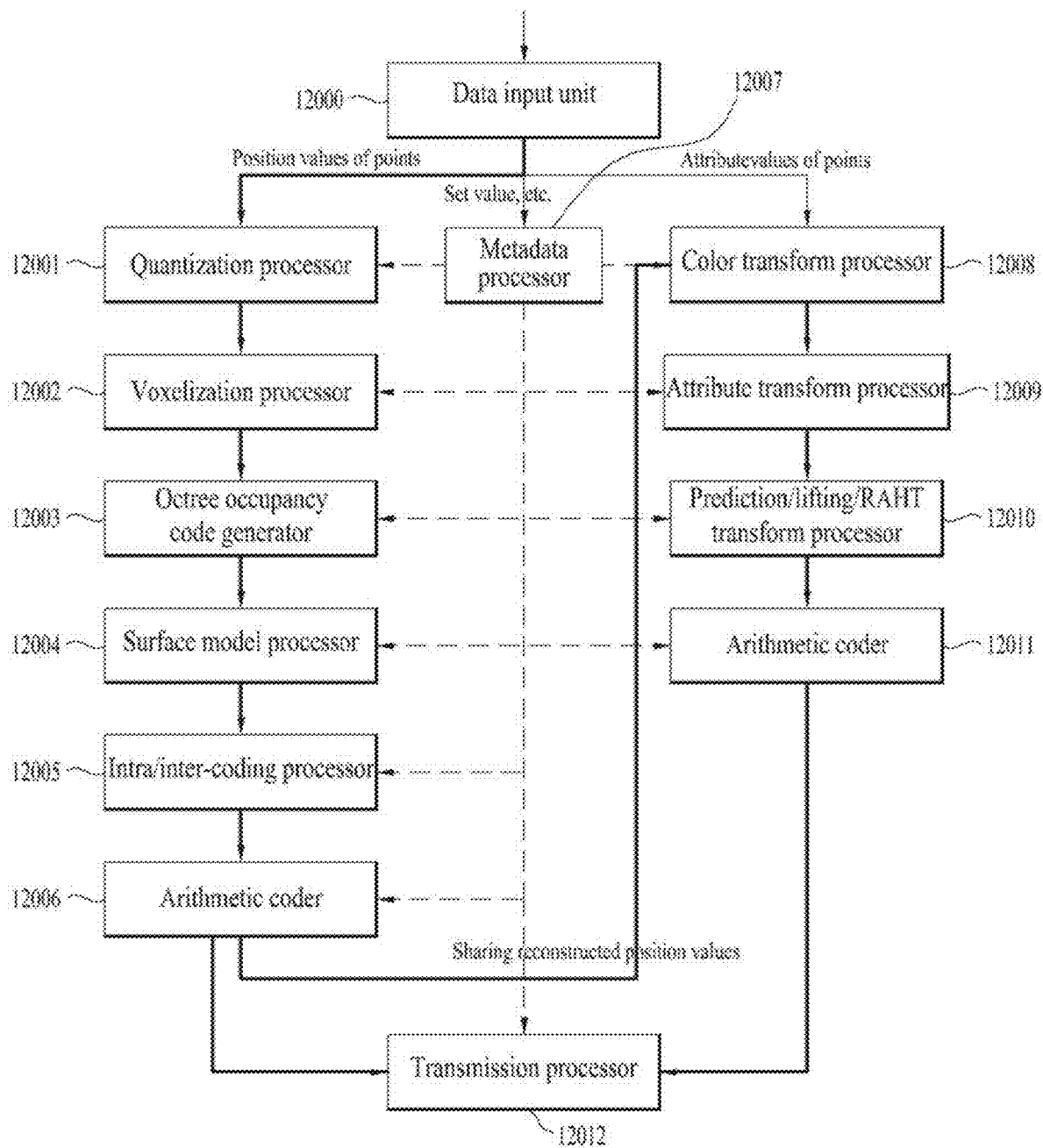
FIG. 12 illustrates an exemplary transmission device according to embodiments.

FIG. 12 illustrates an exemplary transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0$^0$ and one or more attribute bitstreams Attr0$^0$ and Attr1$^0$. The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same or similar to the operation and/or transmission method of the transmitter 10003. Details are the same as those described with reference to FIGS. 1 and 2, and thus a description thereof is omitted.

Figure 13:
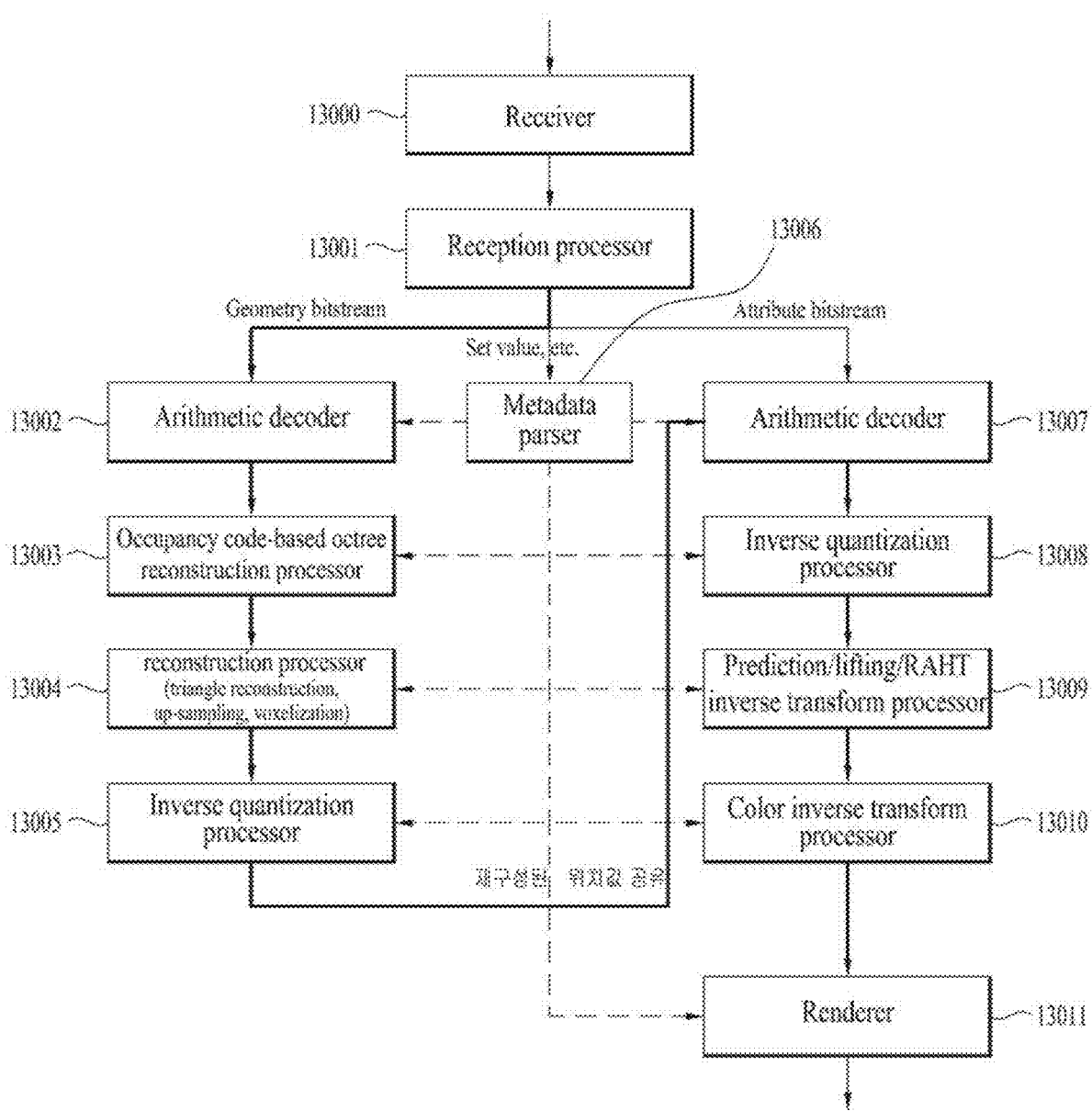
FIG. 13 illustrates an exemplary reception device according to embodiments.

FIG. 13 illustrates an exemplary reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same or similar to the operation and/or inverse quantization method of the inverse quantizer 11006.

The prediction/lifting/RAHT inverse transformer 13009 according to the embodiments may process the reconstructed geometry and the inverse quantized attributes. The prediction/lifting/RAHT inverse transform processor 1301 performs one or more of operations and/or decoding the same or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same or similar to the operation and/or inverse transform coding of the color inverse transformer 11010. The renderer 13011 according to the embodiments may render the point cloud data.

Figure 14:
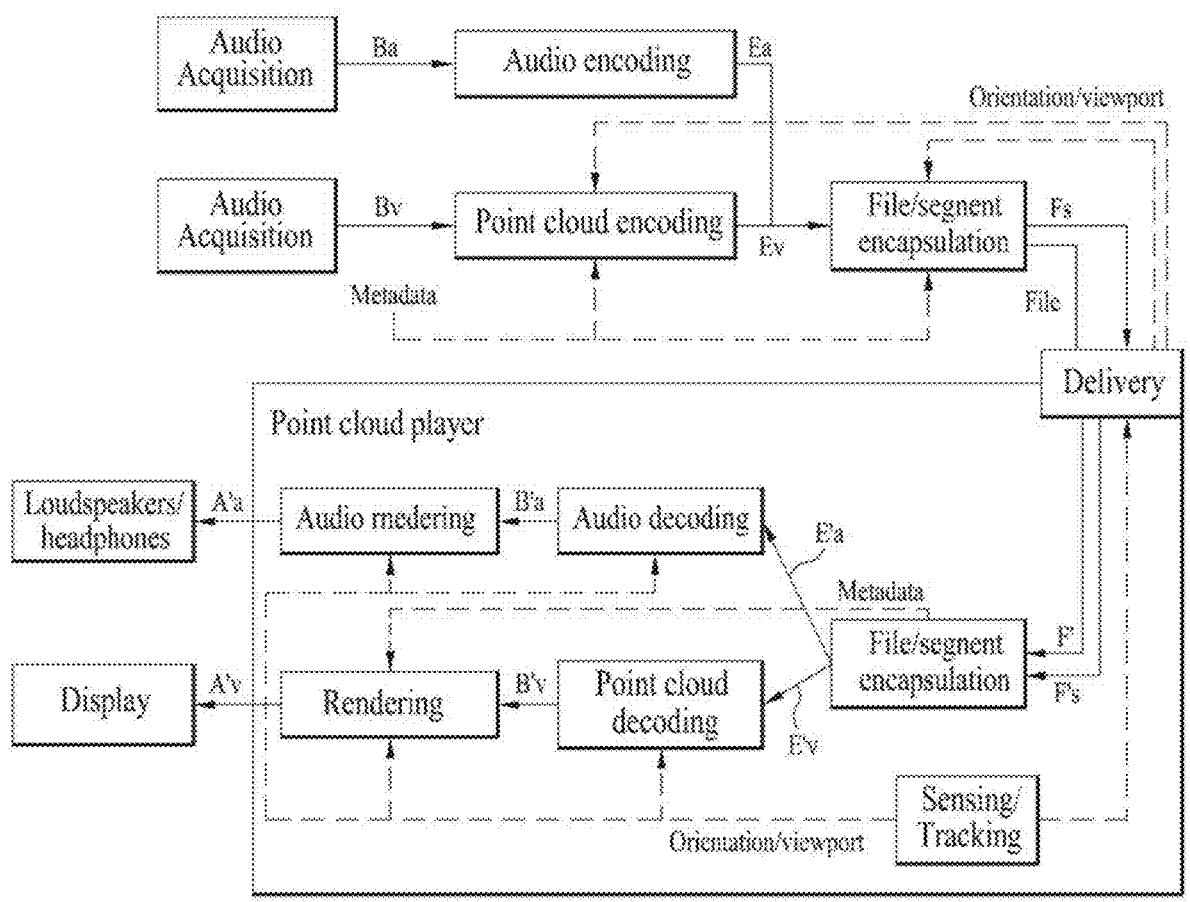
FIG. 14 illustrates an architecture for streaming G-PCC-based point cloud data according to embodiments.

FIG. 14 illustrates an architecture for streaming G-PCC-based point cloud data according to embodiments.

The upper part of FIG. 14 shows a process of processing and transmitting point cloud content by the transmission device described in FIGS. 1 to 13 (for example, the transmission device 10000, the transmission device of FIG. 12, etc.).

As described with reference to FIGS. 1 to 13, the transmission device may acquire audio Ba of the point cloud content (Audio Acquisition), encode the acquired audio (Audio Encoding), and output an audio bitstream Ea. In addition, the transmission device may acquire a point cloud (or point cloud video) By of the point cloud content (Point Acquisition), and perform point cloud encoding on the acquired point cloud to output a point cloud video bitstream Eb. The point cloud encoding of the transmission device is the same or similar to the point cloud encoding described with reference to FIGS. 1 to 13 (for example, the encoding of the point cloud encoder of FIG. 4), and thus a detailed description thereof will be omitted.

The transmission device may encapsulate the generated audio bitstream and video bitstream into a file and/or a segment (File/segment encapsulation). The encapsulated file and/or segment Fs, File may include a file in a file format such as ISOBMFF or a DASH segment. Point cloud-related metadata according to embodiments may be contained in the encapsulated file format and/or segment. The metadata may be contained in boxes of various levels on the ISOBMFF file format, or may be contained in a separate track within the file. According to an embodiment, the transmission device may encapsulate the metadata into a separate file. The transmission device according to the embodiments may deliver the encapsulated file format and/or segment over a network. The processing method for encapsulation and transmission by the transmission device is the same as that described with reference to FIGS. 1 to 13 (for example, the transmitter 10003, the transmission step 20002 of FIG. 2, etc.), and thus a detailed description thereof will be omitted.

The lower part of FIG. 14 shows a process of processing and outputting point cloud content by the reception device (for example, the reception device 10004, the reception device of FIG. 13, etc.) described with reference to FIGS. 1 to 13.

According to embodiments, the reception device may include devices configured to output final audio data and final video data (e.g., loudspeakers, headphones, a display), and a point cloud player configured to process point cloud content (a point cloud player). The final data output devices and the point cloud player may be configured as separate physical devices. The point cloud player according to the embodiments may perform geometry-based point cloud compression (G-PCC) coding, video-based point cloud compression (V-PCC) coding and/or next-generation coding.

The reception device according to the embodiments may secure a file and/or segment F', Fs' contained in the received data (for example, a broadcast signal, a signal transmitted over a network, etc.) and decapsulate the same (File/segment decapsulation). The reception and decapsulation methods of the reception device is the same as those described with reference to FIGS. 1 to 13 (for example, the receiver 10005, the reception unit 13000, the reception processing unit 13001, etc.), and thus a detailed description thereof will be omitted.

The reception device according to the embodiments secures an audio bitstream E'a and a video bitstream E'v contained in the file and/or segment. As shown in the figure, the reception device outputs decoded audio data B'a by performing audio decoding on the audio bitstream, and renders the decoded audio data (audio rendering) to output final audio data A'a through loudspeakers or headphones.

Also, the reception device performs point cloud decoding on the video bitstream E'v and outputs decoded video data B'v. The point cloud decoding according to the embodiments is the same or similar to the point cloud decoding described with reference to FIGS. 1 to 13 (for example, decoding of the point cloud decoder of FIG. 11), and thus a detailed description thereof will be omitted. The reception device may render the decoded video data and output final video data through the display.

The reception device according to the embodiments may perform at least one of decapsulation, audio decoding, audio rendering, point cloud decoding, and point cloud video rendering based on the transmitted metadata. The details of the metadata are the same as those described with reference to FIGS. 12 to 13, and thus a description thereof will be omitted.

As indicated by a dotted line shown in the figure, the reception device according to the embodiments (for example, a point cloud player or a sensing/tracking unit in the point cloud player) may generate feedback information (orientation, viewport). According to embodiments, the feedback information may be used in a decapsulation process, a point cloud decoding process and/or a rendering process of the reception device, or may be delivered to the transmission device. Details of the feedback information are the same as those described with reference to FIGS. 1 to 13, and thus a description thereof will be omitted.

Figure 15:
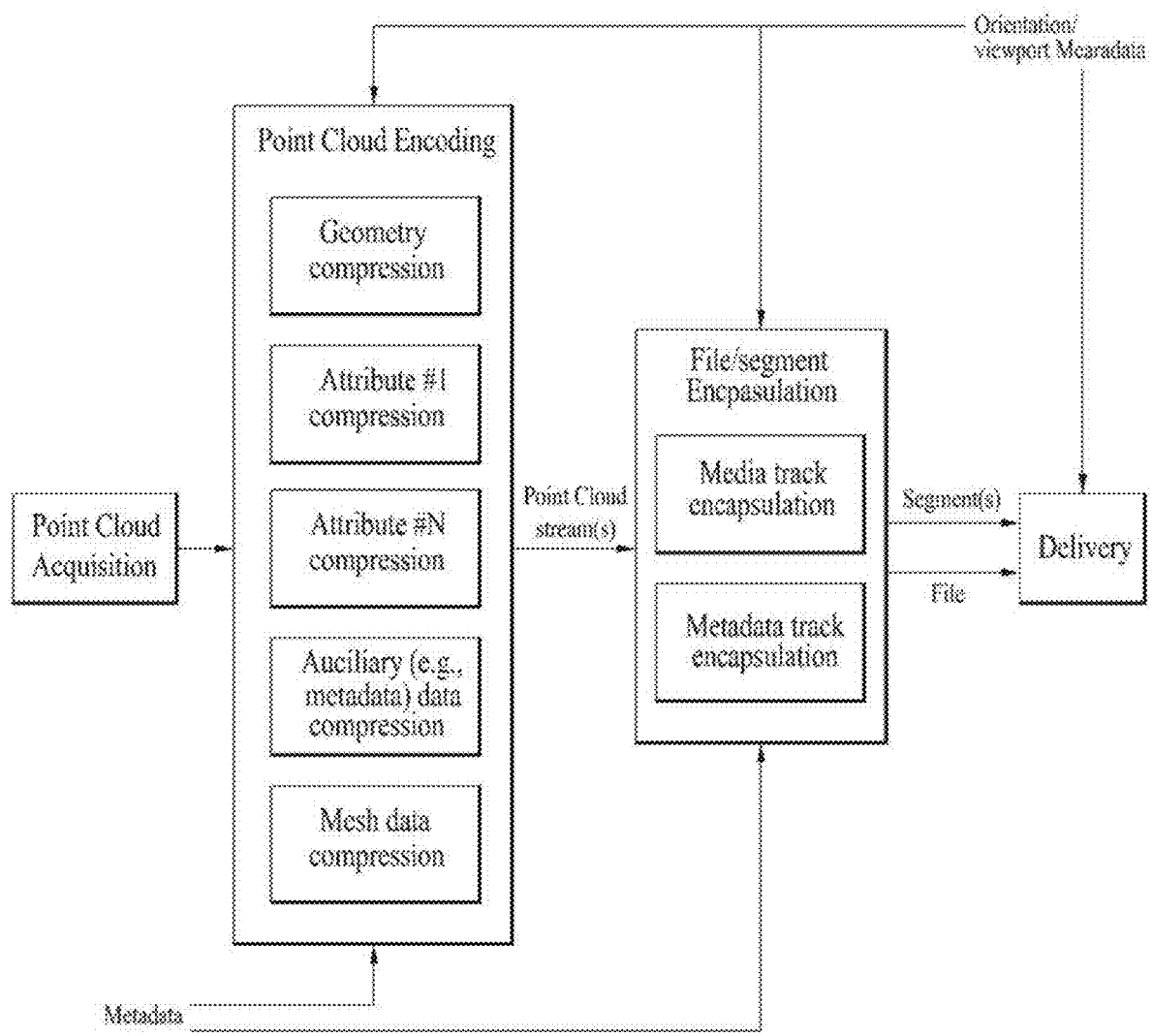
FIG. 15 illustrates an exemplary point cloud transmission device according to embodiments.

FIG. 15 shows an exemplary transmission device according to embodiments.

The transmission device of FIG. 15 is a device configured to transmit point cloud content, and corresponds to an example of the transmission device described with reference to FIGS. 1 to 14 (e.g., the transmission device 10000 of FIG. 1, the point cloud encoder of FIG. 4, the transmission device of FIG. 12, the transmission device of FIG. 14). Accordingly, the transmission device of FIG. 15 performs an operation that is identical or similar to that of the transmission device described with reference to FIGS. 1 to 14.

The transmission device according to the embodiments may perform one or more of point cloud acquisition, point cloud encoding, file/segment encapsulation and delivery.

Since the operation of point cloud acquisition and delivery illustrated in the figure is the same as the operation described with reference to FIGS. 1 to 14, a detailed description thereof will be omitted.

As described above with reference to FIGS. 1 to 14, the transmission device according to the embodiments may perform geometry encoding and attribute encoding. The geometry encoding may be referred to as geometry compression, and the attribute encoding may be referred to as attribute compression. As described above, one point may have one geometry and one or more attributes. Accordingly, the transmission device performs attribute encoding on each attribute. The figure illustrates that the transmission device performs one or more attribute compressions (attribute #1 compression, . . . , attribute #N compression). In addition, the transmission device according to the embodiments may perform auxiliary compression. The auxiliary compression is performed on the metadata. Details of the metadata are the same as those described with reference to FIGS. 1 to 14, and thus a description thereof will be omitted. The transmission device may also perform mesh data compression. The mesh data compression according to the embodiments may include the trisoup geometry encoding described with reference to FIGS. 1 to 14.

The transmission device according to the embodiments may encapsulate bitstreams (e.g., point cloud streams) output according to point cloud encoding into a file and/or a segment. According to embodiments, the transmission device may perform media track encapsulation for carrying data (for example, media data) other than the metadata, and perform metadata track encapsulation for carrying metadata. According to embodiments, the metadata may be encapsulated into a media track.

As described with reference to FIGS. 1 to 14, the transmission device may receive feedback information (orientation/viewport metadata) from the reception device, and perform at least one of the point cloud encoding, file/segment encapsulation, and delivery operations based on the received feedback information. Details are the same as those described with reference to FIGS. 1 to 14, and thus a description thereof will be omitted.

Figure 16:
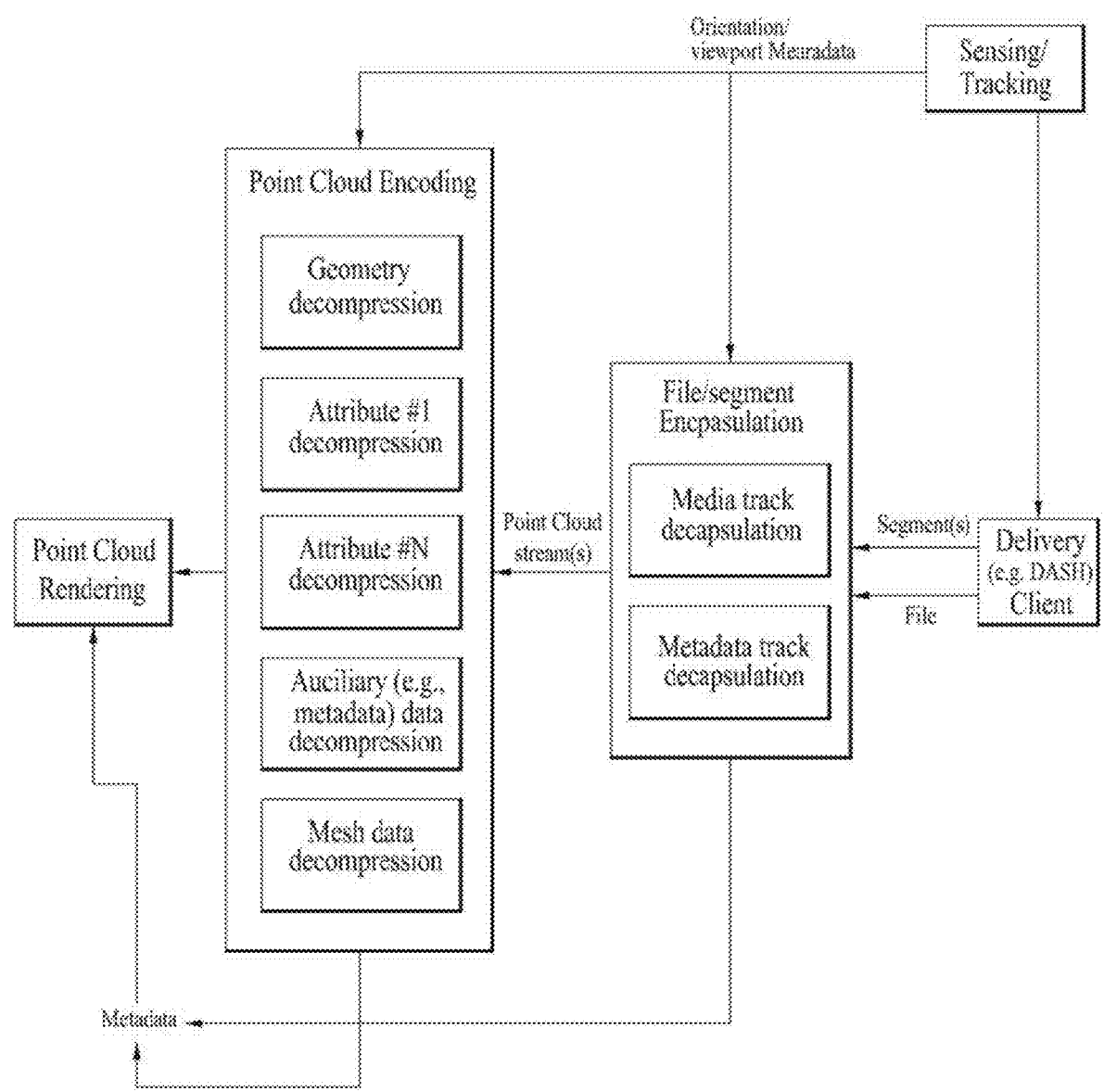
FIG. 16 illustrates an exemplary point cloud reception device according to embodiments.

FIG. 16 shows an exemplary reception device according to embodiments.

The reception device of FIG. 16 is a device for receiving point cloud content, and corresponds to an example of the reception device described with reference to FIGS. 1 to 14 (for example, the reception device 10004 of FIG. 1, the point cloud decoder of FIG. 11, and the reception device of FIG. 13, the reception device of FIG. 14). Accordingly, the reception device of FIG. 16 performs an operation that is identical or similar to that of the reception device described with reference to FIGS. 1 to 14. The reception device of FIG. 16 may receive a signal transmitted from the transmission device of FIG. 15, and perform the opposite process of the operation of the transmission device of FIG. 15.

The reception device according to the embodiments may perform at least one of delivery, file/segment decapsulation, point cloud decoding, and point cloud rendering.

Since the point cloud reception and point cloud rendering operations illustrated in the figure are the same as those described with reference to FIGS. 1 to 14, a detailed description thereof will be omitted.

As described with reference to FIGS. 1 to 14, the reception device according to the embodiments decapsulate the file and/or segment acquired from a network or a storage device. According to embodiments, the reception device may perform media track decapsulation for carrying data (for example, media data) other than the metadata, and perform metadata track decapsulation for carrying metadata. According to embodiments, in the case where the metadata is encapsulated into a media track, the metadata track decapsulation is omitted.

As described with reference to FIGS. 1 to 14, the reception device may perform geometry decoding and attribute decoding on bitstreams (e.g., point cloud streams) secured through decapsulation. The geometry decoding may be referred to as geometry decompression, and the attribute decoding may be referred to as attribute decompression. As described above, one point may have one geometry and one or more attributes, each of which is encoded by the transmission device. Accordingly, the reception device performs attribute decoding on each attribute. The figure illustrates that the reception device performs one or more attribute decompressions (attribute #1 decompression, . . . , attribute #N decompression). The reception device according to the embodiments may also perform auxiliary decompression. The auxiliary decompression is performed on the metadata. Details of the metadata are the same as those described with reference to FIGS. 1 to 14, and thus a disruption thereof will be omitted. The reception device may also perform mesh data decompression. The mesh data decompression according to the embodiments may include the trisoup geometry decoding described with reference to FIGS. 1 to 14. The reception device according to the embodiments may render the point cloud data that is output according to the point cloud decoding.

As described with reference to FIGS. 1 to 14, the reception device may secure orientation/viewport metadata using a separate sensing/tracking element, and transmit feedback information including the same to a transmission device (for example, the transmission device of FIG. 15). In addition, the reception device may perform at least one of a reception operation, file/segment decapsulation, and point cloud decoding based on the feedback information. Details are the same as those described with reference to FIGS. 1 to 14, and thus a description thereof will be omitted.

Figure 17:
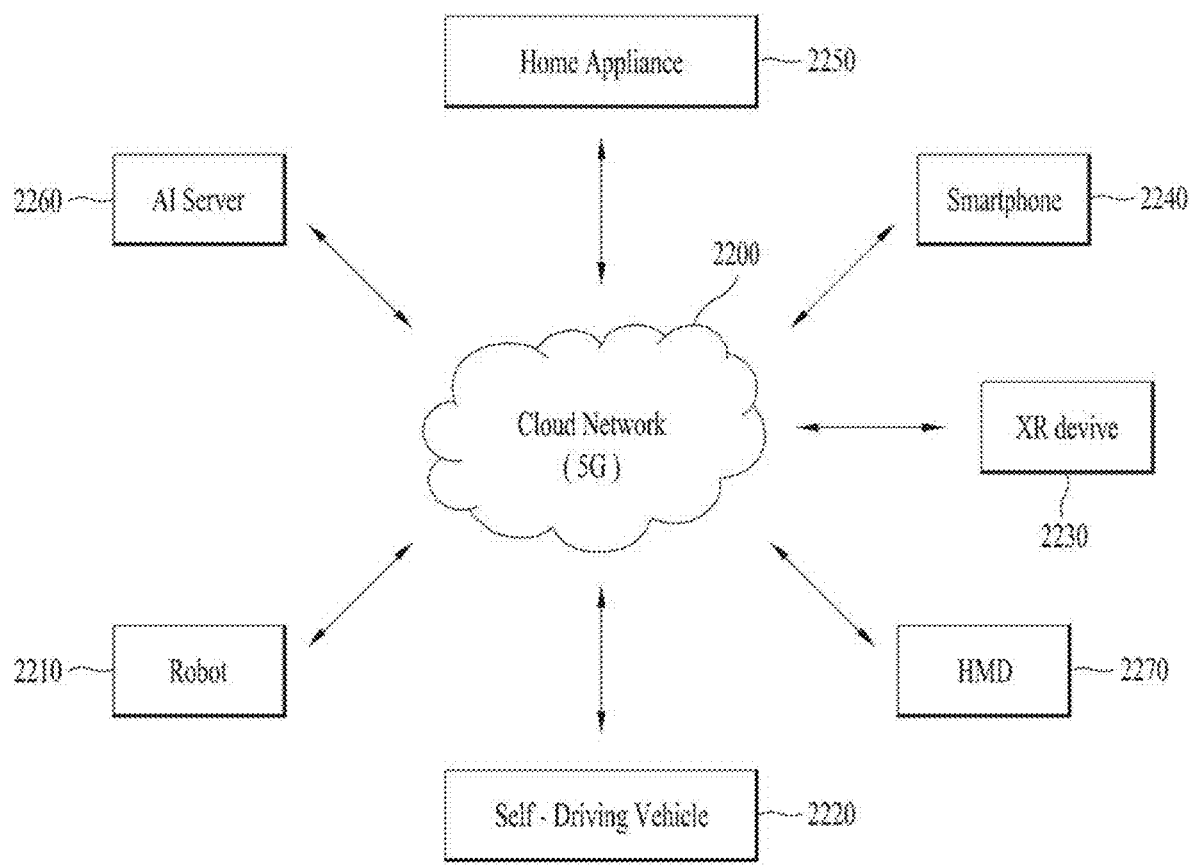
FIG. 17 shows an exemplary structure operatively connectable with a method/device for transmitting and receiving point cloud data according to embodiments.

FIG. 17 shows an exemplary structure operatively connectable with a method/device for transmitting and receiving point cloud data according to embodiments.

The structure of FIG. 17 represents a configuration in which at least one of a server 1760, a robot 1710, a self-driving vehicle 1720, an XR device 1730, a smartphone 1740, a home appliance 1750, and/or an HMD 1770 is connected to a cloud network 1700. The robot 1710, the self-driving vehicle 1720, the XR device 1730, the smartphone 1740, or the home appliance 1750 is referred to as a device. Further, the XR device 1730 may correspond to a point cloud data (PCC) device according to embodiments or may be operatively connected to the PCC device.

The cloud network 1700 may represent a network that constitutes part of the cloud computing infrastructure or is present in the cloud computing infrastructure. Here, the cloud network 1700 may be configured using a 3G network, 4G or Long Term Evolution (LTE) network, or a 5G network.

The server 1760 may be connected to at least one of the robot 1710, the self-driving vehicle 1720, the XR device 1730, the smartphone 1740, the home appliance 1750, and/or the HMD 1770 over the cloud network 1700 and may assist at least a part of the processing of the connected devices 1710 to 1770.

The HMD 1770 represents one of the implementation types of the XR device and/or the PCC device according to the embodiments. According to embodiments, an HMD type device includes a communication unit, a control unit, a memory, an I/O unit, a sensor unit, and a power supply unit.

Hereinafter, various embodiments of the devices 1710 to 1750 to which the above-described technology is applied will be described. The devices 1710 to 1750 illustrated in FIG. 17 may be operatively connected/coupled to a point cloud data transmission/reception device according to the above-described embodiments.

<PCC+XR>

The XR/PCC device 1730 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1730 may analyze 3D point cloud data or image data acquired through various sensors or from an external device and generate position data and attribute data about 3D points. Thereby, the XR/PCC device 1730 may acquire information about the surrounding space or a real object, and render and output an XR object. For example, the XR/PCC device 1730 may match an XR object including auxiliary information about a recognized object with the recognized object and output the matched XR object.

<PCC+Self-Driving+XR>

The self-driving vehicle 1720 may be implemented as a mobile robot, a vehicle, an unmanned aerial vehicle, or the like by applying the PCC technology and the XR technology.

The self-driving vehicle 1720 to which the XR/PCC technology is applied may represent an autonomous vehicle provided with means for providing an XR image, or an autonomous vehicle that is a target of control/interaction in the XR image. In particular, the self-driving vehicle 1720, which is a target of control/interaction in the XR image, may be distinguished from the XR device 1730 and may be operatively connected thereto.

The self-driving vehicle 1720 having means for providing an XR/PCC image may acquire sensor information from the sensors including a camera, and output the generated XR/PCC image based on the acquired sensor information. For example, the self-driving vehicle 1720 may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 18:
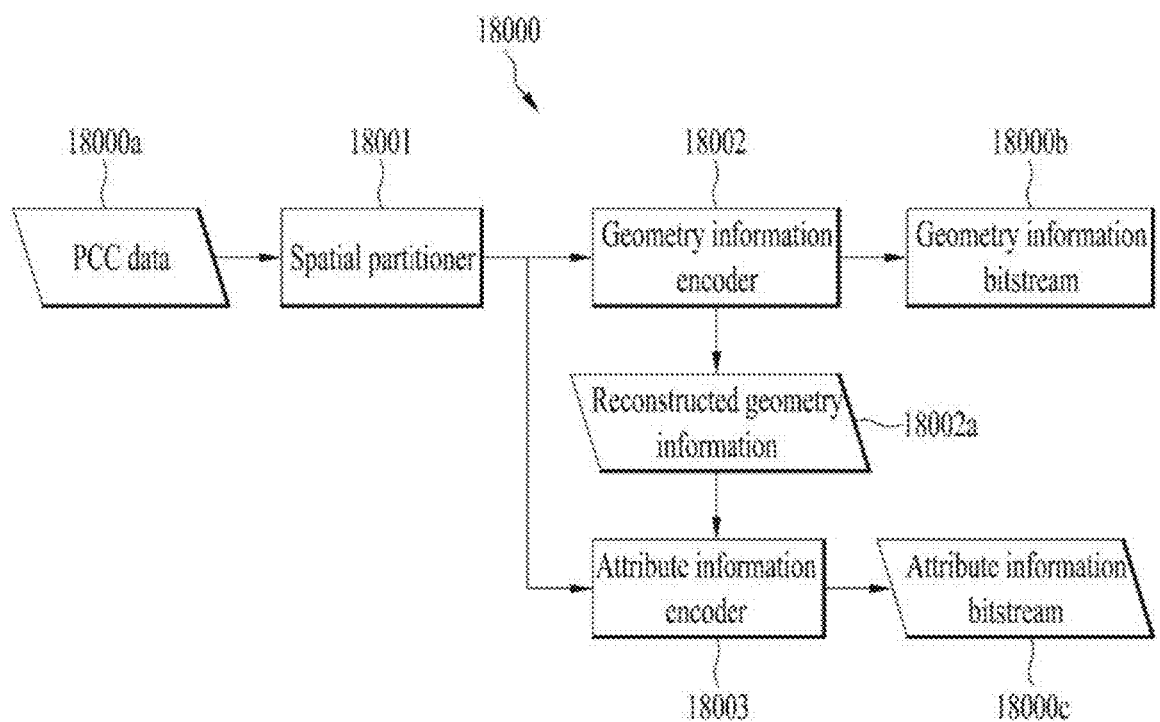
FIG. 18 illustrates a point cloud encoder according to embodiments.

FIG. 18 illustrates a point cloud data encoder according to embodiments.

A point cloud encoder 18000 according to the embodiments receives and encodes point cloud data (PCC data) 18000$a$. The point cloud encoder according to the embodiments outputs a geometry information bitstream 18000$b$ and an attribute information bitstream 18000$c$. The point cloud encoder 18000 according to the embodiments may include a spatial partitioner 18001, a geometry information encoder 18002 and/or an attribute information encoder 18003.

The spatial partitioner 18001 of the point cloud encoder may receive the point cloud data (PCC data) 18000$a$, and partition the point cloud data into one or more 3D spaces. The spatial partitioner 18001 may receive point cloud data and spatially partition the point cloud data into 3D blocks.

The point cloud data may contain geometry information and/or attribute information about a point (or points). The spatial partitioner 18001 may spatially partition the point cloud data (PCC data) based on a bounding box and/or a sub-bounding box. The method/device according to the embodiments may perform encoding/decoding based on a partitioned unit (box).

The spatial partitioner 18001 may perform some/all of the point cloud acquisition 10001 of FIG. 1, the acquisition 20000 of FIG. 2, the operations of FIGS. 3 to 5, and the operation of the data input unit 12000 of FIG. 12.

The geometry information encoder 18002 receives geometry information of the point cloud data (PCC data) according to embodiments and encodes the same. The geometry information may represent position information about the points included in the point cloud data. The geometry information encoder 18002 encodes the geometry information and outputs a geometry information bitstream. The geometry information encoder 18002 may reconstruct position information about the points and output the reconstructed geometry information 18002a. The geometry information encoder 18002 may transmit the reconstructed geometry information to the attribute information encoder 18002.

The geometry information encoder 18002 may perform some/all of the operation of the point cloud video encoder 10002 of FIG. 1, the operation of the encoding 20001 of FIG. 2, the operations of the coordinate transformer 40000, the quantizer 40001, and the octree analyzer 40002, the surface approximation analyzer 40003, the arithmetic encoder 40004, and the geometry reconstructor 40005 of FIG. 4, and the operations of the quantization processor 12001, the voxelization processor 12002, the octree occupancy code generator 12003, the surface model processor 12004, the intra/inter-coding processor 12005, and/or the arithmetic coder 12006 of FIG. 12.

The attribute information encoder 18003 may receive attribute information of the point cloud data according to embodiments, and encode the attribute information based on the reconstructed geometry information received from the geometry information encoder 18003. The attribute information encoder 18003 encodes the attribute information and outputs an attribute information bitstream 18000c. The attribute information encoder 18003 may perform, for example, prediction transform, lifting transform, and/or region adaptive hierarchical transform (RAHT) according to embodiments. The attribute information encoder 18003 may perform, for example, prediction lifting transform. The prediction lifting transform may mean a combination of some or all of the detailed operations of the prediction transform and/or the lifting transform according to the embodiments.

The point cloud encoder according to the embodiments may perform some, all and/or a combination of prediction transform, lifting transform, and/or RAHT according to the embodiments.

The attribute information encoder 18003 may perform some/all of the operation of the point cloud video encoder 10002 of FIG. 1, the operation of the encoding 20001 of FIG. 2, the operations of the color transformer 40006, attribute transformer 40007, RATH transformer 40008, LOD generator 40009, lifting transformer 40010, coefficient quantizer 40011, and/or arithmetic encoder 40012 of FIG. 4, the operations of the color transform processor 12008, attribute transform processor 12009, prediction/lifting/RAHT transform processor 12010 and arithmetic coder 12011 of FIG. 12.

Here, the reconstructed geometry information 18002c may represent an octree reconstructed by the geometric reconstructor (Reconstruct geometry) 40005 described with reference to FIG. 4 and/or an approximated octree. The reconstructed geometry information may represent the occupancy code described with reference to FIG. 6 or represent an octree structure. The reconstructed geometry information may represent an octree occupancy code generated by the octree occupancy code generator 12003 described with reference to FIG. 12.

The attribute information encoder 18003 may encode the attribute information of the point cloud data according to embodiments. Here, the encoder 18003 according to the embodiments may encode the attribute information based on the reconstructed geometry information according to the embodiments. The attribute information encoder 18003 may generate a bitstream containing the attribute information by encoding the received data.

The attribute information encoder 18003 according to the embodiments may include the color transformer 40006, the attribute transformer 40007, the RAHT transformer 40008, the LOD generator 40009, the lifting transformer 40010, and the coefficient quantizer 40011, and/or the arithmetic encoder 400012 of FIG. 4.

The point cloud data includes geometry information indicating the position of each point and attribute information indicating the attribute (attribute) of each point. Since the point cloud data may be non-uniformly distributed in a 3D space, an octree structure according to embodiments is used to efficiently compress the point cloud data. That is, the encoder according to the embodiments generates an octree and encodes attribute information based on the generated octree. A method of encoding the attribute information according to embodiments may be carried out based on region adaptive hierarchical transform (RAHT) and level of detail (LoD).

RAHT-based attribute encoding according to embodiments is performed using the transformation matrix described with reference to FIG. 9. The coefficients used in the transformation matrix are calculated according to the level in the octree structure and are therefore dependent on the octree structure. Since encoding of the octree structure (i.e., geometry encoding) is required to perform RAHT-based attribute encoding, unnecessary delay may occur in a system requiring high-speed processing.

Also, in LoD-based attribute encoding according to embodiments, a nearest neighbor search process of searching for neighbor points at a specific point is performed. Although accurate neighbor points can be searched for in the nearest neighbor search process, the time required for the search process is relatively long. Accordingly, unnecessary delay may occur in a system requiring high-speed processing.

Accordingly, the encoder according to the embodiments generates a colorized octree by matching the attribute and/or position information about a point to nodes of the octree, and performs attribute encoding based on the colorized octree. The encoder according to the embodiments may perform attribute encoding with a small amount of computation based on the colorized octree. The transmission device according to the embodiments may transmit signaling information related to the colorized octree to the reception device. The reception device may secure the signaling information related to the colorized octree and generate a colorized octree. Since the decoder according to the embodiments may perform attribute decoding and geometry decoding simultaneously based on the colorized octree, thereby preventing unnecessary delay in providing point cloud data. Also, since the decoder according to the embodiments processes the encoded attribute based on the colorized octree, it performs the attribute decoding with a smaller amount of computation. The reception device according to the embodiments may render or output content having various levels of resolution according to the performance of the reception device (e.g., renderer performance, output performance, etc.) based on the colorized octree. The process of generating a colorized octree by colorizing an octree according to embodiments and transmitting the colorized octree will be described below.

FIG. 19 illustrates an octree and a colorized octree according to embodiments.

The point cloud data encoder according to the embodiments may generate an octree according to the embodiments, and generate a colorized octree using the generated octree. FIG. 19 illustrates a method of generating a colorized octree.

The colorized octree refers to a colorized octree structure in which attribute information is included in one or more nodes included in the octree. That is, the colorized octree may refer to a structure that indicates position information about points using the octree structure and includes attribute information matched to the corresponding position.

FIG. 19(A) shows an octree structure according to embodiments. The octree structure refers to a data structure indicating position information about points. The octree structure represents the octree described with reference to FIGS. 5 to 6.

An octree structure consists of a k-ary tree including one or more nodes. As described with reference to FIGS. 5 and 6, the octree structure indicates occupancy of points in a three-dimensional space with 0 and 1. The octree structure includes one root node 19000a. The root node 19000a includes eight child nodes 19000b-1 to 19000b-2. A child node is assigned 0 or 1 depending on whether points are occupied in the 3D space. The eight child nodes may be referred to as level 1 nodes. Some of the eight child nodes may further include sub-child nodes.

The octree structure includes nodes of the lowest level, that is, one or more leaf nodes 19000c-1 to 19000c-2. A leaf node corresponds to a three-dimensional space (i.e., voxel) that is not divided anymore.

The octree structure shown in FIG. 19(A) may be generated by the geometry information encoder 18002 of FIG. 18 or by the geometry reconstructor 11003 of FIG. 11. The octree structure shown in FIG. 19(A) includes only position information about points in a three-dimensional space. The leaf nodes in the octree structure use 0 and 1 only to indicate whether a point is present in the space in a voxel unit.

FIG. 19(B) illustrates matching attribute information to the leaf nodes of an octree structure. Since the leaf nodes in the octree structure indicate only presence/absence of a point in the space in a voxel unit, the encoder according to the embodiments may match the attribute information corresponding to the space in the voxel unit to a corresponding leaf node.

For example, in FIG. 19(A), one leaf node 19000c-1 does not have a point in the corresponding voxel, and accordingly the encoder according to the embodiments does not need to match attribute information to the leaf node (19001-1). However, the other leaf node 19000c-2 in FIG. 19(A) has one or more points in the voxel. Accordingly, the encoder according to the embodiments may match attribute information representing the one or more points to the leaf node (19001a-2). Matching attribute information to a leaf node may be understood as inputting the value of the leaf node to the corresponding attribute information.

Hereinafter, an operation of matching geometry information and/or attribute information to one or more nodes in the octree structure may be referred to as colorizing. That is, the operation of matching geometry information and/or attribute information to a specific node (including leaf nodes) in the octree structure may be expressed as colorizing the specific node. For example, an operation of matching geometry information and/or attribute information to a leaf node in the octree structure may be expressed as colorizing the leaf node. Also, an operation of matching geometry information and/or attribute information to the root node in the octree may be expressed as colorizing the root node.

For example, when one point is present in a voxel, the encoder according to the embodiments may match attribute information about the corresponding point to a leaf node corresponding to the voxel. For example, when multiple points are present in the voxel, the encoder according to embodiments may match attribute information (e.g., average information, etc.) representing the multiple points to the leaf node.

FIG. 19(C) illustrates a process of generating a colorized octree using an octree in which attribute information is matched to a leaf node. In FIG. 19(B), the encoder matches some data of the attribute information matched to a leaf node to nodes other than the leaf nodes in the octree. For example, in FIG. 19(C), when the attribute information represented in the entire point cloud data is C2, C2 may be matched to the root node 19002a.

When attribute information is matched to nodes other than the leaf nodes, the matched attribute information may be included in duplicate in one of the leaf nodes 19002b-1 and 19002b-2, and accordingly the encoder according to the embodiments may further remove a leaf node having the duplicate information.

As attribute information is encoded by generating a colorized octree, the encoder according to the embodiments may perform attribute encoding even without fully encoding the octree structure. Therefore, the issue of unnecessary delay occurring in a system requiring high-speed processing may be addressed. In addition, as the encoder according to the embodiments generates a colorized octree using an octree structure, the process for searching for a peripheral point may be performed faster than the LoD-based attribute coding. Accordingly, the transmission terminal according to the embodiments may compress the attribute information based on a small amount of computation.

Also, the point cloud data reception device (or decoder) according to the embodiments performs decoding using a colorized octree. Accordingly, it may perform attribute decoding even without fully decoding the attribute information. Thereby, scalable decoding may be implemented. That is, receivers of various performances may be supported based on one compressed bitstream using the colorized octree according to the embodiments. For example, when the transmission device according to the embodiments compresses information targeting decoders of various performances, receivers of various performances may be supported by one bitstream instead of generating or storing independent compression information suitable for each decoder performance. Accordingly, efficiency may be increased in terms of storage space of the transmitter and bits. Further, when the transmission bandwidth is limited, the transmitter may generate and transmit low-resolution point cloud data.

Hereinafter, examples of the structure and operation of the encoder according to the embodiments for generating a colorized octree will be described in detail.

Figure 20:
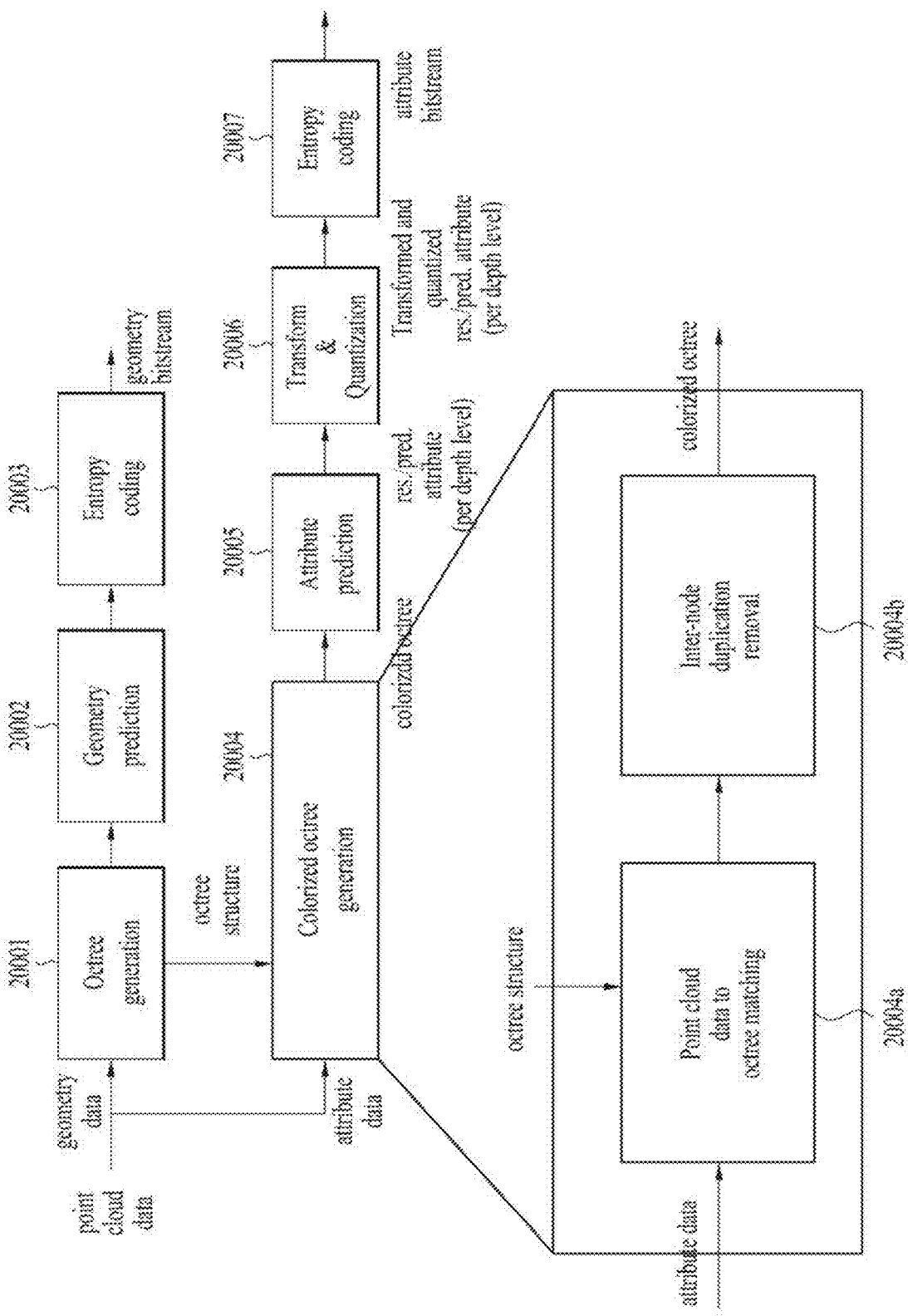
FIG. 20 illustrates a point cloud data encoder according to embodiments.

FIG. 20 illustrates a point cloud data encoder according to embodiments.

After encoding received point cloud data, a point cloud data encoder 20000 according to the embodiments outputs a geometry bitstream and an attribute bitstream. The point cloud data encoder 20000 according to the embodiments includes an octree generator (Octree generation) 20001, a geometry predictor (Geometry prediction) 20002, a geometry entropy coder (Entropy coding) 20003, an octree matcher (Octree matching) 20004, a colorized octree generator (Colorized octree generation) 20004, an attribute predictor (Attribute prediction) 20005, a transform & quantization unit (Transform & Quantization) 20006, and an attribute entropy coder (Entropy coding) 20007.

The point cloud data according to the embodiments may refer to the PCC data 18000a of FIG. 18 or data partitioned by the spatial partitioner 18001. The point cloud data includes geometry data and attribute data. The geometry data is information representing position information about point cloud data. The attribute data is information representing attribute information about the point cloud data.

The geometry bitstream corresponds to the geometry bitstream 18000b of FIG. 18. The attribute bitstream corresponds to the attribute information bitstream 18000c of FIG. 18.

The octree generator 20001 receives geometry data according to embodiments. The octree generator 20001 generates an octree structure for position information about points based on the geometry data. The octree structure refers to the octree structure described with reference to FIGS. 5 and 6. The octree generator 20001 delivers the generated octree structure to the geometry predictor 19002 and/or the octree matcher 20004. The octree generator 20001 may be included in the geometry information encoder 18002 of FIG. 18, and may represent the geometry reconstructor 11003 of FIG. 11.

The geometry predictor 20002 according to the embodiments predicts the geometry information using the octree according to the embodiments.

According to embodiments, as a method of detecting a neighbor node, the transmission device may perform prediction based on position adjacency between child nodes in a certain range from a specific point. For example, the transmission device or the reception device may assume that sub-nodes from the same parent node are adjacent to each other in the octree structur. Also, the transmission device or the reception device may assume that predicted values of the adjacent child nodes are similar to each other. Therefore, the reception device predicts the attribute data of the parent node by defining sibling nodes having the same parent node to have the same predicted attribute value, rather than deriving a predicted attribute value for each child node. This configuration may reduce the number of coefficients required for encoding of each child node, thereby increasing coding efficiency for the transmission device and reception device. Also, the predicted attribute value may serve as a representative value for each parent node. Thereby, attributes matched to the octree structure may be predicted.

$$p_{l-1}(x,y,z)=p_l(\lfloor x/2 \rfloor, \lfloor y/2 \rfloor, \lfloor z/2 \rfloor)$$

According to embodiments, the transmission device may obtain the attribute prediction error for each child node based on the prediction information as disclosed below. The attribute prediction error means a difference between original attribute data and predicted attribute data. Depending on the purpose of the attribute prediction error, other methods (e.g., weighted difference, weighted averaged difference, etc) may be used.

$$r_l(x,y,z)=g\{c_l(x,y,z),p_l(x,y,z)\}=c_l(x,y,z)-p_l(x,y,z)$$

The geometry entropy coder 20003 according to the embodiments performs entropy coding on the predicted geometry information according to the embodiments and outputs a geometry bitstream.

The colorized octree generator 20004 according to embodiments receives the octree structure generated by the octree generator 20001 and attribute data and generates a colorized octree. The colorized octree generator 20004 may generate the colorized octree according to the operation described with reference to FIG. 21. The octree structure generated by the octree generator 20001 may be the octree structure shown in FIG. 19(A).

The colorized octree generator 20004 may include, for example, an octree matcher 20004a and/or an inter-node duplication remover (inter-node duplication removal) 24000b.

The octree matcher 20004a may receive the octree structure and attribute data, and match the attribute data with leaf nodes of the octree structure. The octree matcher 20004a may match the attribute data with nodes other than the leaf nodes using the octree matched to the leaf nodes. For example, the octree matcher 20004 may generate an octree structure in which attribute information is matched to leaf nodes, as shown in FIG. 19(B), and may match attribute information to nodes other than the leaf nodes using the octree structure in which the attribute information is matched to the leaf nodes, as shown in FIG. 19(C). That is, the octree matcher 20004 generates a colorized octree by matching attribute data to nodes of the octree structure.

The inter-node duplication remover 20004b receives the colorized octree according to the embodiments and removes duplicate data included in the colorized octree. For example, as shown in FIG. 19(C), when duplicate data is included in the leaf node and nodes other than the leaf nodes, the inter-node duplication remover 20004b may remove the duplicate data (19002b-1). The inter-node duplication remover 20004b generates a colorized octree without the duplicate data and outputs the same.

The attribute predictor 20005 receives the colorized octree according to the embodiments and predicts necessary attribute information. The attribute predictor 20005 generates residual attribute information or predicted attribute information for each depth level.

The transform & quantization unit 20006 receives the predicted attribute data or residual attribute data generated by the attribute prediction unit 20005, and transform and quantizes the same.

The attribute entropy coder 20007 entropy-codes the transformed and quantized attribute information according to the embodiments and outputs an attribute bitstream.

By generating a colorized octree and transmitting attribute information, the encoder according to the embodiments may perform attribute encoding without fully encoding the octree structure. Thereby, the issue of unnecessary delay in a system requiring high-speed processing may be addressed, and the attribute information may be compressed based on a small amount of computation.

The colorized octree is a structure that indicates position information about points using the octree structure and includes attribute information matched to the corresponding position. In addition, in the colorized octree, attribute information is distributed among the nodes, rather than being limited to the leaf nodes. Accordingly, the decoder according to the embodiments may perform decoding adaptively according to the performance of the decoder while sequentially traversing the geometry information and attribute information from the root node to the leaf node in the colorized octree. That is, as the point cloud data reception device (or decoder) according to the embodiments receives a colorized octree, it may decode the attribute information without fully decoding the attribute information, thereby implementing scalable decoding. In addition, the colorized octree may support receivers of various performances because the attribute information is matched to nodes according to decoder performance.

The operation of the colorized octree generator 20004 according to the embodiments will be described in detail below.

Figure 21:
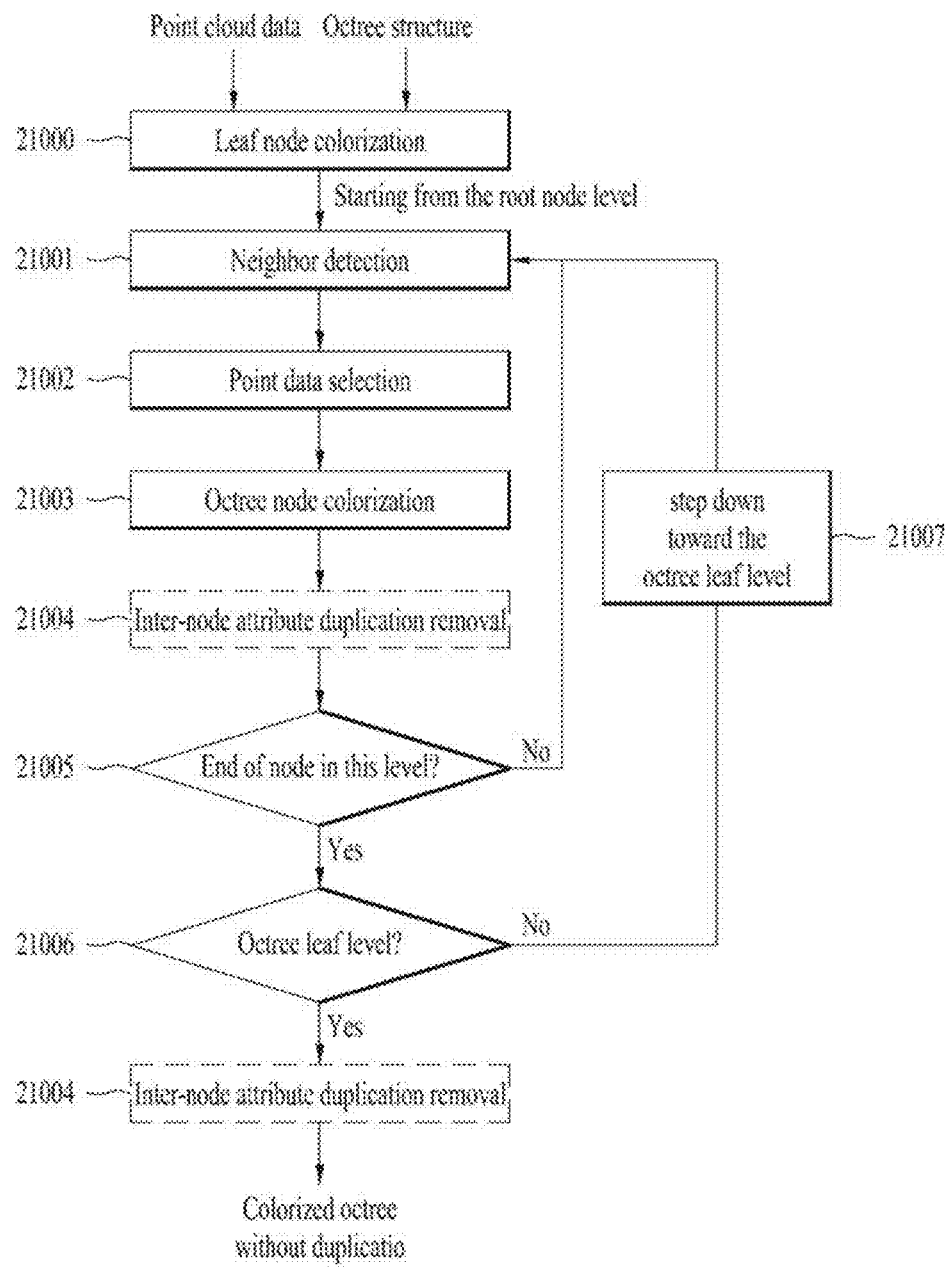
FIG. 21 illustrates a process of generating a colorized octree according to embodiments.

FIG. 21 illustrates a process in which a point cloud data transmission device generates a colorized octree according to embodiments.

The process of generating the colorized octree illustrated in FIG. 21 may be performed by the colorized octree generator 20004 of FIG. 20.

Hereinafter, an operation of matching attribute information to one or more nodes in an octree structure may be referred to as colorizing. That is, the operation of matching attribute information to a specific node (including leaf nodes) in the octree structure may be expressed as colorizing the specific node. For example, an operation of matching attribute information to a leaf node in the octree structure may be expressed as colorizing the leaf node. Also, an operation of matching attribute information to the root node in the octree may be expressed as colorizing the root node.

The process of generating a colorized octree includes leaf node colorization 21000, neighbor detection 21001, point data selection 21002, octree node colorization 21003, and inter-node attribute duplication removal 21004.

In the colorized octree, attribute data is first matched to the root node. Then, in the process of generating a root node colorized octree, the leaf node colorization 21000, the neighbor detection 21001, the point data selection 21002, the octree node colorization 21003, and the inter-node attribute duplication removal 21004 may be performed. The process of generating the colorized octree may be performed for each of levels except for the level including the leaf node (21005 and 21006).

In the leaf node colorization 21000, attribute data and an octree structure of the point cloud data are received, and corresponding attribute data is matched to the leaf nodes in the octree structure.

In the neighbor detection 21001, points corresponding to neighbors of a specific point of point cloud data are detected. The neighbors of the specific point may be a set of neighbor points adjacent to the specific point. Neighbors may be defined based on the octree structure according to the embodiments. The neighbors based on the octree structure may be a set of points corresponding to sub-nodes of a parent node of a leaf node corresponding to the specific point. The parent node may be a node at a specific level higher than above the level of the corresponding leaf node. The specific level may be arbitrarily determined. Details of the neighbor detection will be described with reference to FIG. 23.

Specifically, for example, in order to match attribute data to a root node, the encoder needs to detect points corresponding to leaf nodes present in a node below the root node. Accordingly, to match attribute data to a root node, the encoder may take the parent node as the root node and detect points corresponding to leaf nodes included at a lower level than the parent node (root node).

For example, attribute information may need to be matched to a first node (a node other than the leaf nodes) included in a specific position of level 4. According to embodiments, neighbors of a point in a 3D space corresponding to level 4 needs to be detected. The parent node may be taken as the first node, and points corresponding to leaf nodes included in a lower level than the parent node (first node) may be detected. By detecting neighbor points in this way, the encoder according to the embodiments may implement a colorized octree in consideration of the distribution of attribute information of point cloud data.

In the point data selection 21002, a specific point (or attribute information about the specific point) is selected from among the points corresponding to the neighbors detected in the neighbor detection. The specific point is a point that may represent the points corresponding to the neighbors detected in the neighbor detection 21001. The encoder according to the embodiments may select a specific point using various methods. The encoder according to embodiments may select a specific point even within one 3D space using various methods. The encoder according to the embodiments may match the selected specific point to nodes (i.e., parent nodes) other than the leaf nodes in the octree structure.

For example, the specific point may be a point close to a position corresponding to the corresponding parent node. That is, the encoder according to the embodiments may select a leaf node corresponding to a point close to the position corresponding to the parent node.

For example, the specific point may be a point close to an average position of the points corresponding to the neighbors. That is, the encoder according to the embodiments may select a leaf node corresponding to a point close to the average position of the detected neighbors.

The encoder according to the embodiments may match the selected specific point to nodes (i.e., parent nodes) other than the leaf nodes in the octree structure. In addition, the encoder according to the embodiments may match attribute information about the selected specific point and information about the residual (e.g. point—Attr(x_n, y_n, z_n)) of the average attribute of the points corresponding to the neighbors to the parent node.

A process in which the encoder according to the embodiments selects a specific point will be described in detail with reference to FIG. 24.

In the octree node colorization 21003, the selected specific point according to the embodiments is matched to the parent node. Matching the selected specific point to the parent node may be referred to as colorizing the parent node.

In the inter-node attribute duplication removal 21004, duplicate data is removed from the attribute matched to the parent node and the leaf node in which the corresponding attribute information is present. According to embodiments, when the parent node is matched based on attribute information about the points corresponding to detected neighbors, duplicate data may be produced in the leaf node and the parent node. The encoder according to the embodiments may further remove such duplicate data.

The inter-node duplicate data removal 21004 according to the embodiments may be performed at the same time as matching attribute data to each node, or may be performed after the attribute data is matched to all nodes.

After performing the leaf node colorization 21000 on the octree structure, the encoder according to the embodiments may perform the steps of the neighbor detection 21001, the point data selection 21002, and the octree node colorization 21003 and the inter-node attribute duplication removal 21004 as follows.

1) Steps 21001 to 21004 are performed for the root node (a node corresponding to level 0), and attribute information is matched to the root node.

2) Steps 21001 to 21004 are performed for occupied nodes (i.e., nodes indicated by 1) among the child nodes (nodes corresponding to level 1) of the root node, and attribute information is matched to each node.

3) Steps 21001 to 21004 are recursively (or repeatedly) performed for the nodes below the occupied nodes (21007). When a node below the occupied nodes is a leaf node, the above-described steps 21001 to 21004 are not performed anymore (21006).

By generating a colorized octree and transmitting attribute information, the encoder according to the embodiments may perform attribute encoding without fully encoding the octree structure. Thereby, the issue of unnecessary delay in a system requiring high-speed processing may be addressed, and the attribute information may be compressed based on a small amount of computation.

The colorized octree is a structure that indicates position information about points using the octree structure and includes attribute information matched to the corresponding position. In addition, in the colorized octree, attribute information is distributed among the nodes, rather than being limited to the leaf nodes. Accordingly, the decoder according to the embodiments may perform decoding adaptively according to the performance of the decoder while sequentially traversing the geometry information and attribute information from the root node to the leaf node in the colorized octree. That is, as the point cloud data reception device (or decoder) according to the embodiments receives a colorized octree, it may decode the attribute information without fully decoding the attribute information, thereby implementing scalable decoding. In addition, the colorized octree may support receivers of various performances because the attribute information is matched to nodes according to decoder performance.

Figure 22:
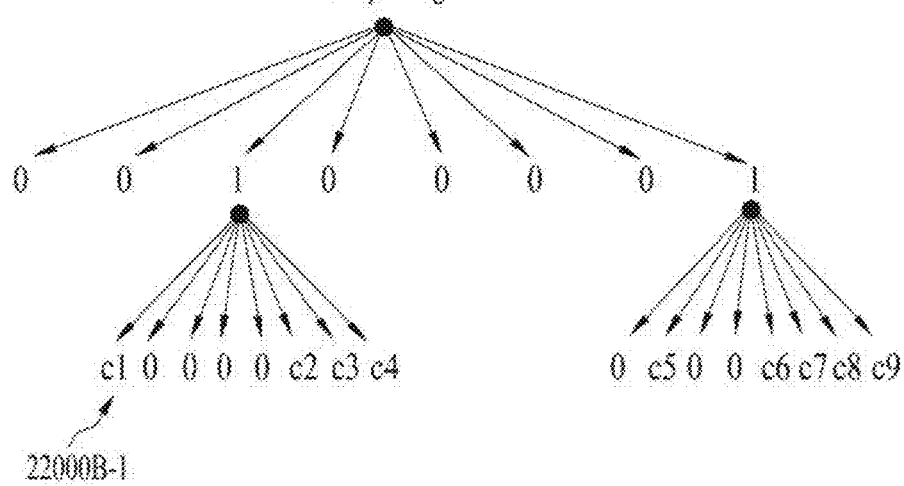
FIG. 22 illustrates an operation of colorizing a leaf node of an octree structure.

FIG. 22 illustrates an operation of colorizing a leaf node of an octree structure.

The operation illustrated in FIG. 22 may be an operation performed in the leaf node colorization 21000 of FIG. 21, and may be performed by the colorized octree generator 20004 or the octree matcher 20004*a*.

FIG. 22(A) shows an example of attribute data (attribute information) according to embodiments.

The attribute data may include, for example, color values. The attribute data shown in FIG. 22(A) is an example of the attribute information (attribute data) described with reference to FIGS. 1 to 17.

c1 to c9 represent attribute information about individual points. Attr indicates attribute information about a point having a specific position. Specifically, Attr(0, 2, 0) indicates attribute information about a point present at position (0, 2, 0). Therefore, c1=Attr(0, 2, 0) means c1 is attribute information about a point positioned at (0, 2, 0).

FIG. 22(A) exemplarily shows attribute information about points distributed in a 3D space. FIG. 22(A) shows attribute information about each of nine points present in the 3D space.

FIG. 22(B) shows an octree structure including leaf nodes on which colorization has been performed. FIG. 22(B) illustrates a process of matching attribute information to the points shown in FIG. 22(A) in the octree structure according to the embodiments. For example, a point corresponding to c1 is distributed at position (0, 2, 0), and thus corresponds to a leaf node 22000B-1 in the octree shown in FIG. 22(B). The attribute information c1 is matched to the leaf node 22000B-1. c2 to c9 are also matched to corresponding leaf nodes in a similar manner.

Figure 23:
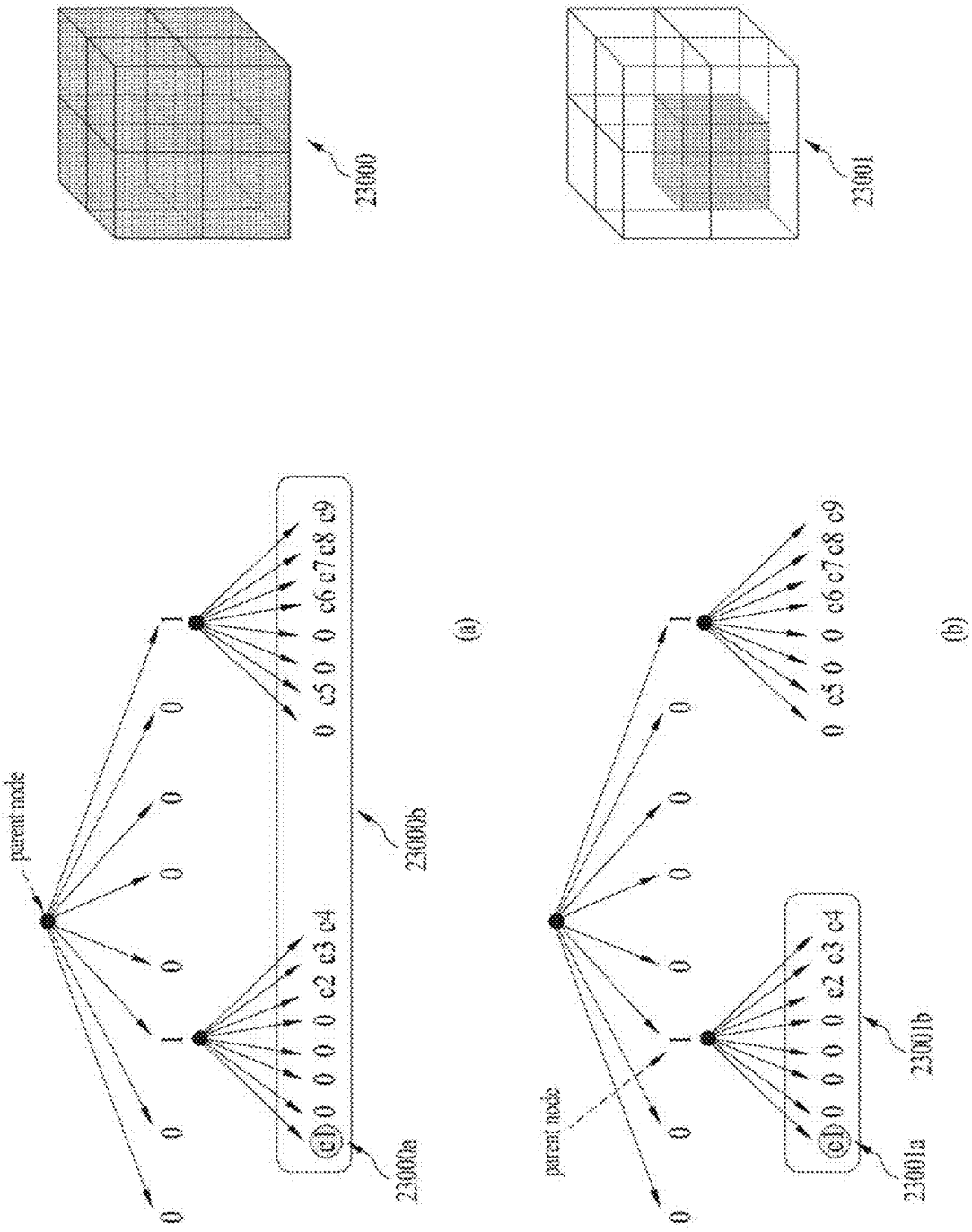
FIG. 23 illustrates a process in which an encoder according to the embodiments detects a neighbor according to embodiments.

FIG. 23 illustrates a process in which an encoder according to the embodiments detects a neighbor according to embodiments.

The operation of detecting neighbors illustrated in FIGS. 23(A) and 23(B) may represent the operation of the neighbor detection 21001 of FIG. 21. The encoder according to the embodiments may detect neighbor points for a specific point in order to match attribute information to the nodes in the octree structure. The encoder according to the embodiments may select attribute information based on the detected neighbor points, and then match the selected attribute information to nodes in the octree structure.

The encoder according to the embodiments may match attribute information to the nodes while increasing the level from the root node (i.e., stepping down to lower level nodes).

FIG. 23(A) illustrates a process in which the encoder according to the embodiments detects neighbor points having the root node as a parent node in order to derive attribute information to be matched to the root node.

The encoder according to the embodiments may select one point (e.g., a point 23000*a* corresponding to C1) from among the points 23001 in the 3D space corresponding to the parent node (root node). The encoder according to the embodiments may search for leaf nodes taken as child nodes of the same parent node, other than the selected point. For example, nodes corresponding to C2 to C9, which are lower leaf nodes sharing the parent node (root node) with the point corresponding to C1, may be searched for as neighbor points 23000*b*.

The encoder according to the embodiments may select attribute information based on the selected neighbor points 23000*b* and then match the same to the corresponding parent node (root node).

FIG. 23(B) illustrates a process in which the encoder according to the embodiments detects neighbor points having a node other than the root node as a parent node in order to derive attribute information to be matched to the node.

The encoder according to the embodiments may select one point (e.g., a point 23001*a* corresponding to C1) from among the points 23001 in the 3D space corresponding to the parent node. The encoder according to the embodiments may search for leaf nodes taken as child nodes of the same parent node other than the selected point. For example, nodes corresponding to C2 to C4, which are lower leaf nodes sharing the parent node with the point corresponding to C1, may be searched for as neighbor points 23000*b*.

The encoder according to the embodiments may select the attribute information 23001*a* based on the selected neighbor points 23001*b* and then match the corresponding parent node.

FIG. 24 shows equations used for an encoder according to the embodiments to match attribute information to a parent node based on neighbors according to embodiments.

FIG. 24(A) shows equations representing an exemplary method of selecting attribute information to match the attribute information to a parent node among neighbor points according to embodiments.

(x_n, y_n, z_n) represents (x, y, z) coordinates of n points according to embodiments. For example, in FIG. 22, a point having an attribute of c1 may be represented as (0, 2, 0), where $x\_1=0$, $y\_1=2$, and $z\_1=0$.

Attr($x\_n$, $y\_n$, $z\_n$) represents attribute information about the n points. That is, Attr($x\_n$, $y\_n$, $z\_n$) represents attribute information about a point positioned at ($x\_n$, $y\_n$, $z\_n$). In other words, the function Attr(point) may be understood as a function that returns the attribute information about the point.

P_GeoCtr (x, y, z) represents attribute information about the parent node according to embodiments. That is, FIG. 24(A) corresponds to a process of determining attribute information about P_GeoCtr (x, y, z), namely, the parent node.

NEIGHBOR may denote a set of points corresponding to neighbors of the point at ($x\_n$, $y\_n$, $z\_n$).

f{Attr($x\_n$, $y\_n$, $z\_n$) ($x\_n$, $y\_n$, $z\_n$)∈NEIGHBOR} represents a function that returns attribute information about the point at ($x\_n$, $y\_n$, $z\_n$), which is one of neighbor points, when the points corresponding to the neighbors of a specific point are input. That is, it is a function that returns attribute information about one point at ($x\_n$, $y\_n$, $z\_n$) among the points corresponding to the neighbor points.

f{Attr($x\_n$, $y\_n$, $z\_n$) ($x\_n$, $y\_n$, $z\_n$)∈NEIGHBOR} represents the attribute value of the point ($x\_n$, $y\_n$, $z\_n$) at which the equation indicated by 24000a has the minimum value.

s($x\_n$, $y\_n$, $z\_n$) indicates whether a parent node is selected from among the points according to the embodiments. For example, when s($x\_n$, $y\_n$, $z\_n$) is 0 for a node, it indicates the point is selected as a parent node for matching. For example, when s($x\_n$, $y\_n$, $z\_n$) is 0 for the node, it indicates the point has never been selected as a parent node.

In order to match an attribute to a specific parent node, the point cloud data encoder according to the embodiments detects neighbor points for the parent node and then checks the values of s($x\_n$, $y\_n$, $z\_n$) for the neighbor points. Then, the encoder according to the embodiments matches the attribute of one of the points having s($x\_n$, $y\_n$, $z\_n$) set to 1 with the parent node. Due to this configuration, the encoder according to the embodiments may not match the same attribute data to multiple parent nodes.

M may denote the number of the neighbor points according to the embodiments.

$[\hat{x}-, \hat{y}-, \hat{z}-]^T$ may represent an average position of the neighbor points according to the embodiments. The average position of the neighbor points according to the embodiments may be calculated based on position information about the neighbor points. Specifically, the average position of the neighbor points according to the embodiments may be calculated by dividing the number of the neighbor points by the sum of the positions of the neighbor points. For example, the average position of the neighbor points according to the embodiments may be calculated by dividing the sum of the neighbor points multiplied by the weights (weight($x\_n$, $y\_n$, $z\_n$)) to be applied to the corresponding neighbor points by the number of the neighbor points (24000b).

weight($x\_n$, $y\_n$, $z\_n$) is the weights to be applied to the respective neighbor points.

$\|[\hat{x}-, \hat{y}-, \hat{z}-]^T-[x\_n, y\_n, z\_n]^T\|$ may denote the distance (e.g., Euclidean distance) between each neighbor point and the average position of the neighbor points.

In selecting one of the neighbor points, a point already matched to the parent node may not be considered. That is, the point cloud data encoder according to the embodiments may multiply $\|[\hat{x}-, \hat{y}-, \hat{z}-]^T-[x\_n, y\_n, z\_n]^T\|^2$ by s($x\_n$, $y\_n$, $z\_n$), and may not consider a point already matched to the parent node.

In brief, an attribute value to be matched to a parent node according to embodiments may represent attribute data about a point for which the equation indicated by 24000a has a minimum value. That is, the point cloud data encoder according to the embodiments may calculate the average of the values obtained by multiplying $[\hat{x}-, \hat{y}-, \hat{z}-]^T-[x\_n, y\_n, z\_n]^T\|^2$ by s($x\_n$, $y\_n$, $z\_n$), select a point ($x\_n$, $y\_n$, $z\_n$) for which the average is determined as the minimum value, and then attribute information (Attr($x\_n$, $y\_n$, $z\_n$)) about this point with the parent node.

FIG. 24(B) shows equations representing another exemplary method of selecting attribute information to match the attribute information to a parent node among neighbor points according to embodiments.

The point cloud data encoder according to the embodiments may select a point having a median value from among neighbor points sorted in ascending order. The point cloud data encoder according to the embodiments may select a point having a median value from among the values that are obtained by multiplying each of the neighbor points by a weight applied to each of the neighbor points and are arranged in ascending order. In selecting one of the neighbor points, a point already matched to the parent node may not be considered. That is, the point cloud data encoder according to the embodiments may multiply {weight($x\_n$, $y\_n$, $z\_n$|x, y, z)*[$x\_n$, $y\_n$, $z\_n$]^T} by s($x\_n$, $y\_n$, $z\_n$), and may not consider a point already matched to the parent node.

FIG. 24(C) shows equations representing another exemplary method of selecting attribute information to match the attribute information to a parent node among neighbor points according to embodiments.

The point cloud data encoder according to the embodiments may select a point having the k-th value when the neighbor points are sorted in ascending order. The point cloud data encoder according to the embodiments may select a point having the k-th value among the values which are obtained by multiplying each of the neighbor points by a weight applied to each of the neighbor points and are sorted in ascending order. In selecting one of the neighbor points, a point already matched to the parent node may not be considered.

FIG. 25 illustrates an operation of removing, by an encoder, a duplicate attribute in an octree to which attribute information is matched according to embodiments.

FIG. 25(A) shows a tree in which attribute information is matched to each node according to embodiments. The octree structure in which attribute information is matched in FIG. 25(A) may be referred to as a colorized octree. The colorized octree of FIG. 25(A) may be an octree structure obtained by performing the leaf node colorization operation 21000, the neighbor detection operation 21001, the point data selection operation 21002, and the octree node colorization operation 21003 in FIG. 21.

Duplicate attribute data may refer to duplicately matched attribute data when attribute data about points is duplicately matched to nodes other than the leaf nodes. That is, the same information may be duplicated up to a higher level due to recursive selection, which may increase the total number of data and thus decrease coding efficiency. For example, in the process of generating a colorized octree, C1 may are present in a leaf node 25000b-1 or in the upper node 25000b. When the encoder according to the embodiments transmits both attribute data, transmission efficiency may decrease. In addition, the purpose of achieving a scalable representation while increasing bit efficiency may not be achieved. Therefore, it is necessary to remove the duplicate attribute data.

Accordingly, the encoder according to the embodiments may remove the attribute information 25000*b*-1 corresponding to a leaf node among the duplicate data 25000*b* and 25000*b*-1. Similarly, attribute information C2 may be duplicately present at the root node 25000*a* and the leaf node 25000*a*-1. According to embodiments, attribute information about the leaf node between the root node 25000*a* and the leaf node 25000*a*-1 may be removed.

Similarly, attribute information C5 may be duplicately present at a specific node 25000*c* and a leaf node 25000*c*-1. According to embodiments, attribute information about the leaf node between the specific node 25000*c* and the leaf node 25000*c*-1 may be removed.

By removing the attribute data at the leaf node between the duplicate data, the decoder according to the embodiments may quickly decode the attribute information without performing search and decoding up to the leaf node, and may quickly render the PCC data for the user.

Figure 26:
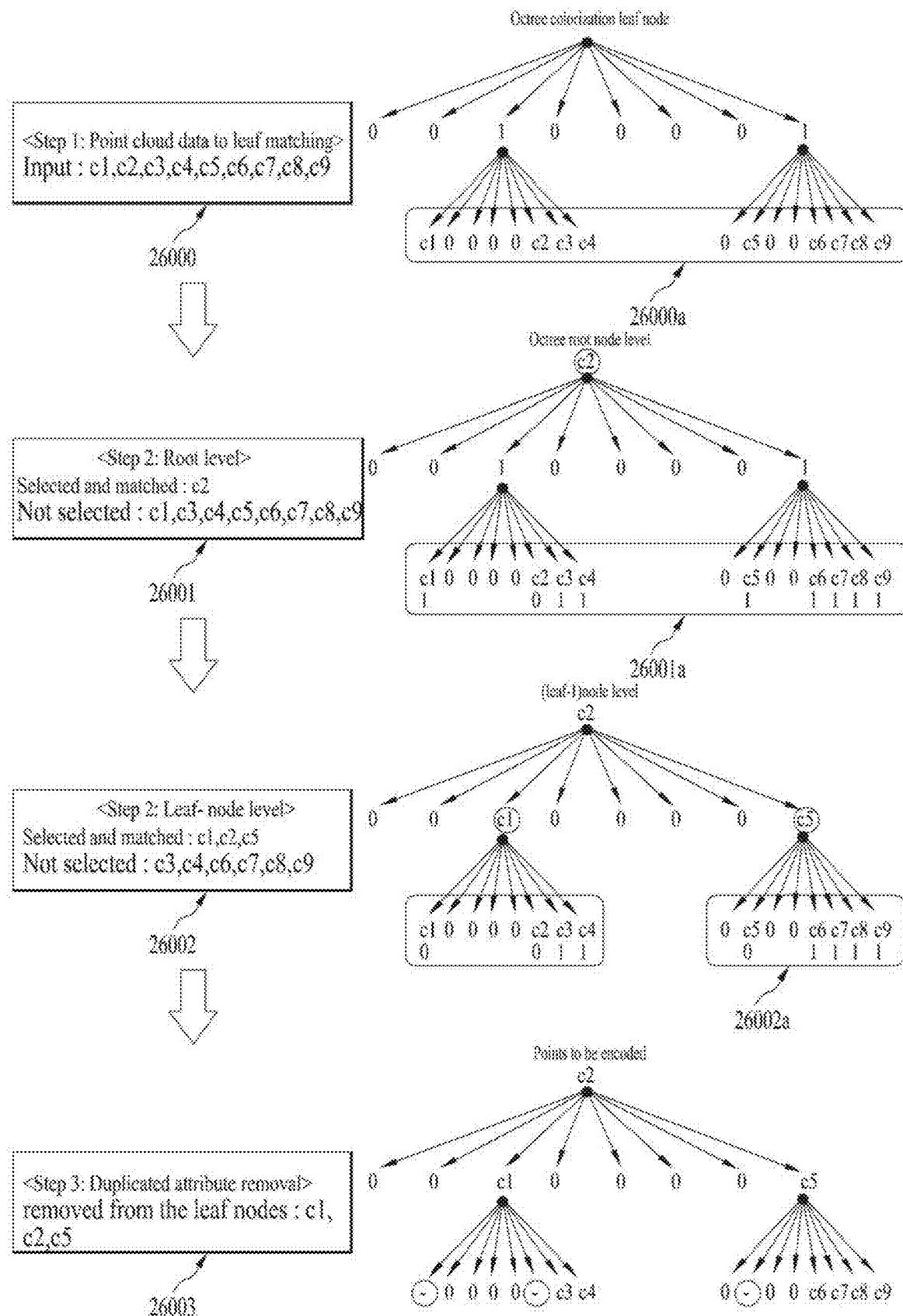
FIG. 26 lustrates an operation of an encoder according to embodiments.

FIG. 26 lustrates an operation of an encoder according to embodiments.

The operations shown in FIG. 26 may be performed in an encoder according to embodiments. Specifically, the operations shown in FIG. 25 may be performed by the colorized octree generator 20004 of FIG. 20.

The encoder according to the embodiments includes step 26000 of matching point cloud data with a leaf node, step 26001 of matching attribute information with a root node, step 26002 of matching attribute information to nodes from lower nodes to upper nodes (at level leaf−1) of the leaf nodes, and/or step 26003 of removing duplicate data from the octree structure to which the attribute information is matched.

Step 26000 of matching the point cloud data with the leaf node may be performed by the operation described with reference to FIG. 22. That is, the encoder according to the embodiments receives attribute data (Input: c1, c2, c3, c4, c5, c6, c7, c8, c9) and an octree structure according to the embodiments. The encoder according to the embodiments matches the received attribute data with corresponding leaf nodes 26000*a* in the octree structure.

In step 26001 of matching the attribute information to the root node, after neighbor points having the root node as a parent node are detected, the attribute information about one of the detected neighbor points is select it, and then the selected attribute information is matched to the root node. For example, the neighbor points that have the root node as the parent node are points corresponding to C1 to C9. The encoder according to the embodiments may select a point corresponding to C2 among the points, and may match attribute information about the selected point to the root node ("Selected and matched: c2"). The selected point according to the embodiments may be stored as 0 or 1 using a separate array or a suitable data structure.

In step 26002 of matching attribute information to nodes from lower nodes to upper nodes (at leaf-1 level) of the leaf nodes, the operations performed in step 26001 of matching the attribute information to the root node may be performed iteratively or recursively for the lower nodes.

In step 26003 of removing the duplicate data from the octree structure to which the attribute information is matched, the duplicate attribute data may be removed from the octree structure in which the attribute information is matched to the root node or each node. Step 26003 of removing the duplicate data from the octree structure to which the attribute information is matched may be performed according to the operation described with reference to FIG. 25.

Figure 27:
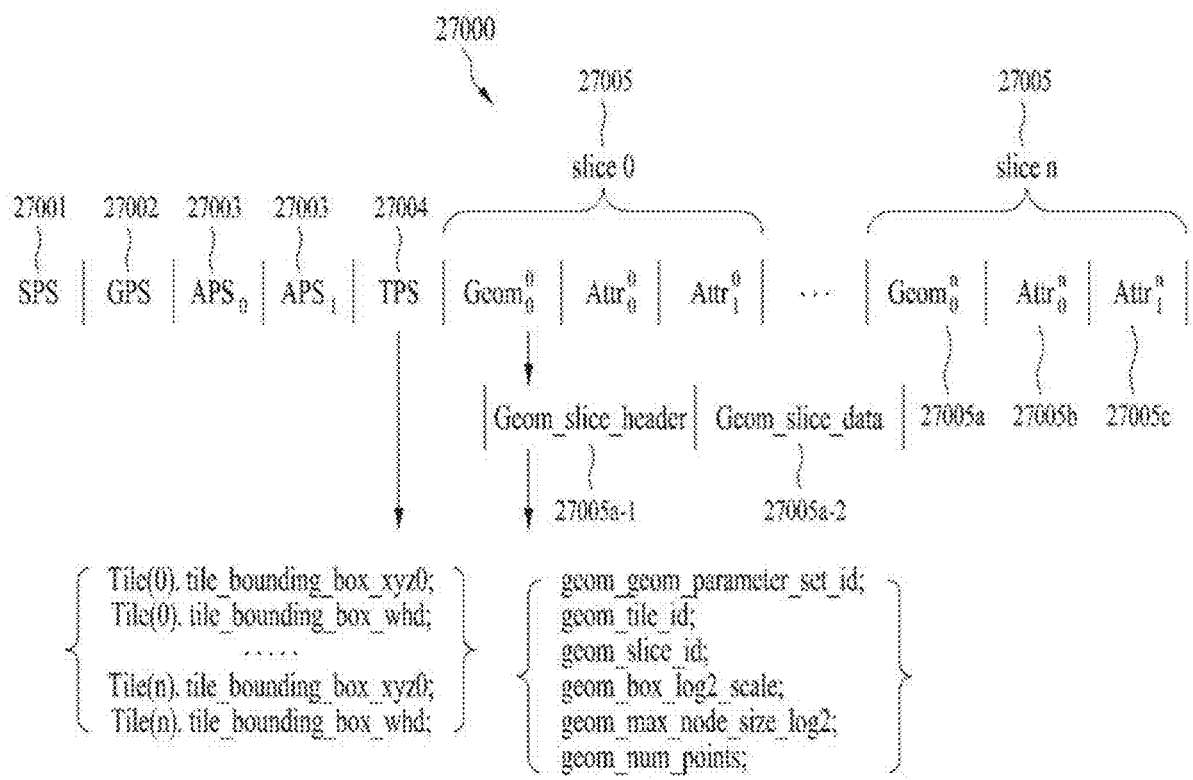
FIG. 27 shows an exemplary bitstream structure of point cloud data according to embodiments.

FIG. 27 shows an exemplary bitstream structure of point cloud data according to embodiments.

A point cloud data transmission device according to embodiments may transmit a bitstream 27000 having a bitstream structure as shown in FIG. 27. The bitstream 27000 of the point cloud data may include a sequential parameter set (SPS) 27001, a geometry parameter set (GPS) 27002, an attribute parameter set (APS) 27003, a tile parameter set (TPS) 27004, and one or more slices (slice 0, slice 1, . . . , slice n) 27005. The bitstream of the point cloud data may include one or more tiles. According to embodiments, a tile may be a slice group including one or more slices.

The bitstream 27000 according to the embodiments provides tiles or slices such that the point cloud data may be partitioned and processed by regions. Each region of the bitstream 27000 according to the embodiments may have a different importance. Accordingly, when the point cloud data is partitioned into tiles, different filters (encoding methods) and different filter units may be applied to the respective tiles. When the point cloud is partitioned into slices, different filters and different filter units may be applied to the respective slices.

The transmission device and reception device according to the embodiments may transmit and receive a bitstream according to a high-level syntax structure for selective transmission of attribute information in regions partitioned when the point cloud is partitioned and compressed.

By transmitting the point cloud data according to the structure of the bitstream 27000 illustrated in FIG. 27, the point cloud data transmission device according to the embodiments may apply a different encoding operation according to importance, and may use a good-quality encoding method for an important region. In addition, it may support efficient encoding/decoding and transmission according to the characteristics of the point cloud, and provide attribute values according to user requirements The point cloud data transmission device and the reception device according to the embodiments may perform encoding and decoding independently or non-independently on a tile-by-tile basis and/or a slice-by-slice basis, thereby preventing errors from being accumulated in the encoding and decoding processes.

The SPS 27001 is a syntax structure containing syntax elements that apply to zero or more entire CVSs as determined by the content of a syntax element found in the PPS referred to by a syntax element found in each slice segment header. The SPS may include sequence information about the point cloud data bitstream according to embodiments.

The GPS 27002 may represent a syntax structure containing syntax elements to which zero or more entire geometries (or coded geometries) are applied. The GPS 27002 according to the embodiments may include information about a method of encoding attribute information of point cloud data included in the one or more slices 27005. The GPS 27002 may include SPS identifier information indicating the SPS 27001 to which contained geometry parameters are related according to embodiments, and GPS identifier information for identifying the GPS.

The APS 27003 may represent a syntax structure containing syntax elements to which zero or more all attributes (or coded attributes) are applied. The APS 27003 according to the embodiments may include information about a method of encoding the attribute information of the point cloud data included in the one or more slices 19005. The APS 27003 may include SPS identifier information indicating the SPS 27001 to which the contained geometry parameter is related according to embodiments, and GPS identifier information for identifying the APS.

The TPS 27004 may represent a syntax structure containing syntax elements to which zero or more entire tiles (or coded tiles) are applied. A tile inventory includes information about zero or more tiles included in the point cloud data bitstream according to the embodiments. The tile inventory may be referred to as a tile parameter set (TPS) according to embodiments.

The TPS 27004 may include identifier information for identifying one or more tiles and information indicating a range of the one or more tiles (i.e., a bounding box of the tile). The information indicating the range of the one or more tiles (i.e., the bounding box of the tile) may include coordinate information (e.g., Tile(n).tile_bounding_box_xyz0) about a point serving as a reference of the bounding box represented by the tile and information (e.g., Tile(n).tile_boudning_box_whd) about the width, height, and depth of the bounding box. When a plurality of tiles is present, the tile inventory 27004 may include information indicating a bounding box for each of the tiles. For example, when the tiles are represented as 0 to n by the identifier information about the tiles, the information indicating the bounding boxes of the tiles may be represented as Tile(0).tile bounding_box_xyz0, Tile(0).tile_bounding_box_whd, Tile(1) .tile_bounding_box_xyz0, Tile(1).tile bounding_box_whd, and the like.

The slice 27005 may represent a unit forming the basis of encoding of the point cloud data by a point cloud data transmission device according to embodiments. According to embodiments, the slice 27005 may represent a unit including one geometry bitstream (Geom00) 27005*a* and one or more attribute bitstreams (Attr00 and Attr10) 27005*b* and 27005*c*.

The slice 27005 may include a geometry slice (Geom) 27005*a* indicating the geometry information about the point cloud data included in the slice, and one or more attribute slices (Attr) 27005*b* and 27005*c* indicating the attribute information about the point cloud data included in the slice.

The geometry slice (Geom) 27005*a* includes geometry slice data (Geom_slice_data) 19005*a*-2, which includes geometry information of the point cloud data, and a geometry slice header (GSH) (Geom_slice_header) 27005*a*-1, which includes information about the geometry slice data.

The geometry slice header 27005*a*-1 includes information about the geometry slice data 27005*a*-2 in the slice. For example, the geometry slice header 27005*a*-1 may include a geometry parameter set identifier (geom_geom_parameter_set_id) for identifying the GPS 27002 that indicates the geometry information about the slice, a geometry slice identifier (geom_slice_id) for identifying the geometry slice, geometry box origin information (geomBoxOrigin) indicating the box origin of the geometry slice data, information (geom_box_log 2_scale) indicating the log scale of the geometry slice, and information (geom_num_points) related to the number of points of the geometry slice.

When the point cloud data bitstream according to the embodiments includes one or more tiles, the header of the geometry bitstream according to the embodiments may further include information (geom_tile_id) for identifying a tile including the geometry bitstream.

The attribute slice (Attr) 27005*b* includes attribute slice data (Attr_slice_data) 27005*b*-2 including attribute information about point cloud data, and attribute slice header (Attr_slice_header (ASH) 27005*b*-1 including information about the attribute slice data.

According to embodiments, parameters necessary for point cloud encoding may be newly defined as a parameter set and header information for the point cloud. For example, they may be added to the attribute parameter set RBSP syntax to perform attribute information encoding, and may be added to the tile_header syntax to perform tile-based encoding.

The point cloud data transmission/reception method according to the embodiments may provide the bitstream structure as described above, thereby increasing performance of the receiver in decoding the attribute information of the point cloud data.

FIG. 28 shows an attribute parameter set (APS) according to embodiments.

A bitstream transmitted by the point cloud data transmission device (or a bitstream received by the point cloud data reception device) according to the embodiments includes one or more attribute parameter sets (APSs). The APS according to the embodiments represents the APS of FIG. 27.

The APS according to the embodiments may include, for example, aps_attr_parameter_set_id, aps_seq_parameter_set_id, octree_full_level_present_flag, scalable_represenatation_available_flag, octree_colorization_type, matched_attribute_type, attribute_selection_type and/or point_data_selection_type, and point_cloud_geometry_info_present_flag.

aps_attr_parameter_set_id provides an identifier for the APS for reference by other syntax elements. The value of aps_attr_parameter_set_id may be in the range of 0 to 15, inclusive.

aps_seq_parameter_set_id (specifies the value of sps_seq_parameter_set_id for the active SPS. The value of aps_seq_parameter_set_id may be in the range of 0 to 15, inclusive.

When octree_full_level_present_flag is 1, it indicates that data for full levels in the octree structure according to the embodiments are transmitted. That is, setting this parameter to 1 means that data for the full levels in the octree structure of the geometry data is transmitted in a bitstream by the point cloud data transmission device according to the embodiments.

When octree_full_level_present_flag is 0, it indicates that data for a partial level in the octree structure according to the embodiments is transmitted. That is, setting this parameter to 1 means that data for a partial level in the octree structure of geometry data, that is, a partial octree, is transmitted in a bitstream by the point cloud data transmission device according to the embodiments.

For example, when the point cloud data transmission device according to the embodiments transmits only occupancy information about nodes at levels from the root level to level k which is not the level of leaf nodes in the octree structure, the value of octree_full_level_present_flag may be 0. For example, when the point cloud data transmission device according to embodiments transmits occupancy information on all nodes corresponding to the levels from the root level to the level of leaf nodes in the octree structure, the value of octree_full_level_present_flag may be 1.

When the value of octree_full_level_present_flag is 1, the point cloud data reception device (decoder) according to the embodiments may perform a process of attribute-to-node matching process and attribute-to-point matching, and output partial and/or full point cloud data. When the value of octree_full_level_present_flag is 0, the point cloud data reception device (decoder) according to the embodiments may perform the process of attribute to node matching and output partial point cloud data. Among the operations of the decoder according to the embodiments, the attribute-to-node matching and the attribute-to-point matching will be described below with reference to FIG. 33 and the like.

scalable_representation_available_flag indicates whether scalable decoding (or scalable representation) is available. The point cloud encoder according to the embodiments may generate a colorized octree to enable scalable representation, and process attributes based on the colorized octree. When scalable_representation_available_flag is 1, scalable_representation_available_flag indicates that the decoded point cloud data (decoded attribute) has a structure (colorized octree structure) in which scalable representation is available. Accordingly, the reception device may generate a colorized octree based on this information to provide scalable representation. When scalable_representation_available_flag is 0, scalable_representation_available_flag indicates that the decoded point cloud data does not have a structure in which scalable representation is available.

octree_colorization_type indicates a colorized octree type or a method of generating a colorized octree. When octree_colorization_type is 0, it indicates that the colorized octree is generated according to the method of attribute paired octree generation. When octree_colorization_type is 1, it indicates that the colorized octree is generated according to the method of point paired octree generation.

Related parameters disclosed below are given when octree_colorization_type is 0, that is, when the colorized octree is an attribute paired octree.

matched_attribute_type indicates the type of an attribute matched to the octree node. When matched_attribute_type is 0, matched_attribute_type indicates that the attribute is an estimated attribute (e.g., an attribute estimated based on attributes of neighbor nodes or child nodes). When matched_attribute_type is 1, matched_attribute_type indicates that the attribute is an actual attribute (e.g., an attribute of a child node).

attribute_selection_type indicates a method of matching an attribute to an octree node. When attribute_selection_type is 0, the estimated attribute corresponds to the average of the attributes of the child nodes. When attribute_selection_type is 1, the estimated attribute corresponds to a mean of the attributes of the child nodes. When attribute_selection_type is 2, the attribute corresponds to the attribute of a child node at a fixed position (e.g., the attribute of the first child node or the attribute of the second child node among the child nodes sorted in ascending order).

Related parameters disclosed below are given when octree_colorization_type is 1, that is, when the colorized octree is a point paired octree.

When point_data_selection_type is equal to 0, point_data_selection_type indicates a method of selecting point cloud data (or points) of a node at a fixed position among the child nodes of the corresponding node (e.g., the first node among the child nodes sorted in ascending order). When point_data_selection_type is 1, point_data_selection_type indicates a method of selecting a point of a child node whose position is closest to the average position of the positions of the occupied nodes among the child nodes. When point_data_selection_type is 2, point_data_selection_type indicates a method of selecting a point of a child node whose position is closest to the mean position of the positions of the occupied nodes among the child nodes.

A related parameter disclosed below is configured when point_data_selection_type is 0 or 3.

point_cloud_geometry_info_present_flag indicates whether geometry information about point data (or points) matched to an octree node is directly provided. When point_cloud_geometry_info_present_flag is 1, geometry information (e.g., position) about point data (or points) matched to the octree node is transmitted together. When point_cloud_geometry_info_present_flag is 0, geometry information about the point data (or points) matched to the octree node is transmitted together.

FIG. 29 illustrates an attribute bitstream according to embodiments.

The attribute bitstream 29000 of FIG. 29 may correspond to the attribute slice of FIG. 27. That is, the attribute bitstream 29000 according to the embodiments includes an attribute slice header 29001 and/or attribute slice data 29002.

The attribute slice header 29001 refers to the attribute slice header of FIG. 27. The attribute slice header 29001 may include abh_attr_parameter_set_id and abh_attr_sps_attr_idx.

abh_attr_parameter_set_id specifies the value of the aps_attr_parameter_set_id of the active APS.

abh_attr_sps_attr_idx specifies the attribute set in the active SPS. The value of abh_attr_sps_attr_idx may be in the range of 0 to sps_num_attribute_sets in the active SPS.

The attribute slice data 29002 may include attribute data corresponding to an attribute coding type according to embodiments. When attr_coding_type is 0, PredictingWeight_Lifting_bitstream is included. When attr_coding_type is 1, RAHT_bitstream is included. When attr_coding_type is 2, FixedWeight_Lifting_bitstream is included.

Figure 30:
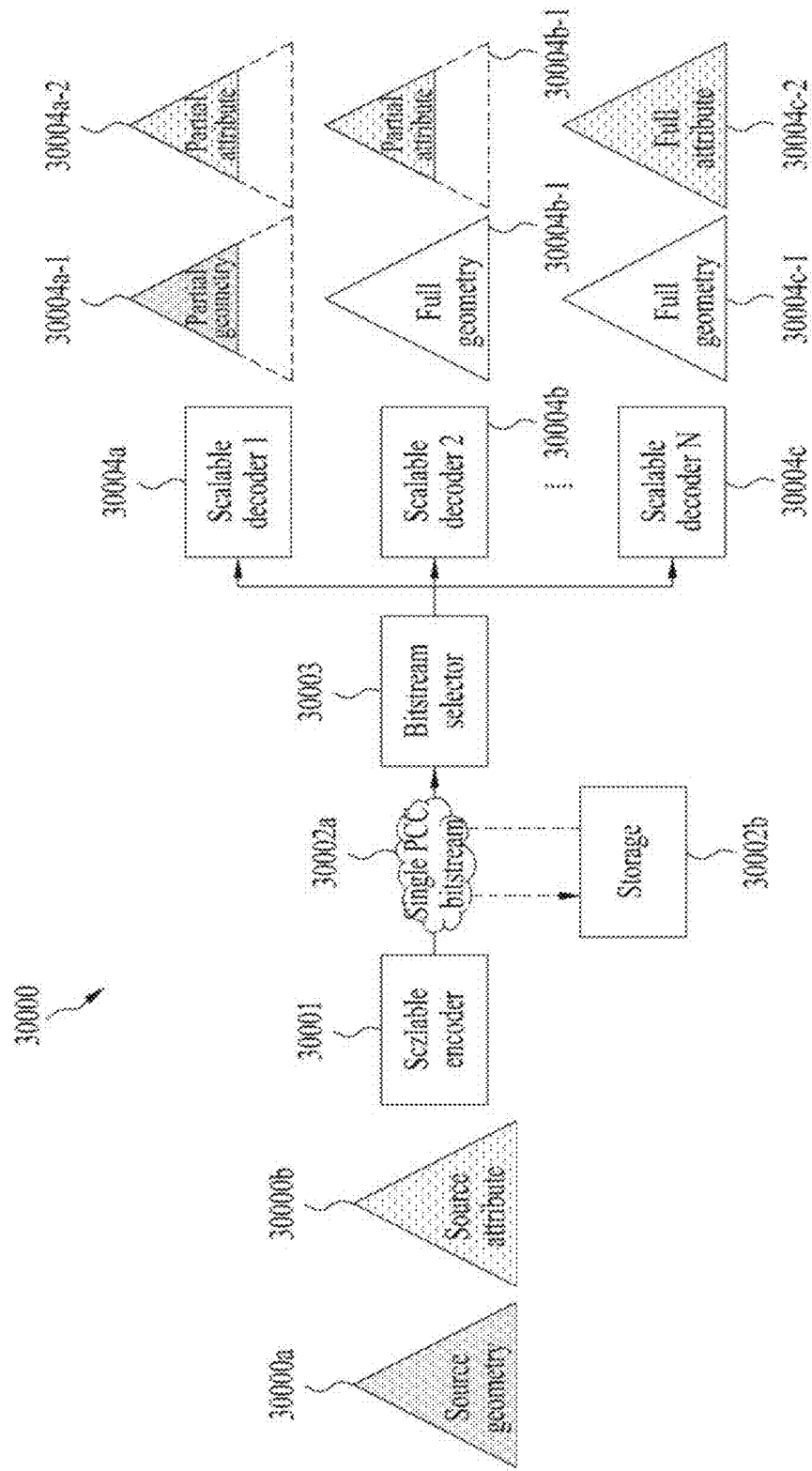
FIG. 30 illustrates operations of a point cloud data transmission device and reception device according to embodiments for scalable representation.

FIG. 30 illustrates operations of a point cloud data transmission device and reception device according to embodiments for scalable representation.

The operations of the encoder according to the embodiments illustrated in FIGS. 19 to 26 represent the operation of encoding point cloud data such that the point cloud data reception device according to the embodiments may effectively perform scalable representation of the point cloud data. As the point cloud data transmission device according to the embodiments provides scalable representation, the reception device may provide point cloud data content of various performances, and even reception devices of various performances may effectively perform representation for the user. For example, the transmission device according to the embodiments compresses point cloud data targeting decoders of various performances by generating a colorized octree according to the embodiments. This configuration may be effective in terms of storage space and bit efficiency of the transmission device because receivers of various performances may be supported through one bitstream even without generating or storing independent compression information according to each decoder performance. In addition, when the transmission bandwidth is limited, the transmission device according to the embodiments may generate and transmit low-resolution point cloud data.

The point cloud data transmission device according to the embodiments includes a scalable encoder configured to perform encoding by performing the operations illustrated in FIGS. 19 to 26. The scalable encoder 30001 generates an attribute bitstream by generating the colorized octree according to the embodiments. That is, the scalable encoder generates a single PCC bitstream 30002a including a geometry bitstream and an attribute bitstream according to embodiments.

The scalable encoder 30001 generates a source geometry 30000a and a source attribute 30000b. The source geometry 30000a represents position information about points of the point cloud data. The source geometry 30000a may be an octree structure including geometry information. The source attribute 30000b represents attribute information about points of the point cloud data. The source geometry 30000b may be a colorized octree structure including attribute information according to embodiments.

The scalable encoder 30001 generates a geometry bitstream corresponding to the octree structure and an attribute bitstream corresponding to the colorized octree.

The point cloud data transmission device and reception device according to the embodiments may further include a storage unit 30002b. The storage unit 30002b stores the geometry bitstream and the attribute bitstream (or the single PCC bitstream including both bitstreams).

The point cloud data transmission device according to the embodiments may transmit data stored in the storage unit 30002b to the point cloud data reception device according to the embodiments. The point cloud data reception device according to the embodiments may receive the data and store the same in the storage unit 30002b.

The point cloud data reception device according to the embodiments may include a bitstream selector 30003 configured to select part or the entirety of a bitstream including the point cloud data according to the embodiments and/or one or more scalable decoders 30004a to 30004c configured to decode the same.

The bitstream selector 30003 may receive the received bitstream according to the embodiments and determine whether to decode the same partially or fully. The bitstream selector 30003 according to the embodiments may determine whether to partially decode each of the geometry bitstream and the attribute bitstream included in the received bitstream or fully decode each of the bitstreams.

The scalable decoders 30004a to 30004c according to the embodiments may decode the bitstream selected by the bitstream selector 30003 in the received bitstreams according to the embodiments. The scalable decoders 30004a to 30004c may perform the decoding in three ways.

The scalable decoder 30004a according to first embodiments may receive, from the bitstream selector 30003, only a part of the geometry bitstream and a part of the attribute bitstream and decode the same. The geometry bitstream corresponds to the octree structure. Accordingly, the part 30004a-1 of the geometry bitstream is data including only some levels (i.e., a range from the root level to a partial level) of the octree structure including the geometry data according to the embodiments. The attribute bitstream corresponds to the colorized octree structure according to the embodiments. Accordingly, the part 30004a-2 of the attribute bitstream is data including only some levels (i.e., a range from the root level to a partial level) of the colorized octree structure including the attribute data according to the embodiments.

In other words, the scalable decoder 30004a according to the embodiments may receive and decode a part of the geometry bitstream (partial geometry) and a part of the attribute bitstream (partial attribute).

The scalable decoder 30004b according to second embodiments may receive the entirety of the geometry bitstream and a part of the attribute bitstream from the bitstream selector 30003 and decode the same. The geometry bitstream corresponds to the octree structure. Accordingly, the entirety of the geometry bitstream 30004b-1 is data including the full level of the octree structure including the geometry data according to the embodiments. The attribute bitstream corresponds to the colorized octree structure according to the embodiments. Accordingly, the part 30004b-2 of the attribute bitstream is data including only some level (i.e., a range from the root level to a partial level) of the colorized octree structure including the attribute data according to the embodiments.

In other words, the scalable decoder 30004b according to the embodiments may receive and decode the entirety of the geometry bitstream (full geometry) and a part of the attribute bitstream (partial attribute).

The scalable decoder 30004c according to third embodiments may receive the entirety of the geometry bitstream and the entirety of the attribute bitstream from the bitstream selector 30003 and decode the same. The geometry bitstream corresponds to the octree structure. Accordingly, the entirety of the geometry bitstream 30004c-1 is data including the full level of the octree structure including the geometry data according to the embodiments. The attribute bitstream corresponds to the colorized octree structure according to the embodiments. Accordingly, the entirety of the attribute bitstream 30004b-2 is data including the full level of the colorized octree structure including the attribute data according to the embodiments.

In other words, the scalable decoder 30004c according to the embodiments may receive and decode the entirety of the geometry bitstream (full geometry) and the entirety of the attribute bitstream (full attribute).

By transmitting the point cloud data according to the structure of the bitstream 27000 illustrated in FIG. 27, the point cloud data transmission device according to the embodiments may apply a different encoding operation according to importance, and may use a good-quality encoding method for an important region. In addition, it may support efficient encoding/decoding and transmission according to the characteristics of the point cloud, and provide attribute values according to user requirements.

The point cloud data transmission device and the reception device according to the embodiments may perform encoding and decoding independently or non-independently on a tile-by-tile basis and/or a slice-by-slice basis, thereby preventing errors from being accumulated in the encoding and decoding processes.

Figure 31:
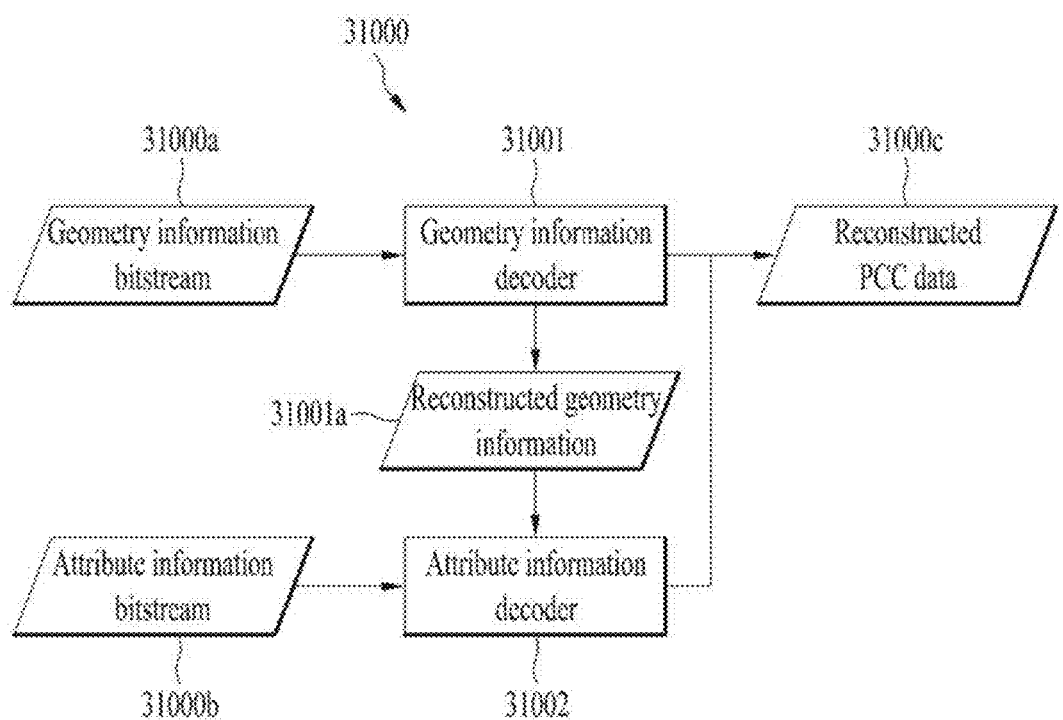
FIG. 31 illustrates a point cloud data decoder according to embodiments.

FIG. 31 illustrates a point cloud data decoder according to embodiments.

The point cloud decoder 31000 according to embodiments may include a geometry information decoding unit 31001 and/or an attribute information decoding unit 31002. According to embodiments, the point cloud decoder may be referred to as a PCC decoding device, a PCC decoding unit, a point cloud decoding device, a point cloud decoding unit, a PCC decoder, or the like.

The geometry information decoding unit 31001 receives a geometry information bitstream 31000a of point cloud data. The geometry information decoding unit 31001 may decode the geometry information bitstream 31000a of the point cloud data and output attribute information about reconstructed point cloud data 31000c. The geometry information decoding unit 31001 may reconstruct geometry information from the geometry information bitstream and output the reconstructed geometry information 31001. The geometry information bitstream 31000a may be the geometry information bitstream or geometry bitstream of FIGS. 18 to 26. The attribute information bitstream 31000b may be the attribute information bitstream or attribute bitstream of FIGS. 18 to 26.

The geometry information decoding unit 31001 decodes the received geometry information bitstream and reconstructs the geometry information. The reconstructed geometry information may be input to the attribute information decoding unit. The attribute information decoding unit 31002 reconstructs the attribute information based on the received attribute information bitstream and the reconstructed geometry information received from the geometry information decoding unit. The reconstructed geometry information may be a geometry reconstructed by the geometry reconstructor (Reconstruct geometry) 11003 described with reference to FIG. 11. The reconstructed geometry information may be an octree occupancy code reconstructed by the occupancy code-based octree reconstructor processor 13003 described with reference to FIG. 13.

The geometry information decoding unit 31001 receives the geometry information bitstream received by the reception device according to the embodiments. The geometry information decoding unit 31001 may decode the geometry information bitstream.

The geometry decoding unit 31001 may perform all/part of the operation of the point cloud video decoder of FIG. 1, the decoding 20003 of FIG. 2, the operation of the geometry decoder of FIG. 10, and the operations of the arithmetic decoder 11000, the octree synthesizer 11001, the surface approximation synthesizer 11002, the geometry reconstructor 11003, and/or the coordinate inverse transformer 11004 described with reference to FIG. 11.

The attribute information decoding unit 31002 receives the attribute information bitstream 31000*b* of the point cloud data. The attribute information decoding unit 31002 may decode the attribute information bitstream 31000*b* of the point cloud data and output attribute information of the reconstructed point cloud data 31000*c*. The attribution information decoding unit 31002 may decode the attribution information bitstream based on the reconstructed geometry information 31001*a* generated by the geometry information decoding unit 31001.

The attribution information decoding unit 31002 receives the attribution information bitstream received by the reception device according to the embodiments. The attribute information decoding unit may decode the attribute information of the attribute information bitstream based on the reconstructed geometry information. The geometry information and/or attribute information included in the point cloud data may be decoded into reconstructed PCC data.

The attribute information decoding unit 31002 may perform part or all of the operation of the point cloud video decoder of FIG. 1, the decoding 20003 of FIG. 2, the operation of the attribute decoder described with reference to FIG. 10, the operations of the inverse quantizer 11006, the RAHT 11007, the LOD generator 11008, the inverse lifter 11009, and/or the color inverse transformer 11010 of FIG. 11, and the operations of the arithmetic decoder 13007, the inverse quantization processor 13008, the prediction/lifting/RAHT inverse transform processor 13009, the color inverse transform processor 13010, and/or the renderer 13011 described with reference to FIG. 13.

Figure 32:
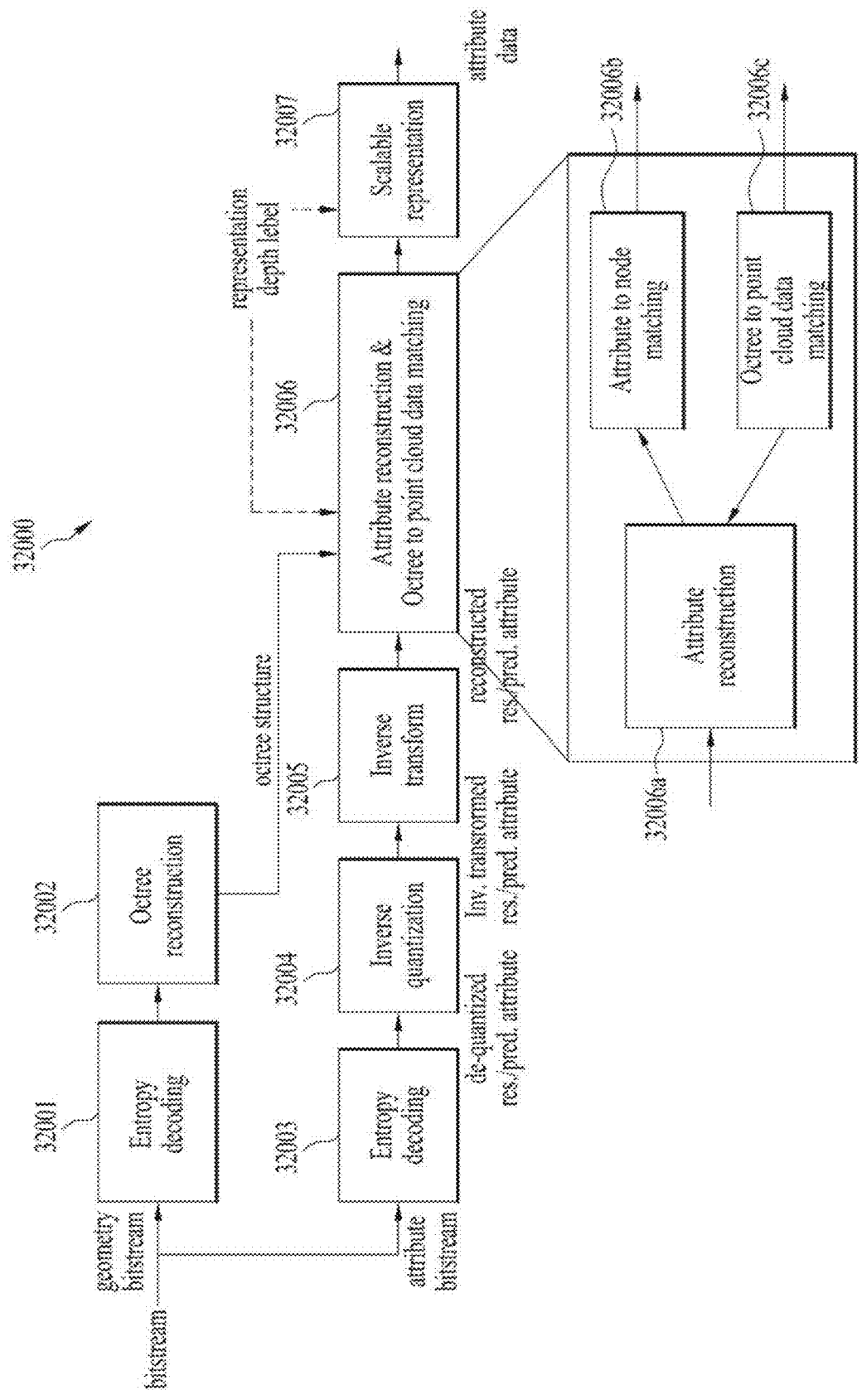
FIG. 32 illustrates a point cloud data decoder according to embodiments.

FIG. 32 illustrates a point cloud data decoder according to embodiments.

A point cloud data decoder 32000 according to the embodiments receives and decodes a bitstream including encoded point cloud data, and then outputs geometry data and attribute data. The bitstream including the encoded point cloud data according to the embodiments includes a geometry bitstream including the geometry data and/or an attribute bitstream including the attribute data.

The point cloud data decoder 32000 according to the embodiments includes an entropy decoder 32001 configured to decode a geometry bitstream, an octree reconstructor 32002, an entropy decoder 32003 configured to decode an attribute bitstream, and an inverse quantizer 32004, an inverse transformer 32005, an attribute reconstruction & octree matching unit 32006, and/or a scalable representation unit 32007. The attribute reconstruction & octree matching unit 32006 according to the embodiments includes an attribute reconstructor 32006*a*, an attribute-node matcher 32006*b*, and/or an octree-point cloud data matcher 32006*c*.

The entropy decoder 32001 configured to decode the geometry bitstream receives the geometry bitstream according to the embodiments. The entropy decoder 32001 configured to decode the geometry bitstream decodes the geometry bitstream and outputs geometry data.

The octree reconstructor 32002 receives the geometry data according to the embodiments, and converts (or reconstructs) geometry data indicating the positions of the points of the point cloud data into an octree structure based on the received data. The octree reconstructor 32002 outputs a geometry data-based octree structure.

The entropy decoder 32003 configured to decode the attribute bitstream receives and decodes the attribute bitstream according to the embodiments. The entropy decoder 32003 configured to decode the attribute bitstream decodes the attribute bitstream and outputs de-quantized attribute information. The de-quantized attribute information includes de-quantized residual attribute information and/or predicted attribute information.

The inverse quantizer 32004 receives the data decoded by the entropy decoder 32003 and inversely quantizes the same. The inverse quantizer 32004 receives the data decoded by the entropy decoder 32003 and outputs transformed attribute information by inversely quantizing the received data. The transformed attribute information includes transformed residual attribute information and/or predicted attribute information.

The inverse transformer 32005 receives the data inverse quantized by the inverse quantizer 32004 according to the embodiments and inversely transform the same. The inverse transformer 32005 inversely transforms the data inverse quantized by the inverse quantizer 32004 and outputs reconstructed attribute information. The reconstructed attribute information includes reconstructed residual attribute information and/or predicted attribute information.

The reception device according to the embodiments may predict the attribute data while stepping down the level (in a direction from the root node to the leaf node), as in the attribute prediction performed by the transmission device according to the embodiments. The prediction method according to the embodiments may be the same as the method used by the transmitter. For example, the reconstructed attribute data of the parent node may be used as a predicted value for the child node of the parent node. For example, for the predicted value, a range determined according to a definition of neighbors may be differently applied. For example, the attribute data of the parent node according to the embodiments may be predicted by the transmission device according to the embodiments as follows.

$$\hat{p}_l(x,y,z) = \hat{c}_{l-1}(2 \times \lfloor x/2 \rfloor, 2 \times \lfloor y/2 \rfloor, 2 \times \lfloor z/2 \rfloor)$$

The reception device according to the embodiments may perform the reverse of the prediction error generation method used by the transmission device to reconstruct the attribute of each child node based on the predicted attribute data. For example, when the transmission device according to the embodiments generates a prediction error as a difference (residual) between a source attribute and a predicted attribute, the reception device according to the embodiments may reconstruct attribute data by adding the predicted attribute estimated by the reception device and the value of the decoded prediction error. The transmission device according to the embodiments may transmit information on the attribute error generation method to the reception device. For example, attribute data of child nodes (or leaf nodes) according to the embodiments may be predicted by the reception device according to the embodiments as follows.

$$\hat{c}_l(x,y,z) = g^{-1}\{(x,y,z), \hat{p}_l(x,y,z)\} = \hat{p}_l(x,y,z) + \hat{r}_1(x,y,z)$$

$\hat{C}$1 (x, y, z) is attribute data of child nodes according to embodiments. g−1{ } is a function representing the inverse of a method by which the transmission device according to the embodiments performs prediction. p^l(x, y, z) denotes predicted attribute data of the parent node according to the embodiments. r^l(x, y, z) denotes a residual value (which may be included in decoded attribute data) to be applied to the predicted attribute data of the parent node according to the embodiments.

The attribute reconstruction & octree matching unit 32006 receives the reconstructed attribute information and an octree structure according to embodiments, and generates and outputs a colorized octree structure.

The scalable representation unit 32007 receives the colorized octree according to the embodiments and provides scalable representation based thereon.

Figure 33:
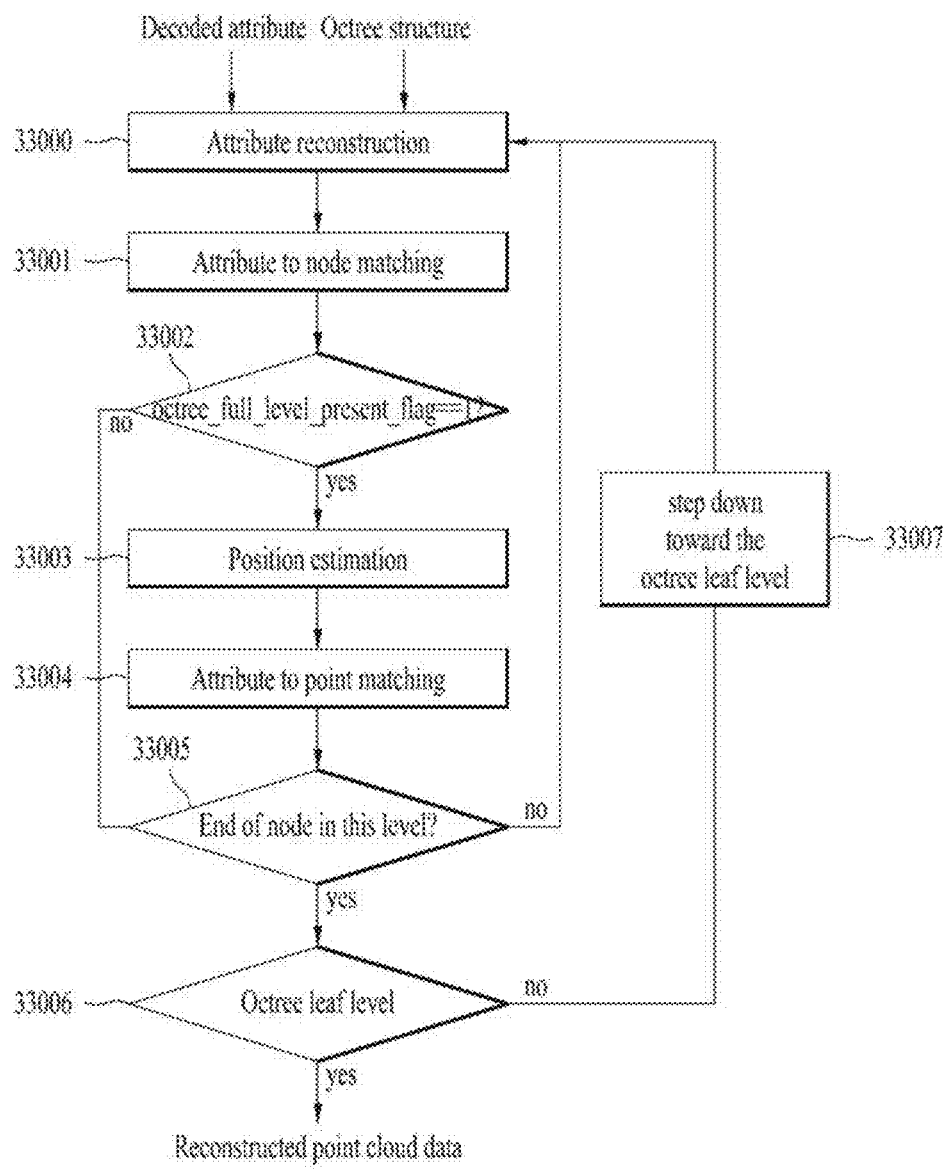
FIG. 33 illustrates a process in which a point cloud data reception device according to embodiments generates a colorized octree.

FIG. 33 illustrates a process in which a point cloud data reception device according to embodiments generates a colorized octree.

All or part of the operations described with reference to FIG. 33 may be performed by the attribute reconstruction & octree matching unit 32006 and/or the scalable representation unit 32007 of FIG. 32.

For scalable representation of point cloud data, the following operation may be performed.

The point cloud data reception device according to the embodiments may generate reconstructed point cloud data based on the received attribute data and octree structure.

The operation of reconstructing the point cloud data by the point cloud data reception device according to the embodiments includes reception of a decoded attribute and an octree structure, attribute reconstruction 33000, attribute to node matching 33001, position estimation 33003, and attribute to point matching 33004.

The attribute reconstruction 33000, the attribute to node matching 33001, the position estimation 33003, and the attribute to point matching 33004 may be repeatedly performed for each node in the octree structure according to the embodiments.

The decoder according to the embodiments may perform the attribute reconstruction 33000, the attribute to node matching 33001, the position estimation 33003, and the attribute to point matching 33004 on the nodes included in each level while stepping down from the root node to the level above the leaf node in the octree structure.

The decoder according to the embodiments may perform the attribute reconstruction 33000, the attribute to node matching 33001, the position estimation 33003, and the attribute to point matching 33004 while traversing the nodes in the octree structure in level order. That is, the decoder according to the embodiments may first perform the attribute reconstruction 33000, the attribute to node matching 33001, the position estimation 33003, and the attribute to point matching 33004 on the root node. Next, the decoder according to the embodiments may performs perform the attribute reconstruction 33000, the attribute to node matching 33001, the position estimation 33003, and the attribute to point matching 33004 on the child nodes of the root node, namely, the nodes of level 1. Once the decoder according to the embodiments performs the above processes on the nodes included in level 1, the decoder according to the embodiments may perform the above processes again on the nodes included in level 2. In the above method, the decoder according to the embodiments may perform the above-described operations up to the nodes of a level above the leaf node (33005).

The position estimation 33003 and the attribute to point matching 33004 according to the embodiments may be performed based on the value of the parameter octree_full_level_present_flag included in the signaling information in the received bitstream according to the embodiments (33002). For example, when the value of octree_full_level_present_flag is 1, the position estimation 33003 and the attribute to point matching 33004 may be performed on a node-by-node basis or as a whole.

A step of receiving a decoded attribute and an octree structure will be described. The decoded attribute represents the attribute information decoded by the decoder according to the embodiments. That is, it represents data obtained by decoding the attribute bitstream in the received bitstream. For example, the decoded attribute represents the data obtained by decoding, inverse quantizing and/or inversely transforming the attribute bitstream of FIG. 32 by the entropy decoder 32003, the inverse quantizer 32004 and/or the inverse transformer 32005. Also, the octree structure represents an octree structure reconstructed by the octree reconstructor 32002 of FIG. 32 according to the embodiments.

The attribute to node matching 32001 means matching the decoded attribute received by the point cloud data reception device (decoder) according to the embodiments to the nodes in the octree structure. For example, the decoder according to the embodiments first matches attribute data corresponding to the root node among the decoded attribute data to the root node in the octree structure. Next, the decoder matches attribute data corresponding to lower nodes (child nodes) different from the leaf nodes to nodes from the lower nodes (child nodes) to nodes included in the level of the leaf node, respectively.

In the position estimation 33003, the actual position of a point to which the received decoded attribute is matched is predicted. For example, in the position estimation 33003, a leaf node corresponding to the actual position of a point to which the received decoded attribute is matched may be predicted in the octree structure.

A method of predicting, by the point cloud data decoder according to the embodiments, the actual position of a point or a leaf node corresponding to the actual position in the position estimation 33003, will be described in detail with reference to FIG. 35.

In the position estimation 33003, when the actual position information about the point corresponding to the attribute of the decoded (reconstructed) point cloud data can be estimated, the actual position of the point rather than an arbitrary position of the point may be output for scalable decoding/representation even when not all nodes of every level in the octree are matched.

The attribute to point matching 33004 means matching the decoded attribute to the actual position of the point predicted in the position estimation 33003 (or a leaf node corresponding thereto). That is, it means matching attribute data matched in attribute-to-node matching to a leaf node corresponding to a point that is actually positioned.

As shown in FIG. 33, the decoder according to the embodiments may perform the position estimation 33003 and the attribute to point matching 33004 separately for each of the nodes from the root node to nodes corresponding to the upper nodes of the leaf node. In addition, the decoder according to the embodiments may perform the position estimation 33003 and the attribute to point matching 33004 after first matching attribute data to all nodes except the leaf nodes included in the octree structure.

Figure 34:
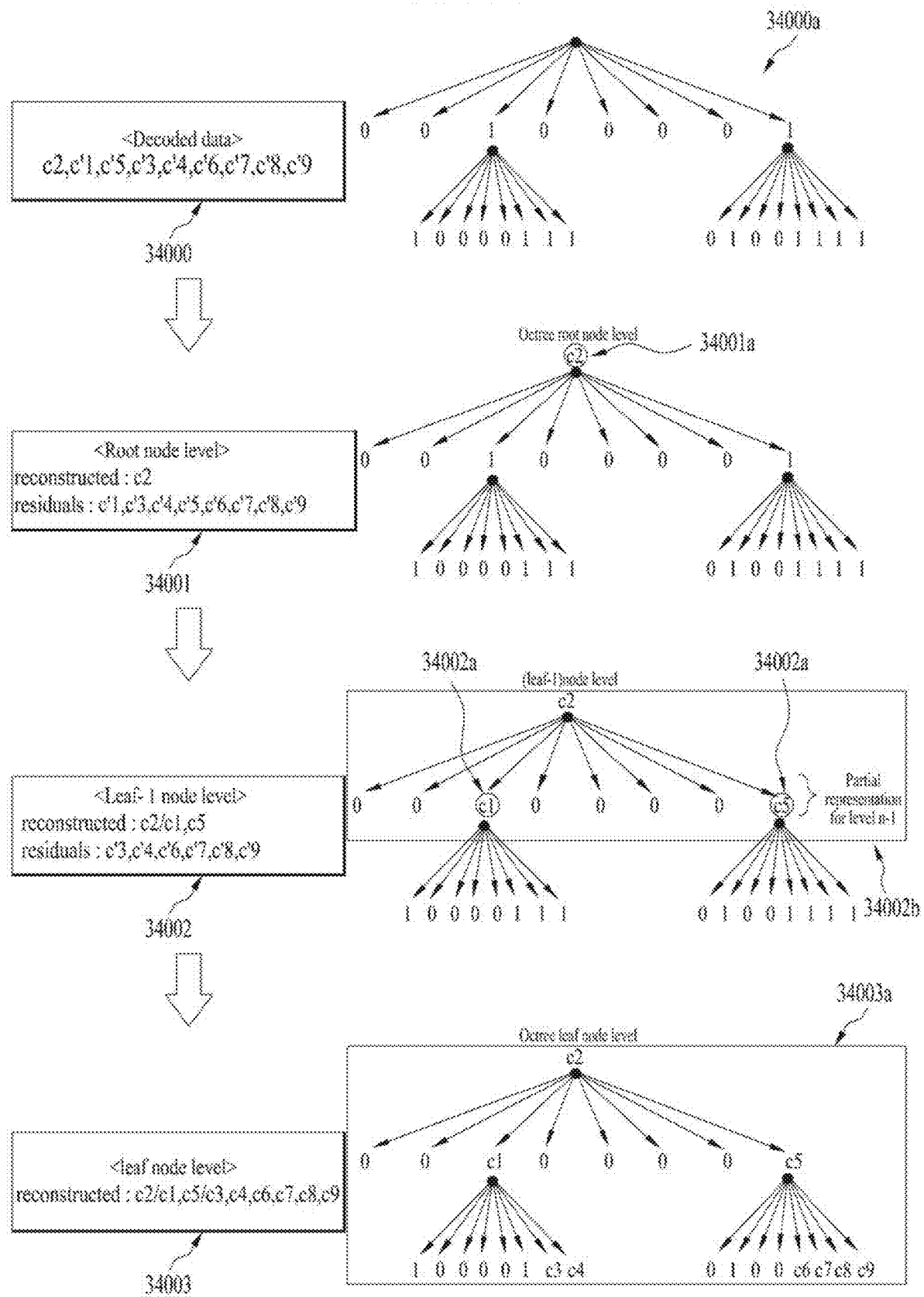
FIG. 34 illustrates an operation of attribute to node matching performed by a point cloud data decoder according to embodiments.

FIG. 34 illustrates an operation of attribute to node matching performed by a point cloud data decoder according to embodiments.

The point cloud data decoder according to the embodiments generates a colorized octree. The operations according to the embodiments described with reference to FIG. 34 may be performed by the attribute reconstruction & octree matching unit 32006 of FIG. 32. The operations according to the embodiments described with reference to FIG. 34 may correspond to some or all of the operations according to the embodiments described with reference to FIG. 33.

FIG. 34 illustrates a process of matching attribute data to an occupied node included in an octree structure (full geometry) according to embodiments.

In order to generate a colorized octree according to the embodiments, the point cloud data decoder (or scalable decoder) according to the embodiments may include step 34000 of decoding an attribute bitstream and generating decoded attribute data, step 34001 of matching attribute data corresponding to a root node of an octree structure in the decoded attribute data to the root node of the octree structure, step 34002 of matching the decoded attribute data to nodes from the child nodes of the root node to the nodes immediate above the leaf node, and/or step 34003 of matching the decoded attribute data to the leaf node. The reception device according to the embodiments performs step 34000 of decoding the attribute bitstream.

The reception device according to the embodiments may match attribute data corresponding to the root node among the decoded attribute data to the root node in the octree structure (34001a).

Once the attribute data is matched to the root node (34001a), the reception device according to the embodiments may separately signal or store the matched attribute data among the decoded attribute data. For example, by storing the matched attribute data in a reconstructed array, it may be indicated that attribute data c2 is pre-matched decoded data.

Once the attribute data is matched to the root node (34001a), the reception device according to the embodiments may separately signal or store the remaining attribute data except for the matched attribute data among the decoded attribute data. For example, by storing the remaining attribute data in a residuals array, it may be indicated that the attribute data c'1 and c'5 relate to the remaining decoded data that has not yet been matched.

The reception device according to the embodiments may match attribute data corresponding to the remaining nodes except for the leaf node among the decoded attribute data to the nodes in the octree structure (34002a).

Once attribute data is matched to the remaining nodes except for the leaf node (34002a), the reception device according to the embodiments may separately signal or store the matched attribute data among the decoded attribute data. For example, by storing the matched attribute data in the reconstructed array, it may be indicated that the attribute data c2, c1, and c5 are pre-matched decoded data.

Once attribute data is matched to the remaining nodes except for the leaf node (34002a), the reception device according to the embodiments may separately signal or store the remaining attribute data except for the matched attribute data among the decoded attribute data. For example, by storing the remaining attribute data in the residuals array, it may be indicated that the attribute data c'3, c'4, c'6, c'7, c'8, and c'9 relate to the remaining decoded data that has not yet been matched.

The reception device according to the embodiments may also match the decoded attribute data to nodes included in the level of the leaf node (34003). Step 34003 may correspond to the octree-point cloud data matcher 32006c of FIG. 32 and/or the attribute to node matching 33001 of FIG. 33.

For example, when the reception device matches attribute data to the nodes up to the nodes immediately above the leaf node, attribute data corresponding to c3, c4, c6, c7, c8, and c9 among the decoded attribute data remain. Attribute data corresponding to c3, c4, c6, c7, c8, and c9 may all be matched to leaf nodes (by attribute to node matching).

After performing the attribute to node matching described with reference to FIG. 34, The point cloud data reception device (decoder) according to the embodiments may perform attribute-point matching based on the signaling information (e.g., octree_full_level_present_flag information according to the embodiments). This process may represent the position estimation 33003 and/or the attribute-point matching 33004 described with reference to FIG. 33.

FIG. 35 illustrates a process in which a reception device according to the embodiments performs position estimation according to embodiments.

The operation according to the equations shown in FIG. 35 may correspond to the position estimation 33003 and/or the attribute-point matching 33004 of FIG. 33. In other words, the point cloud data reception device (or decoder) according to the embodiments may estimate a leaf node corresponding to the actual position of the point or the actual position in the octree structure based on the equations shown in FIG. 35, and match the decoded attribute data to the estimated leaf node.

The operation according to the equations shown in FIG. 35 may be performed by the octree-point cloud data matcher 32006c of FIG. 32 and may correspond to step 34003 shown in FIG. 34.

The equations shown in FIG. 35 are used to estimate a leaf node (or the position thereof) corresponding to the attribute data in order to match the decoded attribute data to leaf nodes, that is, to perform the attribute-to-point matching according to the embodiments.

The reception device according to the embodiments may predict the attribute data while stepping down the level (in a direction from the root node to the leaf node), as in the attribute prediction performed by the transmission device according to the embodiments. The prediction method according to the embodiments may be the same as the method used by the transmitter. For example, the reconstructed attribute data of the parent node may be used as a predicted value for the child node of the parent node. For example, for the predicted value, a range determined according to a definition of neighbors may be differently applied. For example, the attribute data of the parent node according to the embodiments may be predicted by the transmission device according to the embodiments as follows.

$$\hat{p}_l(x,y,z) = \hat{c}_{l-1}(2 \times \lfloor x/2 \rfloor, 2 \times \lfloor y/2 \rfloor, 2 \times \lfloor z/2 \rfloor)$$

The reception device according to the embodiments may perform the reverse of the prediction error generation method used by the transmission device to reconstruct the attribute of each child node based on the predicted attribute data. For example, when the transmission device according to the embodiments generates a prediction error as a difference (residual) between a source attribute and a predicted attribute, the reception device according to the embodiments may reconstruct attribute data by adding the predicted attribute estimated by the reception device and the value of the decoded prediction error. The transmission device according to the embodiments may transmit information on the attribute error generation method to the reception device. For example, attribute data of child nodes (or leaf nodes) according to the embodiments may be predicted by the reception device according to the embodiments as follows.

$$\hat{c}_l(x,y,z) = g^{-1}\{(x,y,z), \hat{p}_l(x,y,z)\} = \hat{p}_l(x,y,z) + \hat{r}_l(x,y,z)$$

$\hat{c}_l$ (x, y, z) is attribute data of child nodes according to embodiments. $g-1\{\}$ is a function representing the inverse of a method by which the transmission device according to the embodiments performs prediction. $\hat{p}_l(x, y, z)$ denotes predicted attribute data of the parent node according to the embodiments. $\hat{r}_l(y, z)$ denotes a residual value (which may be included in decoded attribute data) to be applied to the predicted attribute data of the parent node according to the embodiments.

First, the reception device performs attribute to node matching on the decoded attribute data according to the embodiments. That is, the reception device matches the decoded attribute data to a specific node other than the leaf node.

Next, the reception device detects occupied leaf nodes having the matched node as a parent node. The occupied leaf nodes may be referred to as neighbor nodes having the matched node as a parent node.

P_GeoCtr (x, y, z) represents attribute information about the parent node according to embodiments. (x_n, y_n, z_n) represents (x, y, z) coordinates of n points according to embodiments. NEIGHBOR may denote a set of points corresponding to neighbors of the point at (x_n, y_n, z_n). Attr(x_n, y_n, z_n) represents attribute information about each of the n points. That is, Attr(x_n, y_n, z_n) represents attribute information about a point positioned at (x_n, y_n, z_n). In other words, the function Attr(point) may be understood as a function that returns the attribute information about the point. f{Attr(x_n, y_n, z_n) (x_n, y_n, z_n) ∈NEIGHBOR} represents a function that returns attribute information about the point at (x_n, y_n, z_n), which is one of neighbor points, when the points corresponding to the neighbors of a specific point are input. f{Attr(x_n, y_n, z_n)|(x_n, y_n, z_n)∈NEIGHBOR} represents the attribute value of the point (x_n, y_n, z_n) at which the equation indicated by 35000a has the minimum value. s(x_n, y_n, z_n) indicates whether a parent node is selected from among the points according to the embodiments.

For example, s(x_n, y_n, z_n) may represent a node that has not yet been selected by the encoder according to embodiments as a node to be matched to the parent node. The point cloud data transmission device and/or the reception device according to the embodiments may set s(=0 for the selected point to prevent the point from being redundantly selected in matching other nodes.

M may denote the number of the neighbor points according to the embodiments. $[\hat{x}-, \hat{y}-, \hat{z}-]^T$ may represent an average position of the neighbor points according to the embodiments. The average position of the neighbor points according to the embodiments may be determined as shown in FIG. 24. $\|[\hat{x}-, \hat{y}-, \hat{z}-]^T - [x\_n, y\_n, z\_n]^T\|$ may denote the distance (e.g., Euclidean distance) between each neighbor point and the average position of the neighbor points.

In brief, the reception device according to the embodiments may estimate the actual position of the point corresponding to the decoded attribute using the equations shown in FIG. 35. For example, the reception device may search for (x_n, y_n, z_n) corresponding to NEIGHBOR of a specific node based on the geometry data, and calculate the values of M, s(x_n, y_n, z_n), weight(x_n, y_n, z_n), $[\hat{x}-, \hat{y}-, \hat{z}-]^T$, and $\|[\hat{x}-, \hat{y}-, \hat{z}-]^T-[x\_n, y\_n, z\_n]^T\|$ for the points corresponding to NEIGHBOR. Accordingly, the position of a point corresponding to attribute data to be matched to a specific node may be estimated by calculating a value corresponding to 35000a for the position of each point and checking whether the value matches the decoded attribute information.

Figure 36:
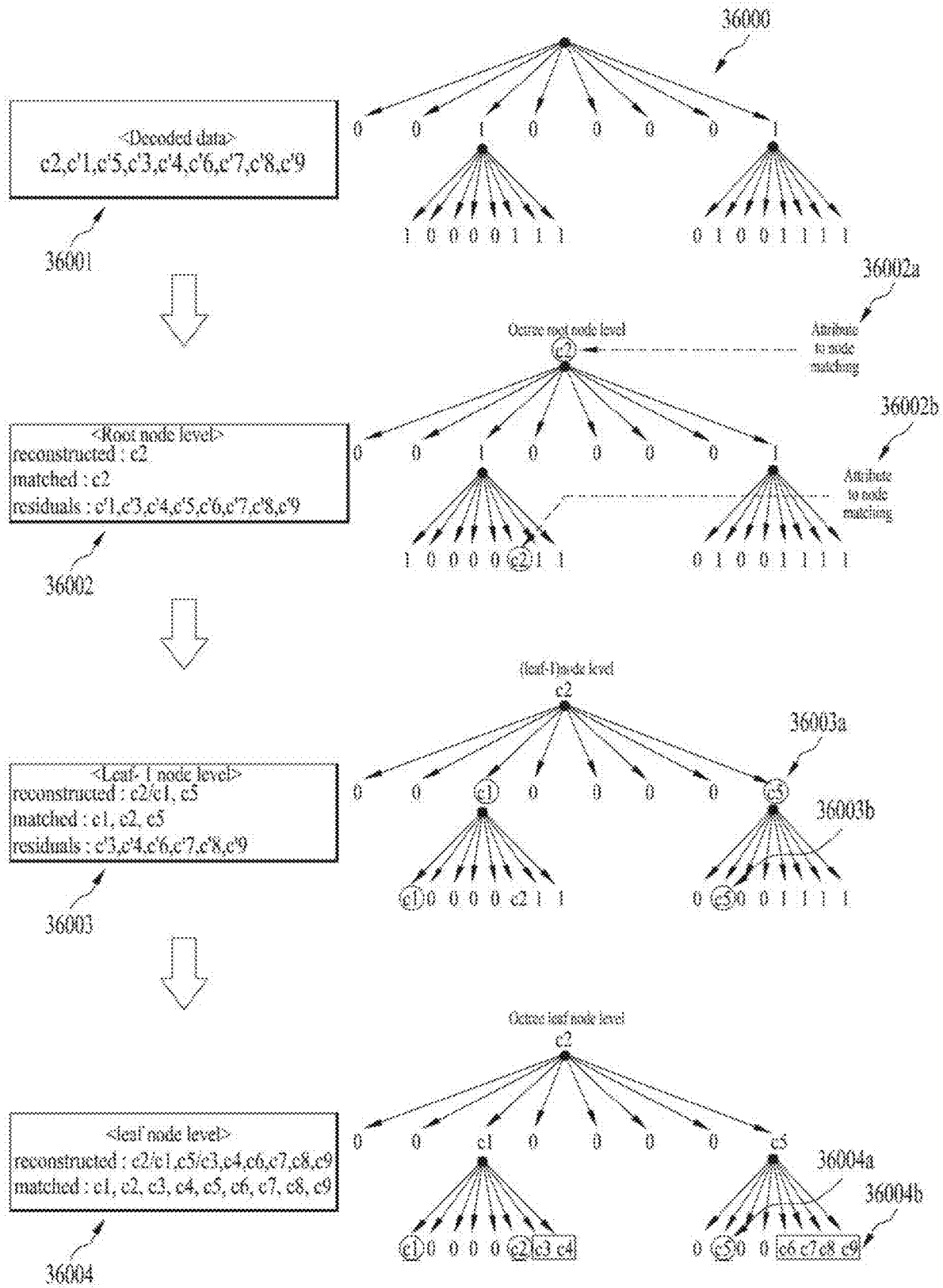
FIG. 36 illustrates another embodiment of the process in which the point cloud data decoder according to the embodiments generates a colorized octree.

FIG. 36 illustrates another embodiment of the process in which the point cloud data decoder according to the embodiments generates a colorized octree.

Specifically, FIG. 36 illustrates a process in which the decoder according to the embodiments generates a colorized octree for partial representation or full representation by performing attribute to node matching and/or attribute to point matching.

The point cloud data decoder according to the embodiments generates a colorized octree according to embodiments. The operations according to the embodiments described with reference to FIG. 36 may be performed by the attribute reconstruction & octree matching unit 32006 and/or the scalable representation unit 32007 of FIG. 32. The operations according to the embodiments described with reference to FIG. 36 may correspond to some or all of the operations according to the embodiments described with reference to FIG. 33. Also, the operations according to the embodiments described with reference to FIG. 36 include the operations described with reference to FIG. 34.

In order to generate a colorized octree according to the embodiments, the point cloud data decoder (or scalable decoder) according to the embodiments may perform step 34000 of decoding an attribute bitstream and generating decoded attribute data, step 34001 of matching attribute data corresponding to a root node of an octree structure in the decoded attribute data to the root node of the octree structure, and step 34002 of matching the decoded attribute data to nodes from the child nodes of the root node to the nodes immediate above the leaf node. The point cloud data decoder according to the embodiments may further include step 34003 of matching the leaf node.

The reception device according to the embodiments performs step 34000 of decoding the attribute bitstream. The attribute bitstream received in this step represent a bitstream including partial attribute data selected by the bitstream selector 30003 of FIG. 30. In other words, since the attribute bitstream in this step includes only partial attribute information, it may not include the attribute data shown in 34000b.

The reception device according to the embodiments may match attribute data corresponding to the root node among the decoded attribute data to the root node in the octree structure (36002a). Step 36002a may correspond to the attribute-node matcher 32006b of FIG. 32 and/or the attribute to node matching 33001 of FIG. 33.

Once the attribute data is matched to the root node (36002a), the reception device according to the embodiments may separately signal or store the matched attribute data among the decoded attribute data, as described with reference to FIG. 34. Also, once the attribute data is matched to the root node (36002*a*), the reception device according to the embodiments may separately signal or store the remaining attribute data except for the matched attribute data among the decoded attribute data as described with reference to FIG. 34.

When the geometry bitstream according to the embodiments includes full geometry information, that is, when the octree structure corresponds to full geometry information (e.g., octree_full_level_present_flag==1), attribute data according to the embodiments may be further matched to the leaf node of the actual point corresponding to the attribute data to be matched (36002*b*). Step 36002*b* may correspond to the attribute-node matcher 32006*c* of FIG. 32 and/or the attribute to point matching 33004 of FIG. 33.

Once the attribute data is matched to the leaf node of the actual point (36002*b*), the reception device according to the embodiments may separately signal or store an indication that the attribute information is matched to the leaf node of the actual point. For example, the reception device may store, in the matched signaling information or array, an indication that the attribute information is matched to the leaf node of the actual point.

The reception device according to the embodiments may match attribute data corresponding to the remaining nodes except for the leaf node among the decoded attribute data to the nodes in the octree structure (36003*a*). Step 36003*a* may correspond to the attribute-node matcher 32006*b* of FIG. 32 and/or the attribute to node matching 33001 of FIG. 33.

Similarly, when the geometry bitstream according to the embodiments includes full geometry information, that is, when the octree structure corresponds to full geometry information (e.g., octree_full_level_present_flag==1), attribute data according to the embodiments may be further matched to the leaf node of the actual point corresponding to the attribute data to be matched (36003*b*). Step 36003*b* may correspond to the attribute-node matcher 32006*c* of FIG. 32 and/or the attribute to point matching 33004 of FIG. 33.

The reception device according to the embodiments may match attribute data corresponding to leaf nodes among the decoded attribute data to the nodes in the octree structure (36004*a*). Step 36004*a* may correspond to the attribute-node matcher 32006*b* of FIG. 32 and/or the attribute to node matching 33001 of FIG. 33.

In step 36004*a*, attribute data is matched to the leaf node, and therefore the attribute to point matching may not be performed on the matched attribute data.

According to embodiments, the attribute data on which the attribute to node matching has not been performed is matched to an unmatched occupied leaf node. That is, the reception device may perform attribute to point matching on attribute data on which attribute to node matching has not been performed (36004*b*).

Hereinafter, operations according to the above-described embodiments will be described in connection with the scalable decoder described with reference to FIG. 30.

The operations illustrated in FIG. 36 may represent the scalable decoders 30004*a* to 30004*c* described with reference to FIG. 30.

For example, all the operations described with reference to FIG. 36 or a combination of part thereof may represent the operation of the scalable decoder 30004*a* according to the first embodiments described with reference to FIG. 30, the scalable decoder 30004*b* according to the second embodiments, or the scalable decoder 30004*c* according to the third embodiments.

First, the operation of the scalable decoder 30004*a* according to the first embodiments described with reference to FIG. 30 will be described in connection with the operation of FIG. 36.

Referring to FIG. 30, the scalable decoder 30004*a* according to the first embodiments receives partial geometry information and partial attribute information. According to embodiments, the octree structure shown in FIG. 36 represents only some levels (that is, partial geometry information) of the octree structure representing position information about points of the received point cloud data.

Accordingly, according to embodiments, octree_full_level_present_flag included in the signaling information contained in the bitstream may be 0. Accordingly, the scalable decoder 30004*b* according to the first embodiments skips the attribute-point matching operation according to the embodiments according to octree_full_level_present_flag equal to 0. This is because the octree structure received by the scalable decoder according to the first embodiments is an octree structure for some levels and does not include accurate position information about points.

Accordingly, in order to provide point cloud content of low resolution, the reception device according to the embodiments may skip the attribute-point matching operation instead of performing partial representation, thereby quickly providing point cloud content to the user.

In brief, upon receiving partial geometry information and partial attribute information, the scalable decoder 30004*b* according to the embodiments may perform the attribute to node matching 36002*a*, 36003*a* on the nodes included in the octree structure according to octree_full_level_present_flag equal to 0, thereby quickly providing point cloud content to the user even in a poor communication environment.

Next, the operation of the scalable decoder 30004*b* according to the second embodiments described with reference to FIG. 30 will be described in connection with the operation of FIG. 36.

Referring to FIG. 30, the scalable decoder 30004*b* according to the second embodiments receives full geometry information and partial attribute information. According to embodiments, the octree structure shown in FIG. 36 includes full levels (i.e., full geometry information) of the octree structure representing position information about points of the received point cloud data.

Accordingly, octree_full_level_present_flag included in the signaling information contained in the bitstream may be 1. Accordingly, the scalable decoder 30004*b* according to the second embodiments may perform the attribute-point matching operation according to the embodiments in response to octree_full_level_present_flag equal to 1. This is because the octree structure received by the scalable decoder according to the second embodiments is an octree structure for full levels and includes accurate position information about points.

Since the scalable decoder according to the embodiments receives partial attribute information, not all points may be matched to the attribute information. Accordingly, the scalable decoder 30004*b* according to the second embodiments may perform matching only on points (nodes) corresponding to the received attribute data. Accordingly, the scalable decoder 30004*b* according to the second embodiments may perform the attribute to node matching 36002*a*, 36003*a* and the attribute to point matching 36002*b*, 36003*b* on the octree structure only for the received attribute data.

Accordingly, the reception device according to the embodiments may skip the matching operation for unnecessary attribute information instead of performing partial representation to provide point cloud content of relatively high resolution for point cloud data in which position information about points is relatively important, thereby quickly providing the point cloud content to the user.

In brief, upon receiving full geometry information and partial attribute information, the scalable decoder 30004b according to the embodiments may perform the attribute to node matching and/or the attribute to point matching on nodes corresponding to the received attribute data included in the received octree structure according to octree_full_level_present_flag equal to 1, thereby providing appropriate point cloud content to the user.

Next, the operation of the scalable decoder 30004c according to the third embodiments described with reference to FIG. 30 will be described in connection with the operation of FIG. 36.

Referring to FIG. 30, the scalable decoder 30004c according to the third embodiments receives full geometry information and full attribute information. According to embodiments, the octree structure shown in FIG. 36 includes full levels (i.e., full geometry information) of the octree structure representing position information about points of the received point cloud data.

Accordingly, according to embodiments, octree_full_level_present_flag included in the signaling information contained in the bitstream may be 1. Accordingly, the scalable decoder 30004c according to the third embodiments may perform the attribute-point matching operation according to the embodiments according to octree_full_level_present_flag equal to 1.

Since the scalable decoder according to embodiments receives the full attribute information, it may match attribute information to all points. Accordingly, the scalable decoder 30004c according to the third embodiments may perform matching only on the points (nodes) corresponding to the received attribute data. Accordingly, the scalable decoder 30004c according to the third embodiments may perform the attribute to node matching 36002a, 36003a, 36004a and the attribute to point matching 36002b, 36003b, 36004b on nodes included in the octree structure for the entire received attribute data. That is, the scalable decoder 30004c according to the third embodiments may match attribute data to all occupied nodes included in the octree structure.

Accordingly, the reception device according to the embodiments performs full representation in order to provide high-resolution point cloud content in which the positions and attributes of the points are accurately presented, and thus may be suitable for a good reception environment or for content that needs to be provided with accurate point cloud content.

In brief, upon receiving full geometry information and full attribute information, the scalable decoder 30004c according to the embodiments may perform the attribute to node matching and/or the attribute to point matching on nodes included in the octree structure according to octree_full_level_present_flag equal to 1, thereby providing appropriate point cloud content to the user.

FIG. 37 illustrates a process of decoding for scalable representation by a point cloud data decoder according to embodiments.

FIG. 37(A) illustrates an example of scalable representation according to embodiments.

FIG. 37(A) illustrates an example of scalable representation of a point cloud decoder according to embodiments (e.g., the decoder described with reference to FIGS. 30 to 36). An arrow shown on the left side of FIG. 37(A) indicates a direction in which the depth of the octree structure of the geometry increases. The highest node in the octree structure according to the embodiments corresponds to the least depth or the first depth, and is referred to as a root. The lowest node in the octree structure according to the embodiments corresponds to the greatest depth or the last depth and is referred to as a leaf. The depth in the octree structure according to the embodiments increases from the root to the leaf.

The point cloud decoder according to the embodiments performs scalable decoding 37003b for providing high resolution point cloud content 37004b or scalable decoding 37003a for providing low resolution point cloud content 37004a, according to performance thereof.

To provide high resolution point cloud content, the point cloud decoder decodes a geometry bitstream 37001 and an attribute bitstream 37002 corresponding to the full octree structure (37003b).

To provide low resolution point cloud content, the point cloud decoder decodes a partial geometry bitstream 37001 and a partial attribute bitstream 37002 corresponding to a specific depth in the octree structure (37003a).

The attribute decoding according to the embodiments is performed based on geometry decoding. Therefore, even when the point cloud decoder decodes the attribute corresponding to the partial attribute bitstream 1812-2, the point cloud decoder is required to decode the geometry bitstream 37001. That is, the shaded portion in the part for the stream 37001 corresponds to the geometry information that is not displayed, but is transmitted and decoded to decode an attribute corresponding to the partial attribute bitstream 37002.

Also, the transmission device (e.g., the transmission device 10000 described with reference to FIG. 1 or the transmission device described with reference to FIG. 12) or the point cloud encoder (the point cloud video encoder 10002 of FIG. 1 or the point cloud encoder of FIG. 4, the point cloud encoder described with reference to FIGS. 12, 14, and 15, etc.) according to the embodiments may transmit only the partial geometry bitstream (the top part in 37001) and the partial attribute bitstream (the top part in 37002) corresponding to a specific depth in the octree structure. To provide low resolution point cloud content, the point cloud decoder decodes the partial geometry bitstream (the top part in 37001) and the partial attribute bitstream (the top part in 37002) corresponding to the specific depth in the octree structure (37003a).

The point cloud encoder according to the embodiments generates the colorized octree described with reference to FIGS. 30 to 36 by matching attributes to a geometry structure. The colorized octree according to the embodiments is generated by matching a node and an attribute of each level among one or more levels (or depths) representing the octree structure of the geometry. The point cloud encoder according to the embodiments performs attribute encoding based on the generated colorized octree. In addition, the point cloud encoder generates scalable representation information including information related to the colorized octree, and transmits the same together with the encoded geometry and encoded attribute over the bitstream to allow the reception device to perform scalable decoding and scalable representation.

The reception device may generate a colorized octree based on the scalable representation information as a reverse process of the operation of the transmission device or the point cloud encoder. As described above, the colorized octree represents attributes matched to the octree structure of the geometry. Accordingly, the reception device may select a specific level based on the colorized octree and output or render low resolution point cloud content according to the matched attributes. In particular, the reception device may provide point cloud content of various resolutions according to the performance of the reception device without a separate reception process or processing process. Both the transmission device (or the point cloud encoder) and the reception device (or the point cloud decoder) according to the embodiments may generate a colorized octree. The process or method of generating the colorized octree according to the embodiments may be referred to as octree colorization. The point cloud encoder according to the embodiments may perform octree colorization on the full octree structure from the highest node (lowest level) to the lowest node (highest level) in the octree structure. In addition, the point cloud encoder according to the embodiments may perform octree colorization in any depth range (e.g., a range from level n−1 to level n) in the octree structure. The point cloud decoder according to the embodiments may perform the octree colorization based on the above-described scalable coding information.

FIG. 37(B) shows details of geometry and attributes according to scalable decoding according to embodiments.

The upper part of FIG. 37(B) shows an example of details of geometry according to scalable decoding. A first arrow 37005c indicates a direction from an upper node (i.e., a node close to the root node) to a lower node (i.e., a node close to the leaf node) in the octree. As shown in the figure, as scalable decoding proceeds from the upper node to the lower node in the octree, more points are present, and thus the detail of the geometry increases. The leaf nodes in the octree structure correspond to the highest level of detail of the geometry.

The lower part of FIG. 37(B) shows an example of details of an attribute according to scalable decoding. A second arrow 37005d indicates a direction from an upper node to a lower node in the octree. As shown in the figure, when scalable decoding proceeds from the upper node to the lower node in the octree, the detail of the attribute increases.

Figure 38:
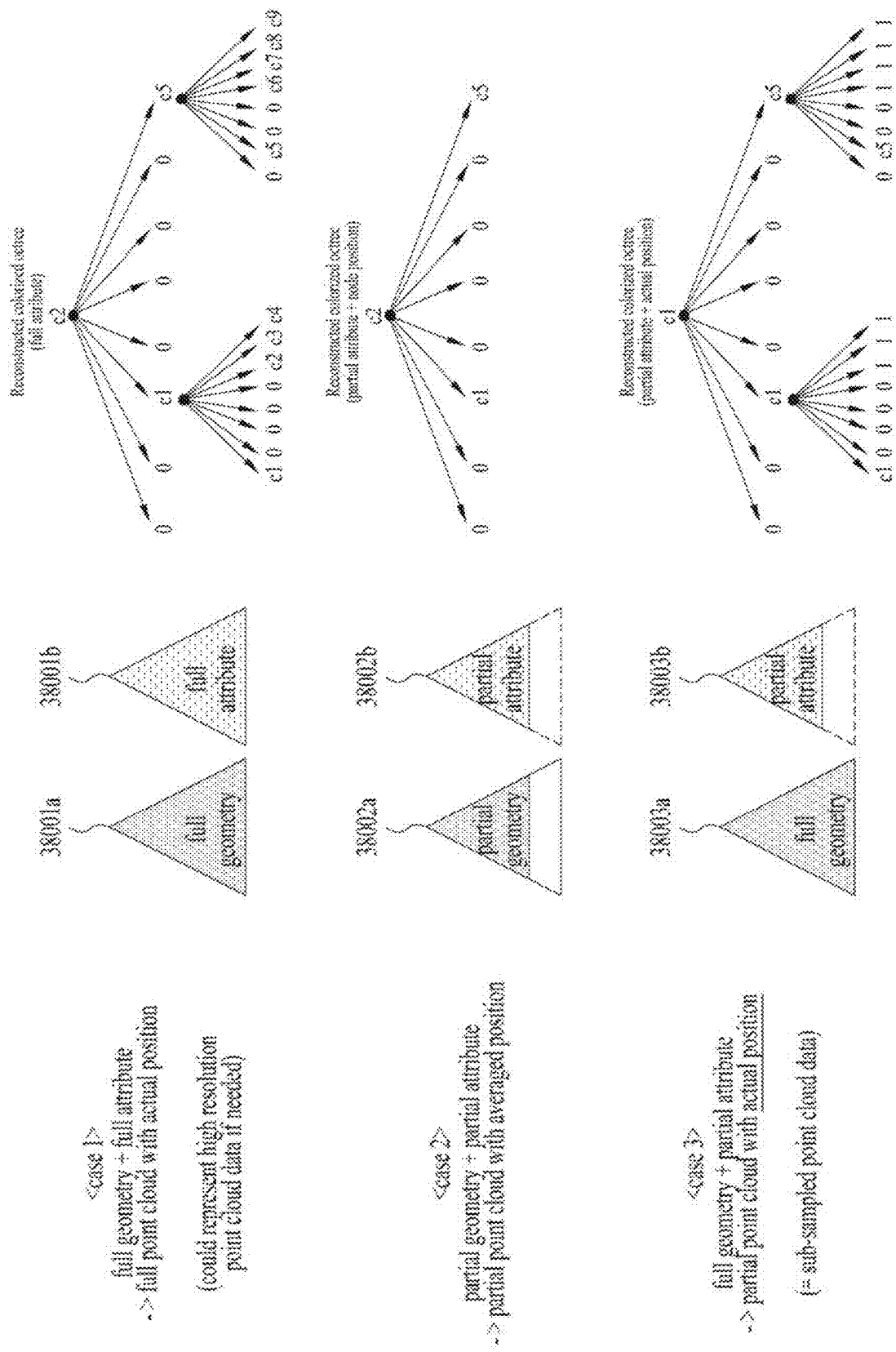
FIG. 38 illustrates a process of decoding for scalable representation by a point cloud data decoder according to embodiments.

FIG. 38 illustrates a process of decoding for scalable representation by a point cloud data decoder according to embodiments.

Specifically, FIG. 38 illustrates a method of decoding by the scalable decoder according to the embodiments described with reference to FIG. 36.

<case 1> represents a case where a scalable decoder according to embodiments receives a full geometry 38001a and a full attribute 38001b and performs scalable decoding according to embodiments.

The operations described in <case 1> may be performed by the scalable decoder 30004c according to the third embodiments described with reference to FIGS. 30 and 36. The scalable decoder performing the operations of <case 1> generates a reconstructed colorized octree (also called a colorized octree) by matching attribute data to occupied nodes included in the octree structure representing the positions of all points. The reconstructed colorized octree generated by the scalable decoder performing the operations of <case 1> may be generated by the attribute to node matching and attribute to point matching described with reference to FIGS. 30 to 37.

By performing the operations described in <case 1>, the scalable decoder may provide high resolution point cloud content and high quality content to the user when necessary.

<case 2> represents a case where a scalable decoder according to embodiments receives a partial geometry 38002a and a partial attribute 38002b and performs scalable decoding.

The operations described in <case 2> may be performed by the scalable decoder 30004a according to the first embodiments described with reference to FIGS. 30 and 36. The scalable decoder performing the operations of <case 2> generates a reconstructed colorized octree (also called a colorized octree) by matching attribute data to occupied nodes included in an octree structure including only data for some levels of the octree structure representing the positions of points. The reconstructed colorized octree generated by the scalable decoder performing the operations of <case 2> may be generated by the attribute to node matching described with reference to FIGS. 30 to 37.

By performing the operations described in <case 2>, the scalable decoder may quickly provide point cloud content of an average resolution to the user.

For example, if full octree depth=N, geometry octree depth=N−a, attribute octree depth=N−b, when S=max(a,b) is defined, the output point cloud data is information scaled down to S×S×S. Here, the output point cloud data may indicate the center position of a cube of the S×S×S size that binds the scaled-down point cloud data, rather than a reconstructed value for the actual position present in the input data.

<case 3> represents a case where a scalable decoder according to embodiments receives a full geometry 38003a and a partial attribute 38003b and performs scalable decoding.

The operations described in <case 3> may be performed by the scalable decoder 30004b according to the second embodiments described with reference to FIGS. 30 and 36. The scalable decoder performing the operations of <case 3> generates a reconstructed colorized octree (also called a colorized octree) by matching attribute data to occupied nodes included in an octree structure including only data for the full levels of the octree structure representing the positions of points. The reconstructed colorized octree generated by the scalable decoder performing the operations of <case 3> may be generated by the attribute to node matching and attribute to point matching described with reference to FIGS. 30 to 37.

By performing the operations described in <case 3>, the scalable decoder may skip the matching operation for unnecessary attribute information instead of performing partial representation to provide point cloud content of relatively high resolution for point cloud data in which position information about points is relatively important, thereby quickly providing the point cloud content to the user.

Figure 39:
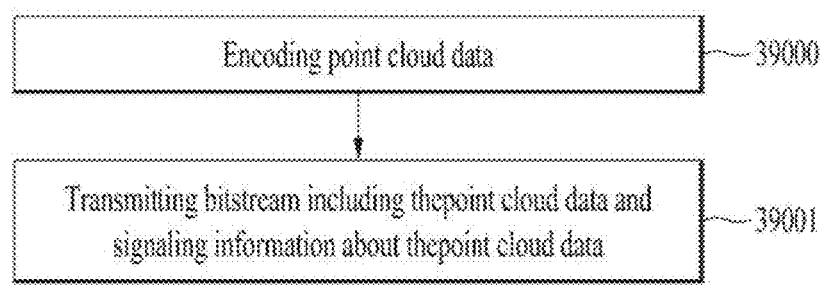
FIG. 39 illustrates a point cloud data transmission operation according to embodiments.

FIG. 39 illustrates a point cloud data transmission operation according to embodiments.

The point cloud data transmission operation according to the embodiments may include encoding point cloud data (39000) and/or transmitting a bitstream including the point cloud data and signaling information about the point cloud data (39001).

The point cloud data according to the embodiments may include geometry information indicating positions of points of the point cloud data, and attribute information indicating attributes of the points of the point cloud data.

The encoding 39000 of the point cloud data includes encoding the geometry information included in the point cloud according to the embodiments and encoding the attribute information included in the point cloud. In the encoding 39000 of the point cloud data, the operations described with reference to FIGS. 18 and 20, and the operations described with reference to FIGS. 19 and 21-26 may be performed.

For example, the encoding of the attribute information may include receiving an octree structure of the geometry information, generating a colorized octree by matching each level of the octree structure to one or more attributes. The octree structure may be represented by one or more levels, and the colorized octree may be used to encode the attribute information for scalable representation of partial or entire attribute information. The encoding of the attribute information according to the embodiments may further include removing duplicate data of the data matched to the colorized octree.

In the transmitting 39001 of the bitstream including the point cloud data and the signaling information about the point cloud data, the encoded point cloud data is transmitted. The signaling information according to the embodiments may include the information described with reference to FIG. 27. In addition, the signaling information may include information (octree_full_level_present_flag) indicating whether the bitstream includes data corresponding to a full level of the octree structure or data corresponding to only a partial level of the octree structure.

Figure 40:
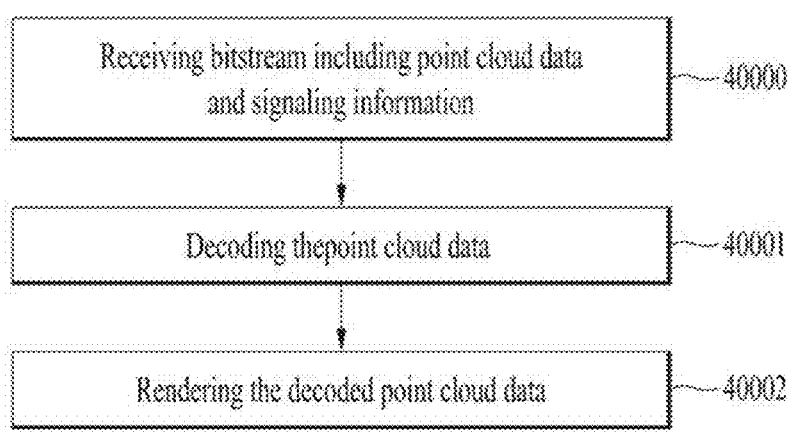
FIG. 40 illustrates a point cloud data reception operation according to embodiments.

FIG. 40 illustrates a point cloud data reception operation according to embodiments.

The point cloud data reception operation according to the embodiments includes receiving a bitstream including point cloud data and signaling information (40000), decoding the point cloud data (40001), and/or rendering the decoded point cloud data (40002).

The point cloud data included in the bitstream according to the embodiments includes geometry information indicating positions of points of the point cloud data and attribute information indicating one or more attributes of the points of the point cloud data.

The signaling information according to the embodiments may include information (e.g., octree_full_level_present_flag) indicating whether the bitstream includes data corresponding to a full level of the octree structure or data corresponding to only a partial level of the octree structure.

The decoding 40001 of the point cloud data includes decoding the geometry information and decoding the attribute information. In the decoding 40001 of the point cloud data, a colorized octree for decoding the attribute information may be generated to enable scalable representation of the point cloud data based on the information (e.g., octree_full_level_present_flag) indicating whether the bitstream includes data corresponding to a full level of the octree structure or data corresponding to only a partial level of the octree structure.

The decoding 40001 may represent the operation of the decoder or decoding according to the embodiments described with reference to FIGS. 30 to 38.

In the rendering 40002, the decoded point cloud data is rendered. In the rendering 40002, full representation or partial representation may be performed based on the generated colorized octree.

Components of the point cloud data processing devices according to the embodiments described with reference to FIGS. 1 to 40 may be implemented as hardware, software, firmware, or a combination thereof including one or more processors coupled with a memory. The components of the devices according to the embodiments may be implemented as a single chip, for example, a single hardware circuit. Alternatively, the components of the point cloud data processing devices according to the embodiments may be implemented as separate chips. In addition, at least one of the components of the point cloud data processing devices according to the embodiments may include one or more processors capable of executing one or more programs, wherein the one or more programs may include are instructions that execute or are configured to execute one or more of the operations/methods of the point cloud data processing devices described with reference to FIGS. 1 to 40.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Descriptions of methods and devices may be applied so as to complement each other. For example, the point cloud data transmission method according to the embodiments may be carried out by the point cloud data transmission device or components included in the point cloud data transmission device according to the embodiments. Also, the point cloud data reception method according to the embodiments may be carried out by the point cloud data reception device or components included in the point cloud data reception device according to the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/"and"," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

MODE FOR DISCLOSURE

As described above, related contents have been described in the best mode for carrying out the embodiments.

INDUSTRIAL APPLICABILITY

It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

The invention claimed is:

1. A method for processing point cloud data, the method comprising:
  encoding geometry information of the point cloud data based on a tree related to occupancy information;
  encoding attribute information of the point cloud data,
  wherein the geometry information represents positions of points of the point cloud data and the attribute information represents attributes of the points of the point cloud data,
  wherein the tree includes nodes from a root level to a leaf level,
  wherein the nodes are related to the points of the point cloud data, and
  wherein duplicated attribute information of the points is removed; and
  transmitting a bitstream including the encoded point cloud data.

2. The method of claim 1, wherein signaling information in the bitstream includes information representing whether the bitstream includes data corresponding to full level of the tree or a partial level of the tree.

3. A device configured to process point cloud data, the device comprising:
  an encoder configured to:
    encode geometry information of the point cloud data based on a tree related to occupancy information;
    encode attribute information of the point cloud data,
    wherein the geometry information represents positions of points of the point cloud data and the attribute information represents attributes of the points of the point cloud data,
    wherein the tree includes nodes from a root level to a leaf level,
    wherein the nodes are related to the points of the point cloud data, and
    wherein duplicated attribute information of the points is removed; and
  a transmitter configured to transmit a bitstream including the encoded point cloud data.

4. The device of claim 3, wherein signaling information in the bitstream includes information representing whether the bitstream includes data corresponding to full level of the tree or a partial level of the tree.

5. A method of processing point cloud data, the method comprising:
  receiving a bitstream including point cloud data, wherein the point cloud data includes geometry information and attribute information, wherein the geometry information represents positions of points of the point cloud data and the attribute information represents attributes of the points of the point cloud data; and
  decoding the geometry information based on a tree related to occupancy information;
  wherein the tree includes nodes from a root level to a leaf level,
  wherein the nodes are related to the points of the point cloud data; and
  decoding the attribute information based on a level of a tree including a number of points.

6. The method of claim 5, wherein signaling information in the bitstream includes information representing whether the bitstream includes data corresponding to full level of the tree structure or a partial level of the tree.

7. A device configured to process point cloud data, the device comprising:
  a receiver configured to receive a bitstream including point cloud data, wherein the point cloud data includes geometry information and attribute information encoded, wherein the geometry information represents positions of points of the point cloud data and the attribute information represents attributes of the points of the point cloud data; and
  a decoder configured to:
    decode the geometry information based on A tree related to occupancy information,
    wherein the tree includes nodes from a root level to a leaf level,
    wherein the nodes are related to the points of the point cloud data; and
    decode the attribute information based on a level of a tree including a number of points.

8. The device of claim 7, wherein signaling information in the bitstream includes information representing whether the bitstream includes data corresponding to full level of the tree or a partial level of the tree.

* * * * *